United States Patent [19]
Burns et al.

[11] 3,944,746
[45] Mar. 16, 1976

[54] COLLECTING SWITCHING SYSTEM CALL DATA

[75] Inventors: Thomas Victor Burns; Donald Ray Shea, both of Columbus, Ohio

[73] Assignee: Bell Telephone Laboratories Incorporated, Murray Hill, N.J.

[22] Filed: Feb. 24, 1975

[21] Appl. No.: 552,433

[52] U.S. Cl............................................. 179/7.1 R
[51] Int. Cl.².................................... H04M 15/10
[58] Field of Search 179/7 R, 7.1 R, 7 MM, 7.1 TP, 179/8 R, 8 A, 9, 18 E

[56] References Cited
UNITED STATES PATENTS

| | | | |
|---|---|---|---|
| 3,651,269 | 3/1972 | Le Strat et al. | 179/7 R |
| 3,697,695 | 10/1972 | Pommering et al. | 179/7 MM |
| 3,748,392 | 7/1973 | Henquet et al. | 179/7 MM |
| 3,770,893 | 11/1973 | Conerly | 179/7 MM |
| 3,808,373 | 4/1974 | McLaughlin | 179/8 A |
| 3,828,135 | 8/1974 | Padgett | 179/7 R |
| 3,829,617 | 8/1974 | Caithamer et al. | 179/7.1 R |
| 3,898,386 | 8/1975 | Gaon | 179/8 R |

*Primary Examiner*—Kathleen H. Claffy
*Assistant Examiner*—Gerald L. Brigance
*Attorney, Agent, or Firm*—S. N. Turner

[57] ABSTRACT

A stored program digital signal processor (e.g., Digital Equipment Corporation PDP 11/40) is used to collect billing data (e.g., Initial Entry data for Automatic Message Accounting) from a common control circuit (e.g., marker) of a common control automatic telephone switching system (e.g., the Bell System No. 5 Crossbar system). Ten marker control status indicating leads are scanned by the signal processor fast enough to detect any change in the signals on the 10 status leads which, in signal content as a group, represent the control status of the marker at any given time. When two successive prescribed control status changes occur, a large number of marker data leads are scanned by the signal processor so as to allow collection of that data and the storage thereof in a marker core buffer area of the signal processor. The stored data, previously registered in the marker incident to the assumption by the marker of certain control statuses, includes such Initial Entry data as calling circuit identity, called circuit identity, type of call, trunk circuit used, et cetera. The collected data is involved in subsequent processing (not disclosed) of the entire billing data for a call responsive to answer and disconnect timing entries.

20 Claims, 44 Drawing Figures

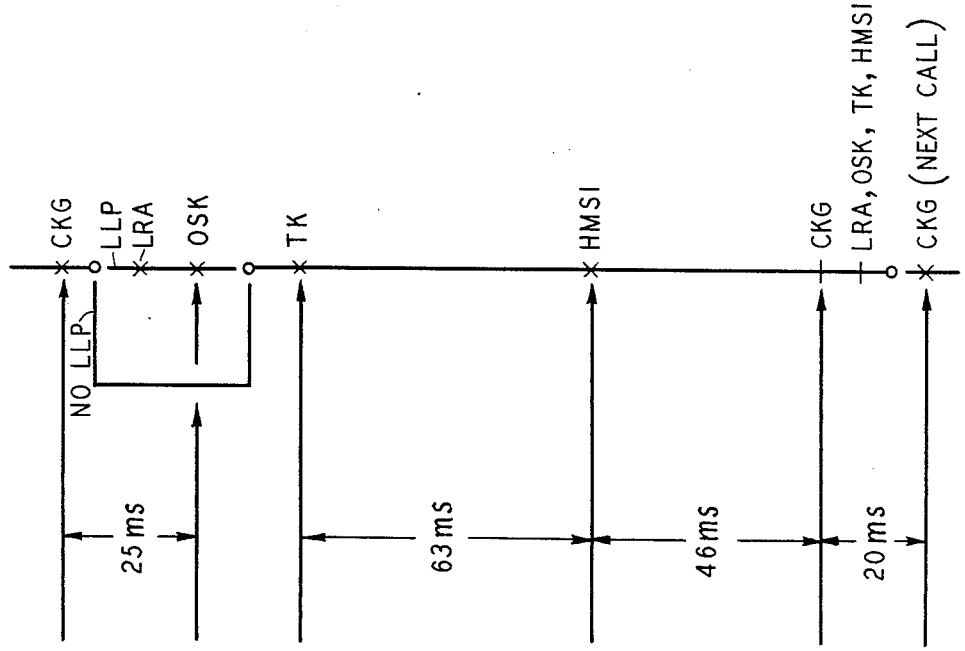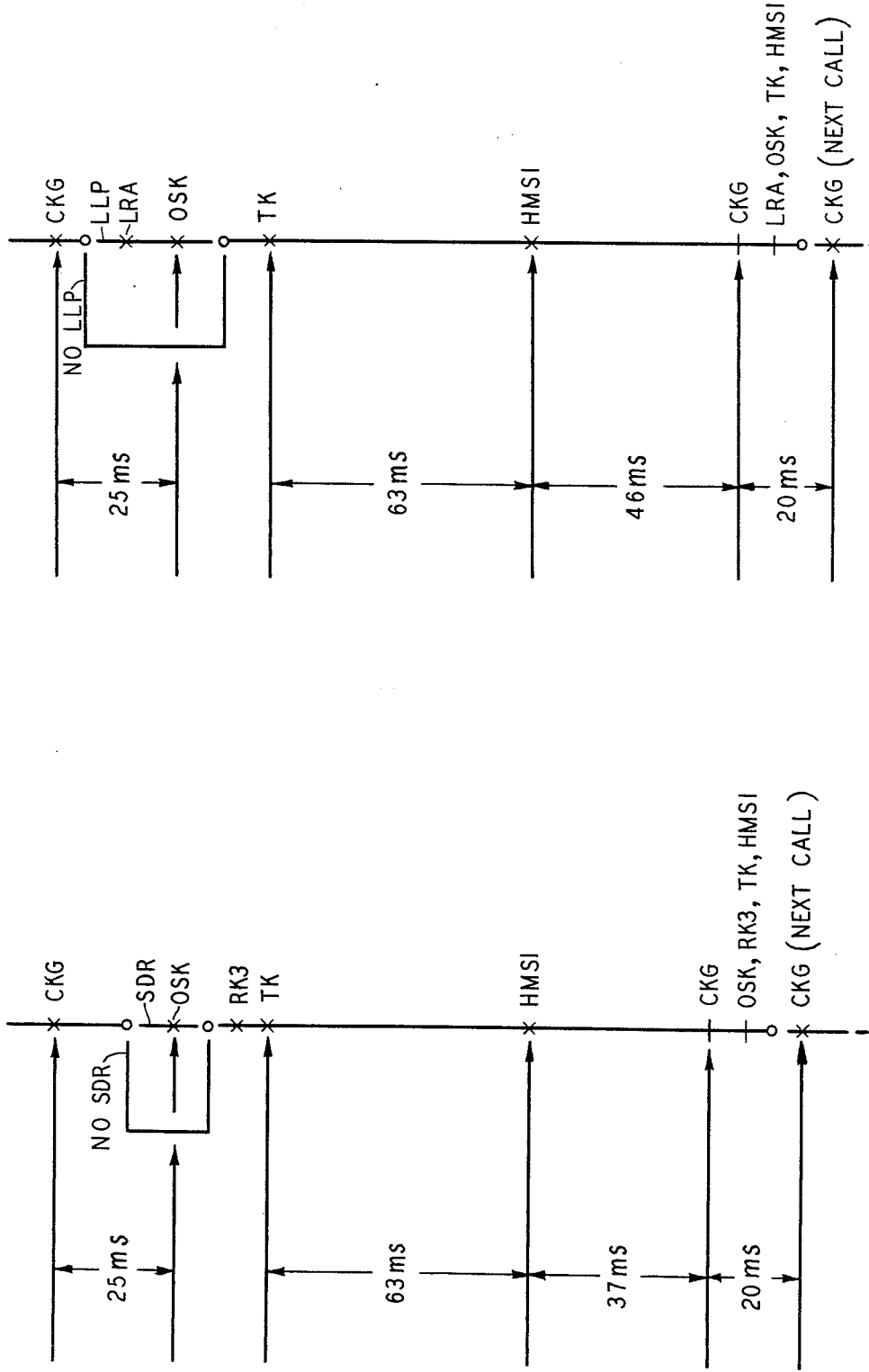

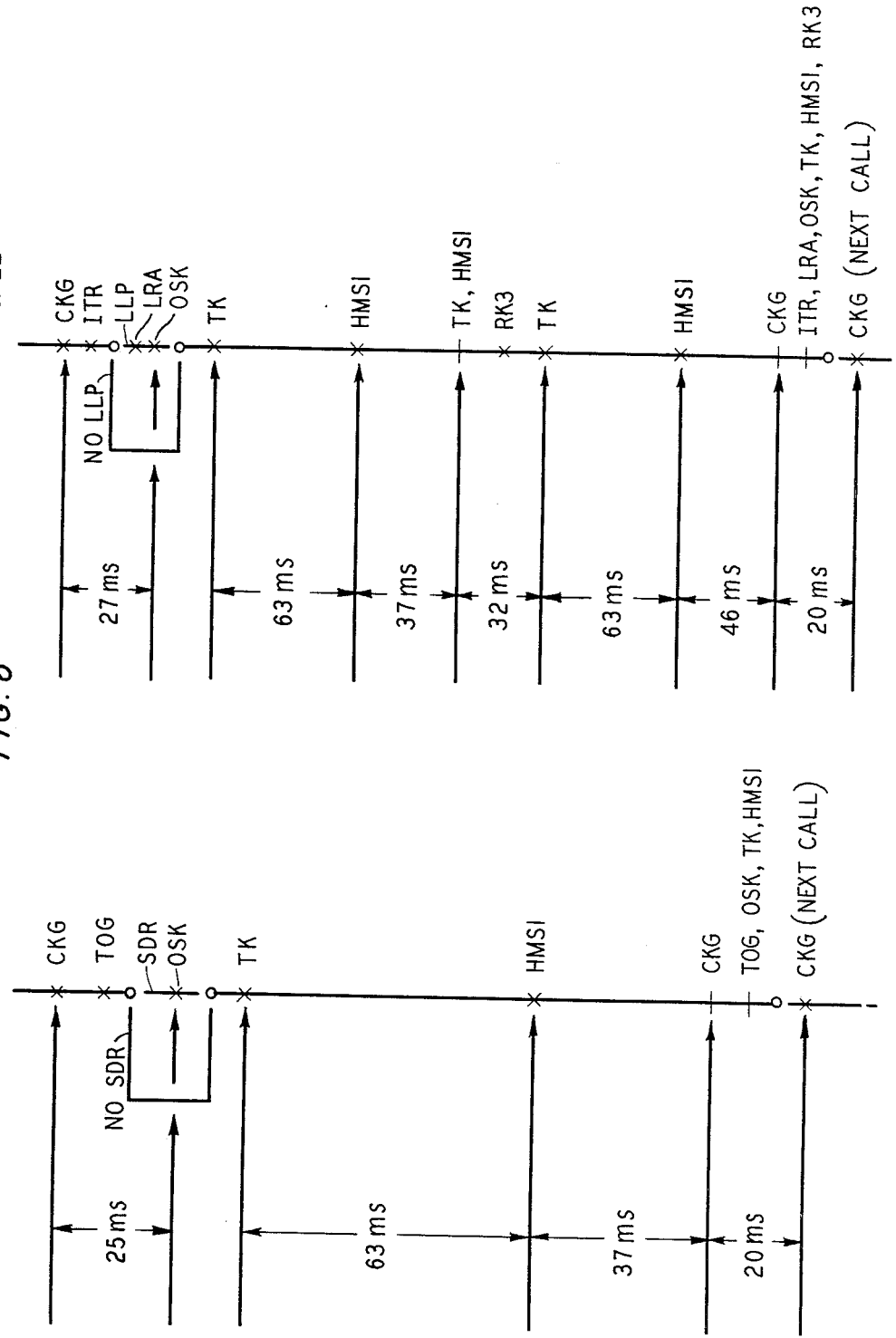

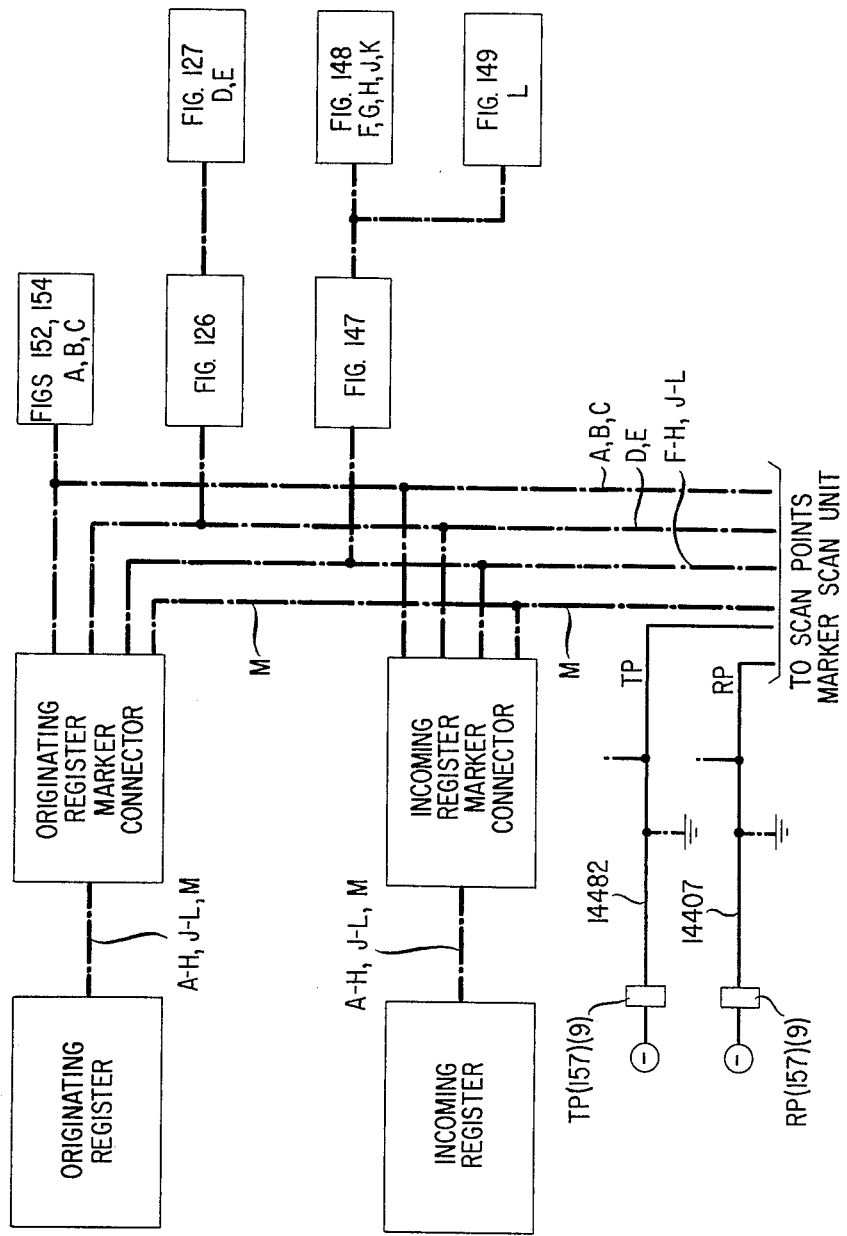

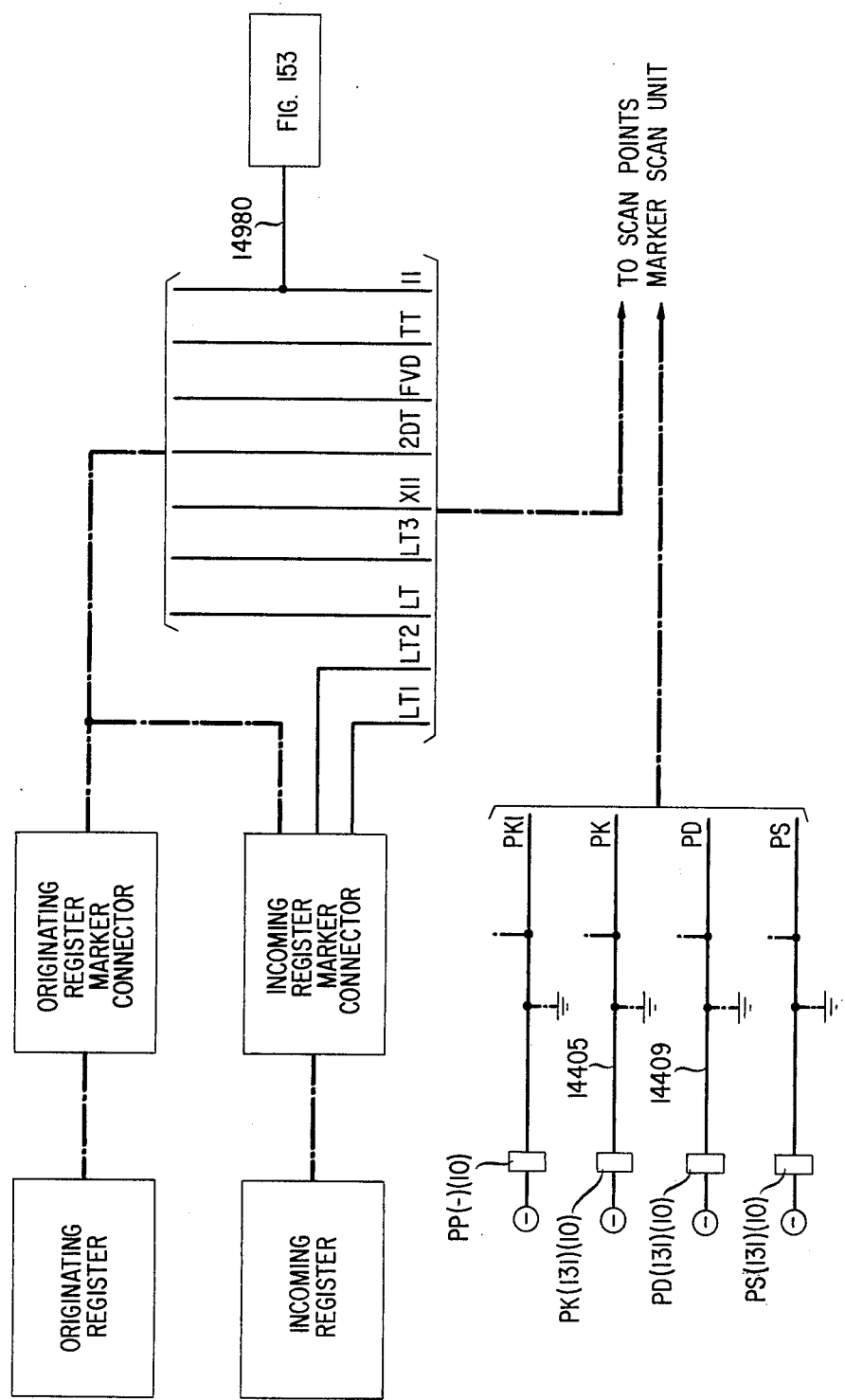

| BIT →<br>WORD ↓ | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 15 | | | | | | | | | | | | | | | | |
| 14 | | | | | | ← RESERVED → | | | | | | | | | | |
| 13 | | | | | | | | | | | | | | | | |
| 12 | NSP | TS19 | TS18 | TS17 | TS16 | TS15 | TS14 | TS13 | TS12 | TS11 | TS10 | TB9 | TB8 | TB7 | TB6 | TB5 |
| 11 | SMP | TS9 | TS8 | TS7 | TS6 | TS5 | TS4 | TS3 | TS2 | TS1 | TS0 | TB4 | TB3 | TB2 | TB1 | TB0 |
| 10 | NOB | FS29 | FS28 | FS27 | FS26 | FS25 | FS24 | FS23 | FS22 | FS21 | FS20 | FS19 | FS18 | FS17 | FS16 | FS15 |
| 9 | OBS | FS14 | FS13 | FS12 | FS11 | FS10 | FS9 | FS8 | FS7 | FS6 | FS5 | FS4 | FS3 | FS2 | FS1 | FS0 |
| 8 | – | HGT9 | HGT8 | HGT7 | HGT6 | HGT5 | HGT4 | HGT3 | HGT2 | HGT1 | HGT0 | VFT4 | VFT3 | VFT2 | VFT1 | VFT0 |
| 7 | – | – | – | – | VGT11 | VGT10 | VGT9 | VGT8 | VGT7 | VGT6 | VGT5 | VGT4 | VGT3 | VGT2 | VGT1 | VGT0 |
| 6 | FUT9 | FUT8 | FUT7 | FUT6 | FUT5 | FUT4 | FUT3 | FUT2 | FUT1 | FUT0 | FTT5 | FTT4 | FTT3 | FTT2 | FTT1 | FTT0 |
| 5 | – | – | – | PKI | PK | PD | PS | TT | FVD | 2DT | XII | II | LT3 | LT2 | LT1 | LT |
| 4 | – | M7 | M4 | M2 | M1 | M0 | L7 | L4 | L2 | L1 | L0 | K7 | K4 | K2 | K1 | K0 |
| 3 | RP | J7 | J4 | J2 | J1 | J0 | H7 | H4 | H2 | H1 | H0 | G7 | G4 | G2 | G1 | G0 |
| 2 | TP | F7 | F4 | F2 | F1 | F0 | E7 | E4 | E2 | E1 | E0 | D7 | D4 | D2 | D1 | D0 |
| 1 | – | C7 | C4 | C2 | C1 | C0 | B7 | B4 | B2 | B1 | B0 | A7 | A4 | A2 | A1 | A0 |
| 0 | CKG | OSK | RK3 | TK | HMSI | ITR | TOG | LPA | MB | MT | – | – | – | – | – | – |

MARKER SCAN UNIT

MARKER CORE BUFFER

| BIT →<br>WORD ↓ | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 17 | | | | | | | | | | | | | | | | |
| 16 | | | | | | | | | | | | | | | | |
| 15 | |←|—|—|—|—|RESERVED|—|—|—|—|—|—|→| | |
| 14 | NSP | TS19 | TS18 | TS17 | TS16 | TS15 | TS14 | TS13 | TS12 | TS11 | TS10 | TB9 | TB8 | TB7 | TB6 | TB5 |
| 13 | SMP | TS9 | TS8 | TS7 | TS6 | TS5 | TS4 | TS3 | TS2 | TS1 | TS0 | TB4 | TB3 | TB2 | TB1 | TB0 |
| 12 | NOB | FS29 | FS28 | FS27 | FS26 | FS25 | FS24 | FS23 | FS22 | FS21 | FS20 | FS19 | FS18 | FS17 | FS16 | FS15 |
| 11 | OBS | FS14 | FS13 | FS12 | FS11 | FS10 | FS9 | FS8 | FS7 | FS6 | FS5 | FS4 | FS3 | FS2 | FS1 | FS0 |
| 10 | - | HGT9 | HGT8 | HGT7 | HGT6 | HGT5 | HGT4 | HGT3 | HGT2 | HGT1 | HGT0 | VFT4 | VFT3 | VFT2 | VFT1 | VFT0 |
| 9 | - | - | - | - | VGT11 | VGT10 | VGT9 | VGT8 | VGT7 | VGT6 | VGT5 | VGT4 | VGT3 | VGT2 | VGT1 | VGT0 |
| 8 | FUT9 | FUT8 | FUT7 | FUT6 | FUT5 | FUT4 | FUT3 | FUT2 | FUT1 | FUT0 | FTT5 | FTT4 | FTT3 | FTT2 | FTT1 | FTT0 |
| 7 | - | - | - | PK1 | PK | PD | PS | TT | FVD | 2DT | XII | I1 | LT3 | LT2 | LT1 | LT |
| 6 | - | M7 | M4 | M2 | M1 | M0 | L7 | L4 | L2 | L1 | L0 | K7 | K4 | K2 | K1 | K0 |
| 5 | RP | J7 | J4 | J2 | J1 | J0 | H7 | H4 | H2 | H1 | H0 | G7 | G4 | G2 | G1 | G0 |
| 4 | TP | F7 | F4 | F2 | F1 | F0 | E7 | E4 | E2 | E1 | E0 | D7 | D4 | D2 | D1 | D0 |
| 3 | - | C7 | C4 | C2 | C1 | C0 | B7 | B4 | B2 | B1 | B0 | A7 | A4 | A2 | A1 | A0 |
| 2 | CKG | OSK | RK3 | TK | HMS1 | ITR | TOG | LRA | MB | MT | - | - | - | - | - | - |
| 1 | - | - | - | - | - | - | TKT | MKT | TF7 | TF4 | TF2 | TF1 | TF0 | FG2 | FG1 | FG0 |
| 0 | RCY<br>FLG | TST CL<br>FLG | - | - | - | ←|—|PRC|—|→| - | - | - | ←|—PM—|→ |

FIG. 18

| BIT → WORD | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|
| 15 | 127 | 126 | 125 | 124 | 123 | 122 | 121 | 120 | 119 | 118 | 117 | 116 | 115 | 114 | 113 | 112 | ↑ CS |
| 14 | 111 | 110 | 109 | 108 | 107 | 106 | 105 | 104 | 103 | 102 | 101 | 100 | 99 | 98 | 97 | 96 | |
| 13 | 95 | 94 | 93 | 92 | 91 | 90 | 89 | 88 | 87 | 86 | 85 | 84 | 83 | 82 | 81 | 80 | |
| 12 | 79 | 78 | 77 | 76 | 75 | 74 | 73 | 72 | 71 | 70 | 69 | 68 | 67 | 66 | 65 | 64 | |
| 11 | 63 | 62 | 61 | 60 | 59 | 58 | 57 | 56 | 55 | 54 | 53 | 52 | 51 | 50 | 49 | 48 | |
| 10 | 47 | 46 | 45 | 44 | 43 | 42 | 41 | 40 | 39 | 38 | 37 | 36 | 35 | 34 | 33 | 32 | |
| 9 | 31 | 30 | 29 | 28 | 27 | 26 | 25 | 24 | 23 | 22 | 21 | 20 | 19 | 18 | 17 | 16 | |
| 8 | 15 | 14 | 13 | 12 | 11 | 10 | 9 | 8 | 7 | 6 | 5 | 4 | 3 | 2 | 1 | 0 | ↓ |
| 7 | 127 | 126 | 125 | 124 | 123 | 122 | 121 | 120 | 119 | 118 | 117 | 116 | 115 | 114 | 113 | 112 | ↑ SI |
| 6 | 111 | 110 | 109 | 108 | 107 | 106 | 105 | 104 | 103 | 102 | 101 | 100 | 99 | 98 | 97 | 96 | |
| 5 | 95 | 94 | 93 | 92 | 91 | 90 | 89 | 88 | 87 | 86 | 85 | 84 | 83 | 82 | 81 | 80 | |
| 4 | 79 | 78 | 77 | 76 | 75 | 74 | 73 | 72 | 71 | 70 | 69 | 68 | 67 | 66 | 65 | 64 | |
| 3 | 63 | 62 | 61 | 60 | 59 | 58 | 57 | 56 | 55 | 54 | 53 | 52 | 51 | 50 | 49 | 48 | |
| 2 | 47 | 46 | 45 | 44 | 43 | 42 | 41 | 40 | 39 | 38 | 37 | 36 | 35 | 34 | 33 | 32 | |
| 1 | 31 | 30 | 29 | 28 | 27 | 26 | 25 | 24 | 23 | 22 | 21 | 20 | 19 | 18 | 17 | 16 | |
| 0 | 15 | 14 | 13 | 12 | 11 | 10 | 9 | 8 | 7 | 6 | 5 | 4 | 3 | 2 | 1 | 0 | ↓ |

TRUNK SCAN UNIT

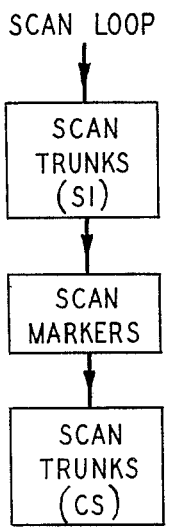
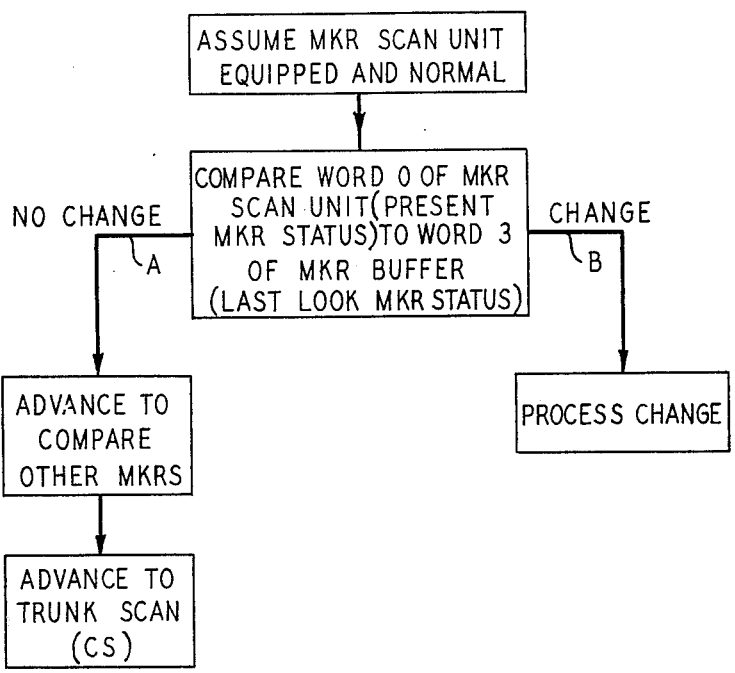
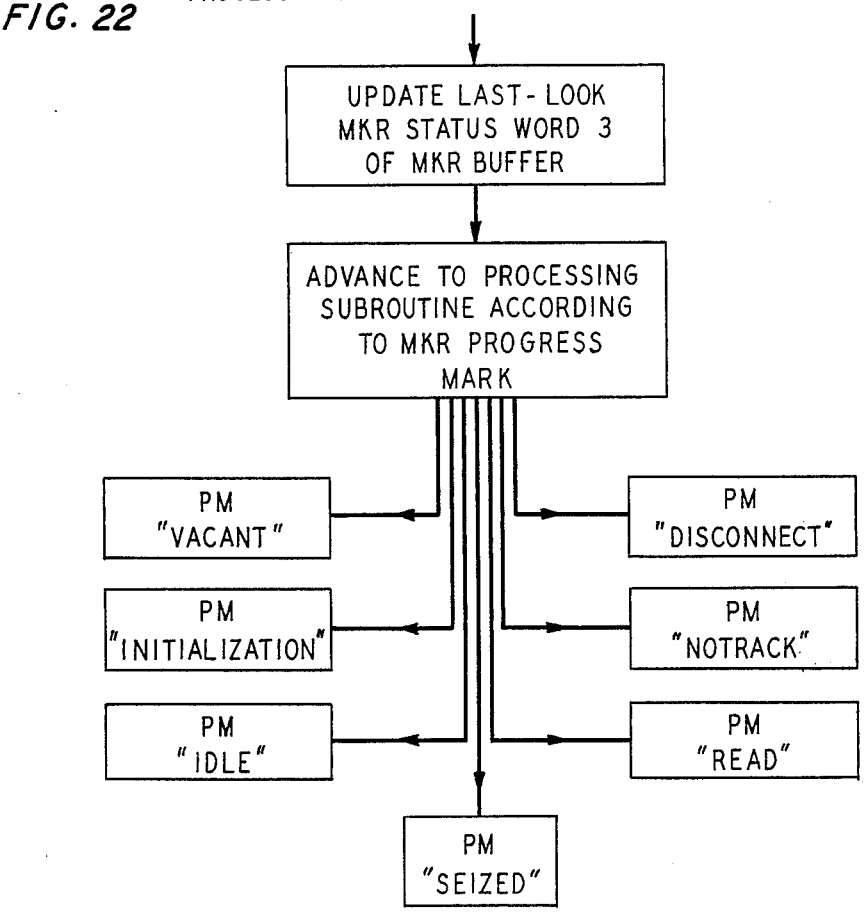

FIG. 33 MARKER DATA PROCESSING

COLLECTING SWITCHING SYSTEM CALL DATA

BACKGROUND OF THE INVENTION

The present invention relates generally to the field of common control switching systems wherein call connection data is collected from a common control circuit used to perform control functions associated with establishing call connections between calling and called circuits.

The present invention relates more particularly to such systems wherein the common control circuit assumes a busy control status when seized for the purpose of performing the control functions, assumes other control statuses while performing the control functions, assumes an idle control status when released after performing the control functions, and includes registration therein of certain call connection data incident to the assumption of certain control statuses.

The present invention relates specifically to an arrangement and method for collecting call connection data from a common control circuit of a common control switching system of the above type.

Heretofore, such arrangements and methods have relied upon the common control circuit to make the necessary control decision indicative of when call connection data should be collected from the common control circuit and to provide a signal to that effect. That is, whatever means or method has been employed to collect such call connection data has been controlled by or from the common control circuit. Thus, the collection of data heretofore has been dependent upon and subject to whatever errors or malfunctions may have occurred within the common control circuit and which consequently may have provided false indications.

The present invention, as summarized below, is an arrangement and method for collecting call connection data in such a manner as to reduce considerably the likelihood of allowing such collection due to false or misleading common control errors or malfunctions.

SUMMARY OF THE INVENTION

The arrangement and method of the present invention provides for deriving from a plurality of circuit parts of the common control circuit a simultaneously existing plurality of binary status signals representing in signal content as a plural bit binary status word the control status of the common control circuit, for deriving from corresponding circuit parts of the common control circuit corresponding binary data signals representing in signal content as plural bit binary data words corresponding call connection data registered in the common control circuit, for repeatedly scanning the derived status word at least as fast as any change can occur in the signal content of the status word, for detecting each change in the signal content of the scanned status word, and scanning and storing data words only if the signal contents of a succession of detected changed status words represent a prescribed succession of changed control statuses.

The above arrangement and method thus examines the changing control status of the common control circuit, as indicated by the changing signal content of the scanned status word, and allows the collection of data words from the common control circuit only if a prescribed succession of changed control statuses occurs. This arrangement and method thus relieves the common control circuit of the decision function as to when data collection should occur; and, by repeatedly examining the status word, whose signal content represents at any time the control status of the common control circuit, the arrangement and method of the invention can make reliable data collection decisions, particularly since that decision depends upon a proper succession of changed control statuses as ascertained externally of the common control circuit.

The arrangement and method of the invention are exemplified herein as embodied in an automatic marker controlled telephone switching system wherein 10 control circuit parts of the marker are scanned to detect the changing control status of the marker as indicated by the group of 10 scanned circuit parts and wherein the marker control status must undergo a prescribed succession of control status changes in order to allow call connection billing data to be collected from the marker.

The exemplary embodiment of the present invention will be understood from the detailed description provided below in connection with the drawing.

BRIEF DESCRIPTION OF THE DRAWING

The drawing consists of 33 sheets containing 44 figures describable briefly as follows:

FIGS. 3 through 6 are simplified sequence charts illustrating the relative changes in control status of a common control marker of FIGS. 1 and 2 as four typical types of call connections are serviced by the marker;

FIGS. 9 through 15 show how a large number of marker data scan points are controlled by various marker data registrations;

FIG. 16 is a diagram showing the bit content of a 16-word by 16-bit marker scan unit (see FIG. 1) and indicating the particular bits and words associated with the marker scan points of FIGS. 8 through 15;

FIG. 17 is a diagram showing the bit content of an 18-word by 16-bit marker buffer area of core memory wherein words 2 through 17 relate to words 0 to 15 of the marker scan unit of FIG. 16 and wherein words 0 and 1 contain data of special significance relating to the processing of changes in the marker control status scan points;

FIG. 18 is a diagram showing the CS and S1 trunk scan point bit positions in a 16-word by 16-bit trunk scan unit (see FIG. 1) for up to 128 trunks;

FIG. 20 is a general flow diagram showing the time sequence of that part of the scanloop program involving the scanning of trunk S1 scan points, of marker scan points, and of trunk CS scan points;

FIG. 21 shows part of the marker scanloop program whereby a change, if any, in marker control status is detected;

FIG. 22 shows a continuation from FIG. 21 of the marker scanloop program and part of the marker data processing program to the point of selecting the proper subroutine according to the Marker Progress Mark (MKRPM):

DETAILED DESCRIPTION

Figure 23:
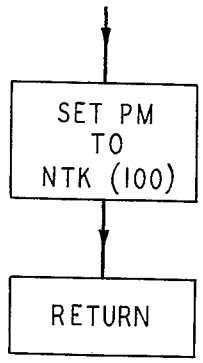
FIGS. 23 through 29 show all of the various MKRPM subroutines of FIG. 22 except for the MKRPM of "READ"

The detailed description of the exemplary embodiment of the invention is set forth below under a number of underlined headings as follows:
General Description
This section relates primarily to FIGS. 1 and 2.
Subscriber Outgoing Call
This section relates primarily to FIG. 3.
Terminating Call
This section relates primarily to FIG. 4.
Tandem Outgoing Call
This section relates primarily to FIG. 5.
Intraoffice Call
This section relates primarily to FIG. 6.
Billing Data Marker Registration
This section relates primarily to FIGS. 3 through 6.
Trunk Scan Points
This section relates primarily to FIGS. 7 and 18.
Marker Control Status Points
This section relates primarily to FIGS. 8 and 16.
Marker Data Scan Points
This section relates primarily to FIGS. 9 through 16.
Marker Buffer Area
This section relates primarily to FIG. 17.
Trunk Core Register
This section relates primarily to FIG. 19.
Circuit Symbols
This section relates primarily to FIG. 35.
Bus Converter
This section relates primarily to FIGS. 36 through 39.
Scan Unit
This section relates primarily to FIGS. 40 through 44.
Processor and Memory Units
This section relates primarily to FIGS. 30 and 31.
Scanloop Program — Generally
This section relates to FIG. 20.
Marker Scanloop Program
This section relates to FIGS. 21, 22, 32 and 33.
Marker Data Processing Subroutine — Generally
This section relates to FIGS. 22 and 33.
MKRDP Subroutine VCT (110 or 111)
This section relates to FIG. 23.
MKRDP Subroutine INL (101)
This section relates to FIG. 24.
MKRDP Subroutine IDL (000)
This section relates to FIG. 25.
MKRDP Subroutine DISC (011)
This section relates to FIG. 26.
MKRDP Subroutine NTK (100)
This section relates to FIG. 27.
MKRDP Subroutine SZD (011)
This section relates to FIGS. 28, 29, 33 and 34.
MKRDP Subroutine RD (010)
This section is not illustrated in detail on the drawing.

GENERAL DESCRIPTION

Figure 1:
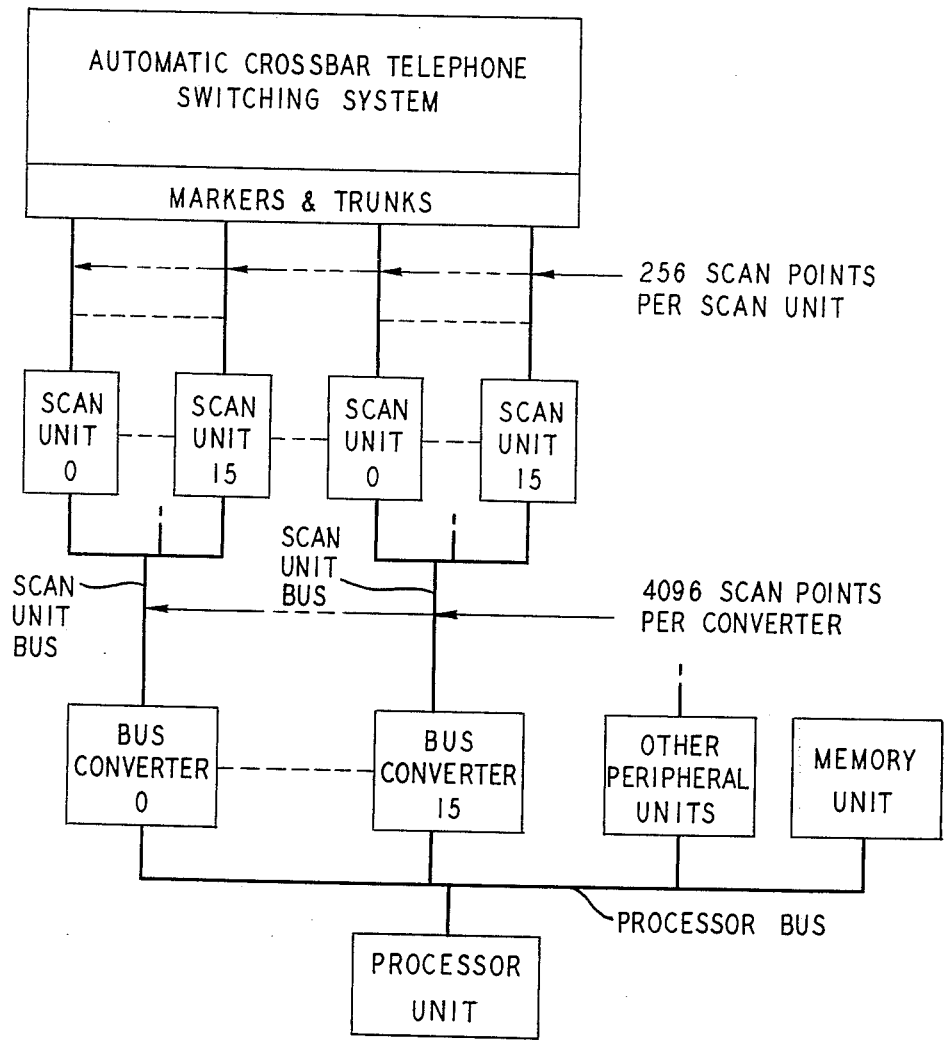
FIG. 1 is a block diagram illustrating the general functional arrangement of a processor system for scanning and collecting data from markers and trunks of an automatic crossbar telephone switching system.

FIG. 1 is a block diagram illustrating the functional interconnection of scan units with markers and trunks of a crossbar telephone switching system, of scan units with bus converter peripheral units over scan unit buses, and of a memory unit and other peripheral units with a processor unit over a processor bus.

Figure 2:
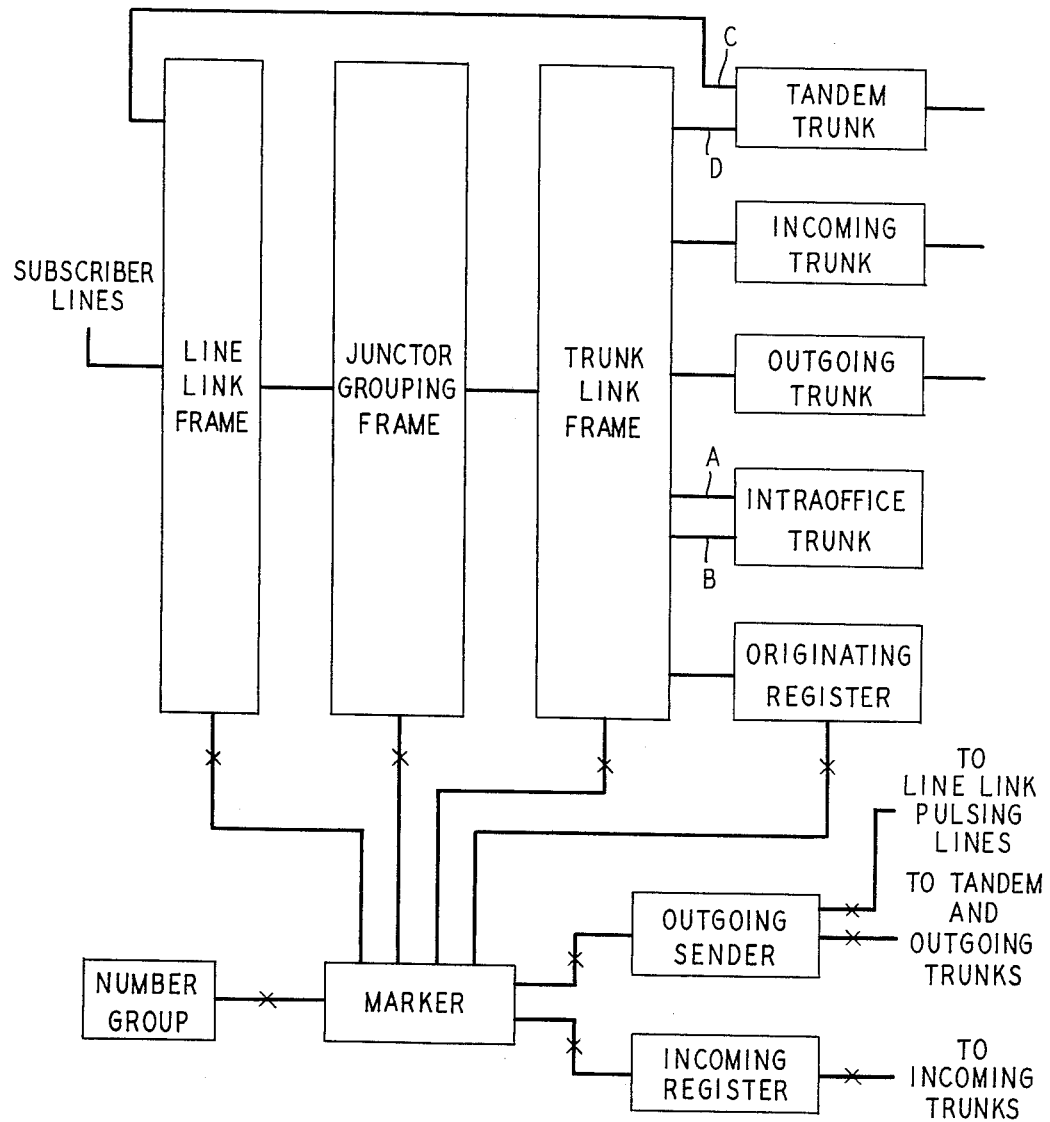
FIG. 2 is a block diagram of a typical crossbar switching system of FIG. 1.

The switching system of FIG. 1, as shown in a more detailed block diagram in FIG. 2 is, and as described below, the well-known Bell System No. 5 Crossbar System supplied by Western Electric Company. An early version of No. 5 Crossbar is disclosed in complete detail in U.S. Pat. No. 2,585,904 to A. J. Busch of Feb. 19, 1952. Also U.S. Pat. No. 2,587,817 to A. J. Busch et al. of Mar. 4, 1952 relates particularly to that part of No. 5 Crossbar used as a through-tandem switching office; and, U.S. Pat. No. 2,535,661 to A. O. Adam, Jr. et al. of Dec. 26, 1950 relates particularly to that part of No. 5 Crossbar used to locally terminate an incoming trunk call. Also, U.S. Pat. No. 3,264,415 to T. V. Burns et al. of Aug. 2, 1966 relates particularly to No. 5 Crossbar wherein so-called line link pulsing is employed, line link pulsing referring to the use of senders with line link frames for pulsing over a customer line which extends, for example, to a remote automatically controlled private branch exchange (PBX), which in turn requires sender control from the main switching office. The above Busch, Busch et al., Adam, Jr. et al., and Burns et al. patent disclosures are incorporated herein by reference.

The processor unit and the memory unit of FIG. 1, and as shown in some detail in block diagram form in FIGS. 30 and 31, and as described later, represent the Digital Equipment Corporation (DEC) PDP 11/40 system using the PDP 11 processor. This processor system is well known as disclosed in U.S. Pat. Nos. 3,614,740 to B. A. Delagi et al. of Oct. 19, 1971, 3,614,741 to H. L. McFarland, Jr. et al. of Oct. 19, 1971, 3,710,324 to J. B. Cohen et al. of Jan. 9, 1973, and 3,815,099 to J. B. Cohen et al. of June 4, 1974, and as disclosed in the DEC PDP 11 Processor Handbook and the DEC PDP 11 Peripherals Handbook, both copyrighted by Digital Equipment Corporation in 1973, and in such handbooks copyrighted by Digital Equipment Corporation prior to 1973. The disclosures of the above DEC patents and handbooks are incorporated herein by reference.

The bus converters and scan units of FIG. 1 are discussed in detail hereinafter in connection with FIGS. 35 to 44. A bus converter responds to an address transmitted over the processor bus from the processor unit to allow one of its scan units to be enabled in response to part of the same address. The enabled scan unit is controlled by part of the same address to read a row (or word) of scan points. Each scan unit consists of 16 rows (words) of 16 scan points each. One marker scan unit, as illustrated in FIG. 16, uses thirteen of its sixteen words to accommodate the 10 marker control status leads of FIG. 8 and the 182 marker data leads of FIGS. 9 to 15, as will be explained. One trunk scan unit, as illustrated in FIG. 18, uses all 16 of its words to accommodate two trunk leads (see FIG. 7) for each of up to 128 trunks, as will be explained.

Under the proper circumstances, as described hereinafter, the processor unit causes the scanning of the marker (MKR) control status leads (i.e., the MKR Status Word) of FIG. 8 (Word 0 of the MKR Scan Unit of FIG. 16) fast enough to detect any change in the signal content thereof. Each detected changed MKR Status Word is placed in Word 2 of the MKR Buffer Core Area shown in FIG. 17. Then, the processor unit processes the change in the MKR Status Word and sets the MKR Progress Mark (MKRPM) in bits 2 to 0 of Word 0 of the MKR Buffer Area to indicate the MKR Control Status according to the changed MKR Status Word. When the MKRPM is set to SEIZED (bits 2 to 0 of 011) because of a changed MKR Status Word, the next change in the MKR Status Word will allow the processor unit to scan words 1 to 15 of the MKR Scan Unit (FIG. 16) and to read that scanned MKR data into Words 3 to 17 of the MKR Buffer Area (FIG. 17) provided that next changed MKR Status Word contains a prescribed signal content, as will be explained. The MKR data read into the MKR buffer includes such items of information as the called circuit identity, pulse checking signals, calling circuit identity, trunk identity, and miscellaneous traffic and translation data.

The processor also causes the scanning of the CS and S1 leads of all trunks (FIG. 7) by means of the trunk scan units (FIG. 18).

The data in the MKR Buffer Area, along with the trunk CS and S1 data, eventually is deposited in a Trunk Core Register (FIG. 19) for the particular trunk involved. From the Trunk Core Register, the processor unit completes the billing processing, when required, for the call in question.

FIGS. 3 to 6 are simplified sequence charts illustrating the main MKR control status changes (with approximations of the timing) which occur during four types of calls; a Subscriber Outgoing Call (FIG. 3), a Terminating Call (FIG. 4), a Tandem Outgoing Call (FIG. 5), and an Intraoffice Call (FIG. 6).

A Subscriber Outgoing Call in No. 5 Crossbar, as outlined later with respect to FIG. 3, is a call placed from a local terminating subscriber as the calling party to some destination outside of the local switching office by way of an outgoing trunk. When the calling line goes off-hook to place the call, an idle marker attaches itself to the line link frame, identifies the calling line, connects the calling line to an idle originating register, passes the calling line identity to the originating register, and returns to an idle condition. The originating register supplies dial tone to the calling party and receives the called number dialed (or signaled by TOUCHTONE service et cetera) by the calling party. When the originating register has received enough of the called number to allow a marker to initiate establishment of the desired call connection, the originating register seizes an idle marker, passes all pertinent information to the marker, and releases to an idle condition. The marker then establishes a connection from the calling line to an outgoing trunk and releases to an idle condition, an outgoing sender being attached to the trunk on the trunk link frame when outpulsing is required over the trunk.

A Terminating Call in No. 5 Crossbar, as outlined below with respect to FIG. 4, is a call incoming over an incoming trunk to a local terminating called line. When a calling condition exists in the incoming trunk, an incoming register link connects the calling trunk to an idle incoming register at the trunk link frame. The incoming register identifies the incoming trunk and signals the remote calling office to forward the called number by any known means, such as dial pulsing or MF (Multifrequency) signaling, et cetera. When the incoming register has received the called number, it seizes an idle marker and passes all pertinent information to the marker. The marker then consults a number group circuit for the line link frame location of the called line, establishes a connection from the incoming trunk to the called line, and releases to an idle condition, an outgoing sender being attached to the called line on the line link frame when line link pulsing is required over the called line (e.g., to an automatically controlled remote private branch exchange PBX).

A Tandem Outgoing Call in No. 5 Crossbar, as outlined below with respect to FIG. 5, is a call incoming over a tandem trunk to be switched through the local office and out over an outgoing trunk. When a calling condition exists in a tandem trunk, an incoming register link connects the trunk to an incoming register via the D trunk termination. The incoming register identifies the trunk, receives the called number from the originating office, seizes an idle marker, and passes all pertinent information to the marker. The marker, being informed of the nature of the calling trunk, consults a number group circuit to ascertain the line link location of the C trunk termination and seizes an idle outgoing trunk (with an outgoing sender if required). Then the marker establishes the connection, by interconnecting the C trunk termination on the line link frame to the selected outgoing trunk, and releases to an idle condition.

An Intraoffice Call in No. 5 Crossbar, as outlined below with respect to FIG. 6, is a call from a locally terminating calling line to another locally terminating called line. As described above with respect to the Terminating Call, line link pulsing may require the use of a sender on the line link frame. Otherwise, the switching functions amount to connecting the calling line to one input (such as A in FIG. 2) of an intraoffice trunk and connecting the called line to the other input (such as B in FIG. 2) of the same intraoffice trunk. During these marker switching functions, a recycle takes place within the marker in order for it to perform the two switching network connections.

During the course of any of these above types of calls, the marker will assume various control statuses as it performs the various control functions during the establishment of the call connection. Also, the marker will have registered therein certain groups of data incident to the assumption of certain control statuses. Prior to the final release of the marker, after having established the desired call connection, all data required for billing purposes (except answer and disconnect times for the call duration) will have been registered at one time or another in the marker. This billing data, generally identifiable as Initial entry type of data as in the well-known AMA (Automatic Message Accounting) systems, is the data which can be collected by the processor unit, as above outlined with respect to FIG. 1, assuming, as will be described in detail later, that a proper succession of changed marker control statuses occurs.

SUBSCRIBER OUTGOING CALL

FIG. 3 is a simplified sequence chart indicating significant marker control status changes (with approximate timing indications as shown in milliseconds, such as 25 ms, etc.) which occur during the time a No. 5 Crossbar marker is busy performing the control functions necessary to establish the indicated type of connection. Time duration runs from top to bottom in the chart with an x across the timing line indicating the grounding of a marker control status scan point (see FIG. 8) due to the operation of a marker relay and a dash across the timing line indicating the ungrounding of a marker control status scan point due to the release of a relay (or relays). A call of this type is one placed from a local terminating subscriber as the calling party to some destination outside of the local switching office via an outgoing trunk. The grounding of scan point CKG signifies that the marker has been seized by an originating register at which time the originating register will cause to be registered in the marker certain groups of data such as the called number, calling line identity, pulse checking information, and the type of call connection involved. An outgoing sender may or may not be required depending on the destination of the call. The chart of FIG. 3 shows that the OSK scan point will be grounded only if a sender is selected by the marker. If a sender is selected, the grounding of scan point OSK also indicates that the marker has registered therein certain groups of data related to sender identification. Thereafter, the RK3 scan point will be grounded when the marker has preceded to the point where it is necessary to start the operations of connecting a selected outgoing trunk back to the calling line through a selected switching network channel. The grounding of scan point TK indicates that called circuit identity (trunk identification) data is registered in the marker as a result of the marker having selected a suitable outgoing trunk. Thereafter, the grounding of scan point HMS1 occurs when the marker is starting to operate the hold magnets on the various crossbar switch network parts for completing a network channel connection between the calling line and the outgoing trunk.

In the exemplary disclosure of the present invention, the grounding of the scan point HMS1 at the end of the indicated sequence is used as the key signal for the processor unit to collect billing data from the marker assuming that the marker control status is such as to allow such data collection, as will be explained.

Eventually, when the marker has completed its control functions, scan point CKG will be ungrounded, followed eventually by the ungrounding of the other grounded marker scan points, thus rendering the marker idle and available to be seized (next grounding of the CKG scan point) on the next call.

On this type of call, the marker billing data is read into the processor unit (assuming a proper sequence of marker control statuses as will be explained) since such a call may be chargeable to the local calling subscriber.

TERMINATING CALL

FIG. 4 is a simplified sequence chart indicating significant marker control status changes (with approximate timing indications) which occur during the time a No. 5 Crossbar marker is busy performing the control functions necessary to establish the indicated type of connection. A call of this type is one incoming (over an incoming trunk) to the local switching office for termination at a local terminating subscriber as the called party. The grounding of scan point CKG has the same significance as in the previously described Subscriber Outgoing Call except that the circuit which seizes the marker is an incoming register which serves calls incoming over incoming trunks. Here, the marker has registered therein the called number, the identity of the incoming trunk (the calling circuit here), et cetera. Scan point LRA is grounded only in those cases where a sender (grounded scan point OSK) is required to effect outpulsing to the called subscriber, which may require the use of a line or tie trunk to a private branch exchange (PBX) for example. If scan points LRA and OSK are grounded they indicate the presence in marker registers of certain data regarding sender identity, et cetera. The rest of the call proceeds essentially as in the case of the Subscriber Outgoing Call except that the RK3 scan point does not become grounded.

On this type of call, the marker billing data is not read into the processor unit, as will be explained, since a call of this nature is not chargeable in the local switching office. The latter is ascertained by the lack of a grounded scan point RK3 and by other significant marker control status indicators.

TANDEM OUTGOING CALL

FIG. 5 is a simplified sequence chart indicating significant marker control status changes (with approximate timing indications) which occur during the time a No. 5 Crossbar marker is busy performing the control functions necessary to establish the indicated type of connection. A call of this type is one incoming over a tandem trunk to be switched through the local switching office to a destination reached over an outgoing trunk. This sequence finds relay operations similar to the ones described in connection with the Subscriber Outgoing Call and the Terminating Call. Here, however, the lack of a grounded scan point RK3 coupled with the grounding of scan point TOG (indicating that this is a Tandem Outgoing Call) will cause the reading of marker billing data by the processor unit only if the switching functions are being performed by a marker having associated therewith the capability of performing tandem AMA functions in the local switching office, as will be explained.

INTRAOFFICE CALL

FIG. 6 is a simplified sequence chart indicating significant marker control status changes (with approximate timing indications) which occur during the time a No. 5 Crossbar marker is busy performing the control functions necessary to establish the indicated type of connection. A call of this type is one placed from a calling line to a called line where both lines are terminated in the local switching office.

As shown in FIG. 6 scan point ITR is found to be grounded early in the marker cycle to indicate that this call is of the intraoffice type. Other than that difference, the sequence shown in FIG. 6 involves essentially the same control status signal conditions as in the other types of call, above discussed, except that scan points TK and HMS1 are found to be grounded and ungrounded twice, the second such grounding of scan points TK and HMS1 being preceded by a grounded scan point RK3, which did not occur prior to the first such grounding of scan points TK and HMS1. The first groundings of scan points TK and HMS1 are associated with the marker functions involved in establishing the called end of the connection from one input (such as B FIG. 2) of an intraoffice trunk to the called line (with or without the use of a sender); whereas, the second groundings of scan points TK and HSM1 are associated with the marker functions involved in establishing the calling end of the connection from another input (such as A in FIG. 2) of the same intraoffice trunk to the calling line. Here, the processor unit can collect marker billing data, as will be discussed, only incident to the second grounding of scan point HMS1 due primarily to the fact that such grounding of scan point HMS1 was preceded by the grounding of scan point RK3.

BILLING DATA MARKER REGISTRATION

With reference to the previous discussions of the four types of calls illustrated in FIGS. 3 to 6, certain groups of call connection billing data become registered in the marker at certain times incident to the assumption by the marker of certain control statuses.

In all cases, the grounding of the CKG scan point signifies the seizure of the marker by an originating register on Subscriber Outgoing and Intraoffice Calls and by an incoming register on Terminating and Tandem Outgoing Calls. In all cases, the marker seizure is accompanied by the registration in the marker of such data as the called number and the calling circuit identity.

In those cases where a sender may be used, such as any of the four types of calls, the grounding of the OSK scan point is indicative that at that time the marker has registered therein certain data identifying the particular sender used.

In the cases of the Subscriber Outgoing, Tandem Outgoing, and Intraoffice Calls, the first grounding of the TK scan point signifies that the marker has registered therein the identity of the trunk used.

In the case of the Terminating and Intraoffice Calls, the grounding of scan point TK not preceded by the grounding of scan point RK3 indicates that the called line identity data is registered in the marker.

In the case of the Subscriber Outgoing and Intraoffice Calls, the grounding of the TK scan point preceded by the grounding of the RK3 scan point indicates that the calling line identity data is registered in the marker.

In the case of the Subscriber Outgoing and Intraoffice Calls, the grounding of the HMS1 scan point preceded by the grounding of the TK and RK3 scan points indicates that all pertinent data is still registered in the marker except for sender data, which probably no longer exists by that time.

In the case of the Tandem Outgoing Call, the grounding of the HMS1 scan point preceded by the grounding of the TK scan point, and without scan point RK3 having been grounded, indicates that all pertinent data is still registered in the marker except for sender data, which probably no longer exists by that time.

As will be seen from the above, those certain groups of billing data which are registered in the marker incident to the assumption by the marker of certain control statuses are not so registered at the same time. Thus, the significant grounding of the HMS1 scan point in each case is used in the present embodiment as the main indicator as to when the processor unit should attempt to read the billing data registered in the marker, since at that time all data necessary for billing purposes should be available even though other data may not be available.

TRUNK SCAN POINTS

Figure 7:
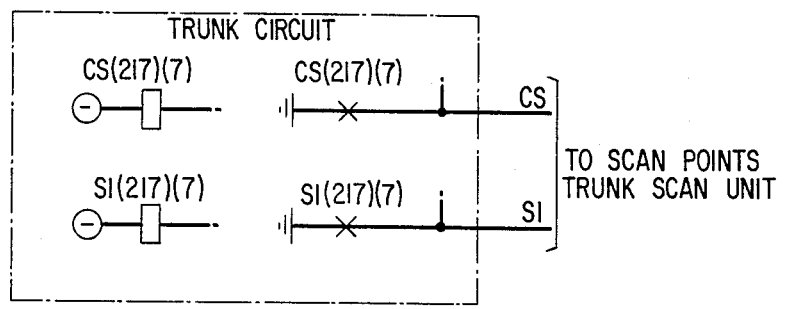
FIG. 7 shows how the CS (called supervision) and S1 (trunk seizure) scan points of a typical trunk are controlled by trunk circuitry.

FIG. 7 illustrates the nature of scan points for a typical trunk circuit which may be used to establish a call connection for which billing data may be required. A typical trunk, such as in No. 5 Crossbar, will include at least two relays the condition (operated or released) of which at any particular time indicates whether or not the trunk has been seized by a calling circuit, such as a calling subscriber, and whether or not the trunk has received answer supervision from a called circuit, such as a called subscriber, and whether or not the trunk has received disconnect supervision, such as the end (i.e., the end of the conversation time) of an established call connection.

In FIG. 7 are shown the windings of relays CS(217)(7) and S1(217)(7), which are the respective called and calling supervisory relays of the trunk. As will be the case throughout the present disclosure, the first parenthesis includes the number of the figure wherein the indicated relay is shown in the Busch U.S. Pat. No. 2,585,904; and, the second parenthesis includes the number of the figure where the same relay is shown herein. Relay S1(217)(7) is operated to provide a grounded lead S1 over a make contact (an X across the lead to signify a contact which closes the circuit when the relay is operated and opens the circuit when the relay is released) of relay S1(217)(7) to a trunk scan unit as an indication that the trunk has been seized. When a called circuit answers a trunk connection, the trunk CS(217)(7) relay operates to provide a grounded lead CS over a make contact of relay CS(217)(7) to the trunk scan unit as an indication that the call connection using that trunk has been answered by a called circuit. As will be explained later in connection with a description of the scan units of FIG. 1, the signals on the trunk scan points are either ground or open circuit to represent respectively operated or released relays CS(217)(7) and S1(217)(7).

Regarding a trunk scan unit (see FIG. 18), 128 trunks may have their S1 and CS scan points terminating in a single 16-bit by 16-word scan unit. For instance in FIG. 18, the S1 and CS scan points for trunk 0 will appear respectively in bits 0 of words 0 and 8 of a trunk scan unit, et cetera. As will be understood in connection with a subsequent description of scan units, a scan of word 0 of the trunk scan unit of FIG. 18 results in the scan reading of the S1 scan points of 16 trunks (0 to 15), et cetera, and a scan of word 8 of the trunk scan unit of FIG. 18 results in the scan reading of the CS scan points of the same 16 trunks (0 to 15).

MARKER CONTROL STATUS SCAN POINTS

Figure 8:
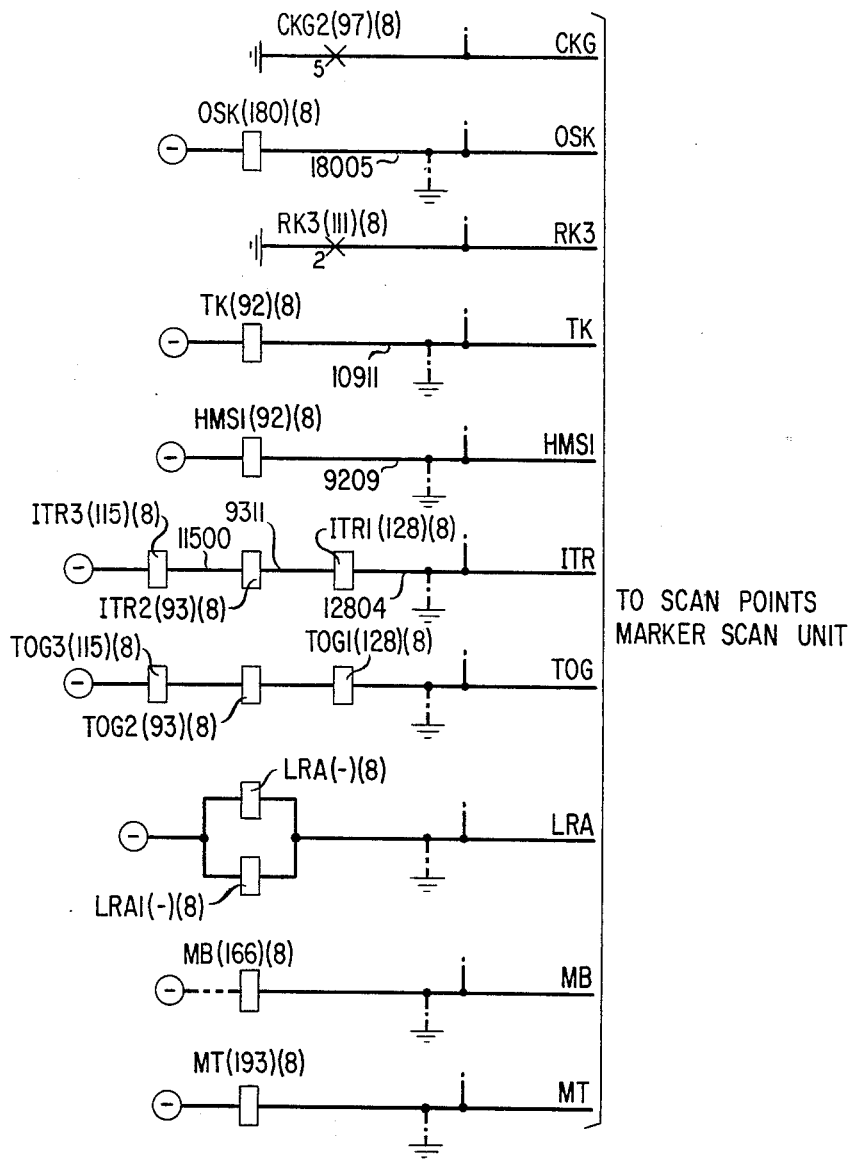
FIG. 8 shows how the 10 marker control status scan points are controlled by significant parts of the marker circuitry.

FIG. 8 shows 10 circuit parts of a marker of No. 5 Crossbar which are considered as marker control status indications. Here, as also in FIGS. 9 to 15, where a lead is numbered, the number corresponds to the same numbered lead in Busch U.S. Pat. No. 2,585,904. The indications on these 10 leads, as is apparent, are either ground or open circuit or minus 48 volts direct current (the positive terminal assumed to be grounded) through some impedance (this will be referred to as minus 48 volts for simplification). The condition of the status lead may come about in one of two ways. For instance, when relay CKG2(97)(8) is released, its make contact 5 is open and the status lead CKG is open circuited; but, when relay CKG2 is operated, its make contact 5 closes to ground the status lead CKG. Also, when relay OSK(180)(8) is not operated, its operating lead 18OO5 is at minus 48 volts, as is status lead OSK; whereas, when relay OSK(180)(8) is operated, its lead 18OO5 is grounded through a circuit not shown (dotted line) and the status lead OSK is also grounded. Similar situations prevail for the other eight status leads TK through MT. The minus sign in the first parenthesis of a relay reference numeral, such as for relay LRA(−)(8), indicates that such relay is not found in the Busch U.S. Pat. No. 2,585,904 but is also well known as existing in later versions of No. 5 Crossbar. These status leads appear as scan points in the scan unit for this marker (see FIG. 16) in word 0 (Marker STatus Word) at bits 6 through 15 in the order MT, MB, LRA, TOG, ITR, HMS1, TK, RK3, OSK and CKG. The significance of these status indicators is briefly as follows:

CKG . . . This lead is grounded whenever the marker is off-normal, signifying that the marker is in a busy condition. If the lead is open circuited, it is presumed that the marker either has not been made busy or has started to release from a busy condition.

OSK . . . This lead is grounded when a sender has been selected by the marker.

RK3 . . . This lead is grounded to indicate that the equipment location (line link frame) of the calling circuit is registered in the marker.

TK . . . This lead is grounded when the marker has performed all functions necessary for initiating channel selection (the proper path through the switching network of FIG. 2 between calling and called circuits).

HMS1 . . . This lead is grounded when the marker begins to actually effect the channel connection (apply operating potential to the crossbar switch hold magnets throughout the network).

ITR . . . This lead is grounded to indicate when the marker is functioning on a call connection for an Intraoffice Call.

TOG . . . This lead is grounded to indicate that the marker is functioning on a call connection for a Tandem Outgoing Call.

LRA . . . This lead is grounded to indicate that the marker is functioning on a call involving line link pulsing (use of senders on the line link frames).

MB . . . This lead is grounded to indicate that the marker is in a maintenance-busy condition.

MT . . . This lead is grounded whenever the marker is functioning on a test call.

MARKER DATA SCAN POINTS

FIGS. 9 through 15 show circuit parts of the No. 5 Crossbar marker where the scan points for words 1 through 12 of the marker scan unit of FIG. 16 originate.

The called digits A to H and J to M (i.e., up to a maximum of 12-only 11 are shown in the Busch U.S. Pat. No. 2,585,904) are obtained from various registers of the marker, each digit in a two-out-of-five code, to appear in the indicated bit positions of the scan words 1 through 4 as shown in FIG. 16. For instance, the A digit appears as two grounded ones of five leads A0, A1, A2, A4 and A7 which appear as scan points in respective bits 0 to 4 of word 1 of the marker scan unit as in FIG. 16, et cetera. The data leads TP and RP in FIG. 9, which indicate respectively the tip and ring calling party, appear as in FIG. 16 as scan points in bits 15 of respective scan words 2 and 3.

The scan word 5 of FIG. 16 includes in bit positions 12 to 0 the following marker data (various call type translation indexes) as shown in FIG. 10 (only leads 11, PK1, PK, PD and PS being identified in the Busch U.S. Pat. No. 2,585,904):

LT . . . The grounding of this lead indicates that the call is an originating, seven or 10 called digit, no prefix, station to station call.

LT1 . . . This lead (i.e., the grounding of the lead) indicates the same as the LT lead except that the call involves a prefix "1".

LT2 . . . This lead indicates the same as lead LT except that the call is a special service call involving a prefix "0".

LT3 . . . This lead indicates the same as lead LT except that the call is a private network call involving a prefix "8".

11 . . . This lead indicates a service code prefix "11".

X11 . . . This lead indicates an originating CENTREX station to station call involving four called digits.

2DT . . . This lead indicates either an originating CENTREX "1XX" call or an incoming six digit call.

FVD . . . This lead indicates either an originating CENTREX station to station call involving five digits or an incoming five digit call.

TT . . . This lead indicates an incoming 10 digit call.

PS . . . This lead indicates that the call involves a permanent signal condition.

PD . . . This lead indicates a partial dial condition.

PK . . . This lead indicates a proper pulsing check; that is, no permanent signal or partial dial condition prevails.

PK1 . . . This lead indicates a proper pulsing check, as with lead PK, but also the presence of a special service request (e.g., PICTUREPHONE service, etc.).

Figure 11:
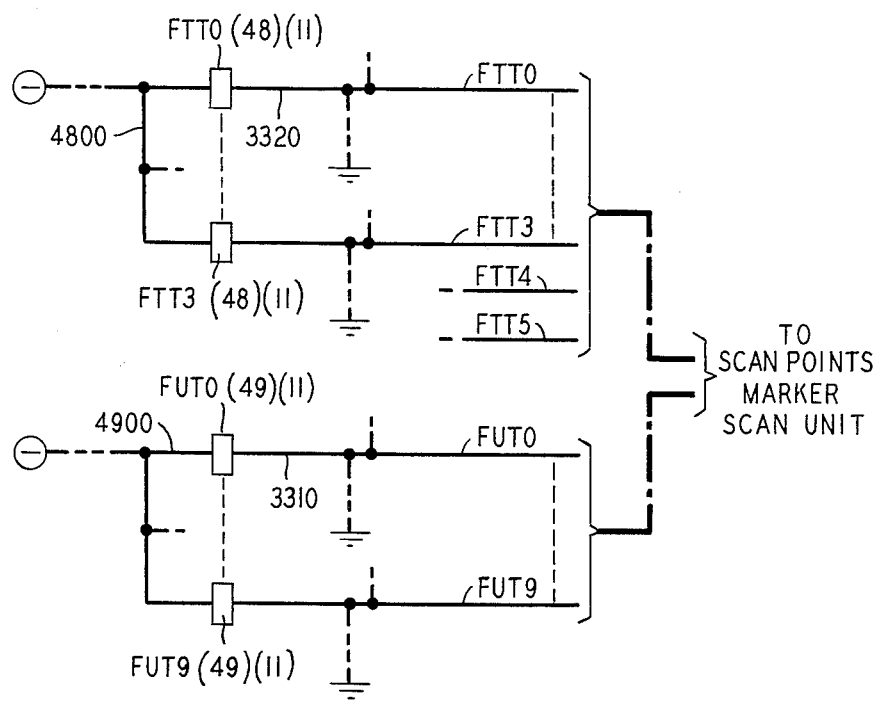

The data leads FFT0 to FFT5 and FUT0 to FUT9 of FIG. 11 (the Busch U.S. Pat. No. 2,585,904 does not show leads FTT4 and FTT5) appear as scan points in the marker scan unit word 6 as in FIG. 16. These leads identify the line link frame tens and units numbers, which are part of the switching network equipment location of the calling circuit for calls originating in or switched through the No. 5 Crossbar system.

Figure 12:
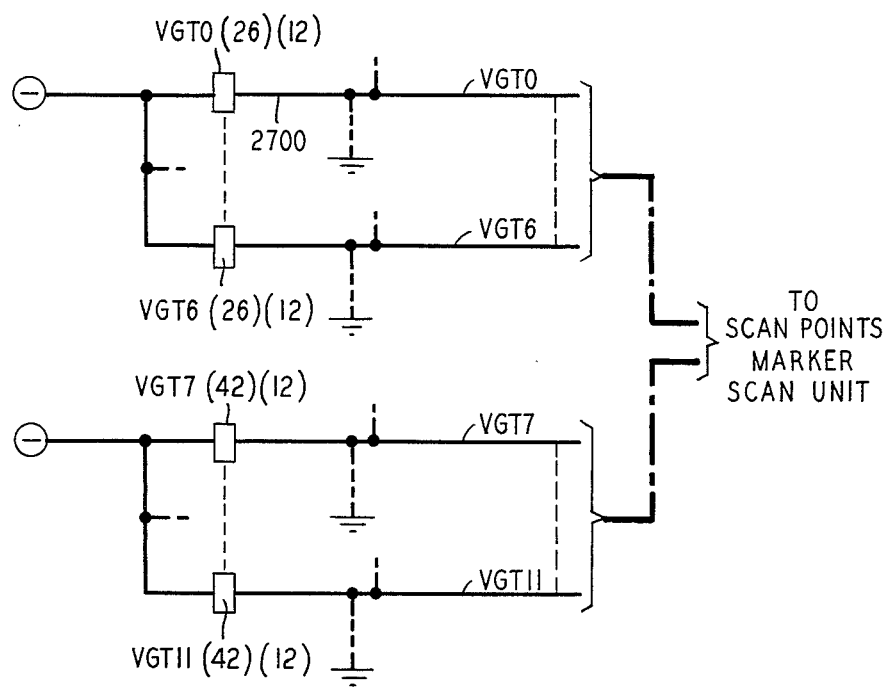

FIG. 12 shows the leads VGT0 to VGT11 (the Busch U.S. Pat. No. 2,585,904 also includes leads VGT12 and VGT13) which appear as scan points in word 7 of the marker scan unit as in FIG. 16. These leads identify the line link frame vertical group, another part of the calling circuit location information.

Figure 13:
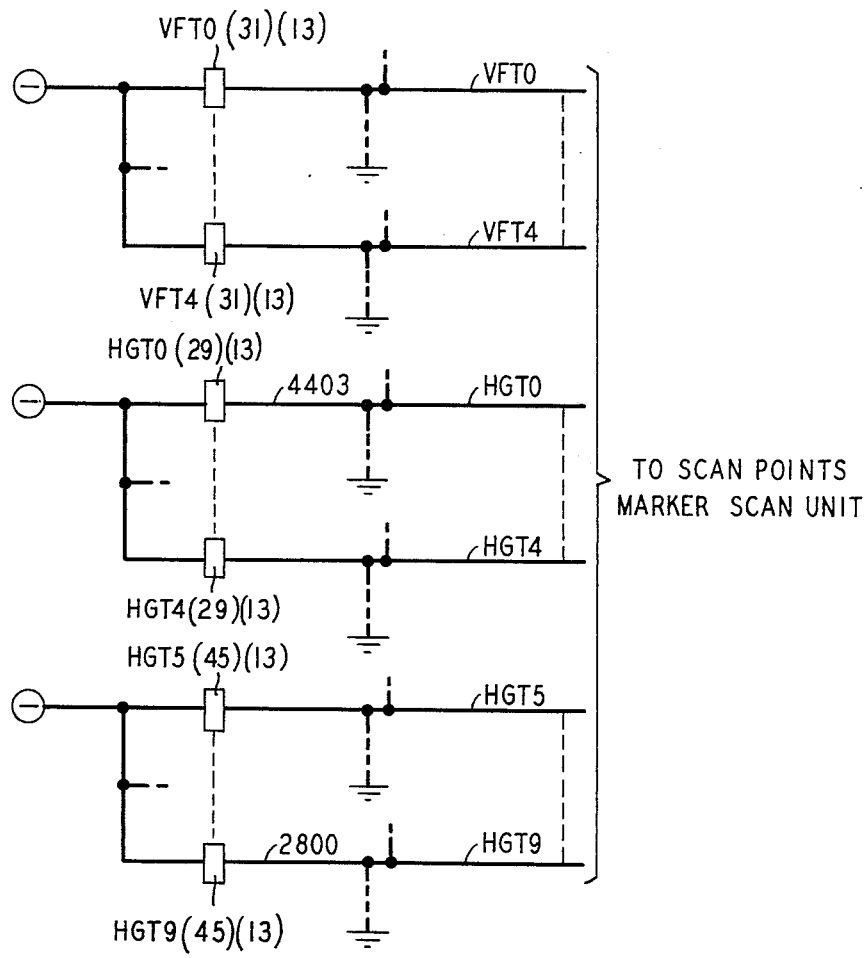
Figure 14:
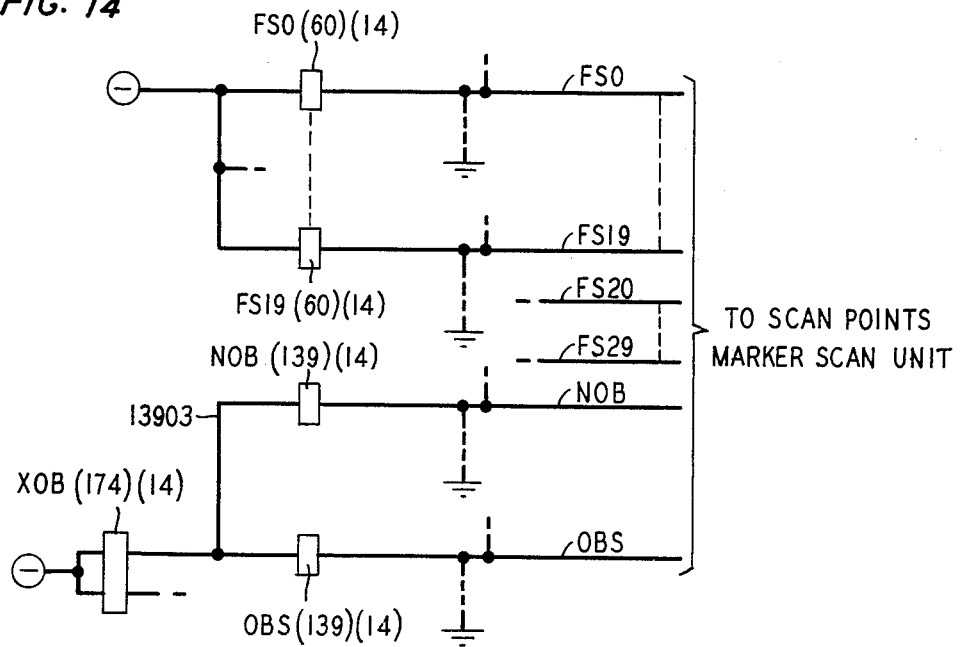

Word 8 of the marker scan unit as in FIG. 16 included 15 scan points corresponding to the leads VFT0 to VFT4 and HGT0 to HGT9 of FIG. 13, the line link vertical file and horizontal group information, parts of the calling circuit location information.

Words 9 and 10 of the marker scan unit as in FIG. 16 include scan points corresponding to leads FS0 to FS29 (the Busch U.S. Pat. No. 2,585,904 does not show leads FS20 to FS29), NOB and OBS of FIG. 14. The leads FS0 to FS29 are trunk link frame selection leads which identify in part the network location of the trunk used on the connection. Leads OBS (observed) and NOB (not observed) indicate whether or not the call connection involves the necessity for service observing.

Figure 15:
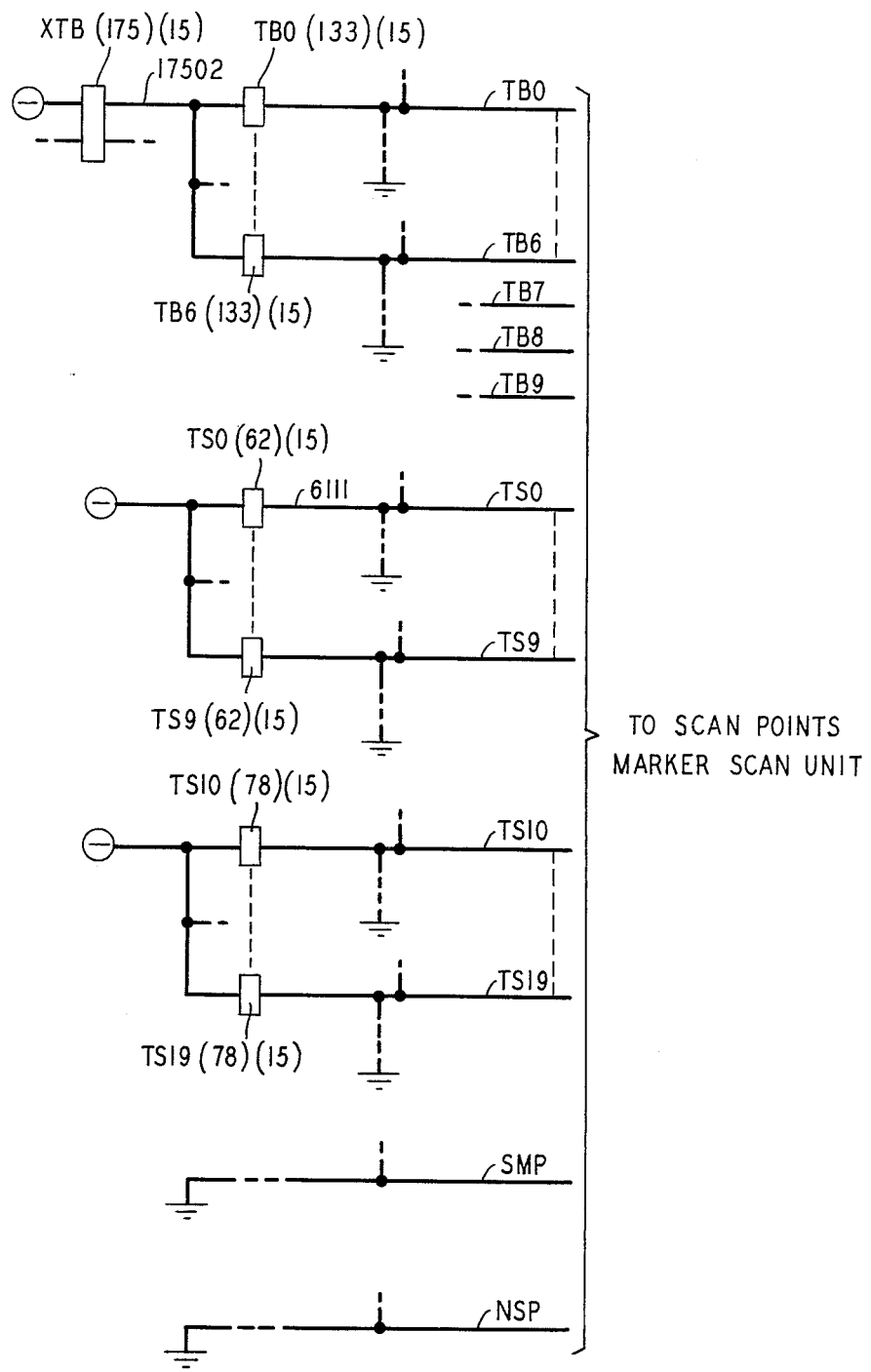

FIG. 15 shows leads TB0 to TB9, TS0 to TS19, SMP and NSP (the Busch U.S. Pat. No. 2,585,904 does not show leads TB7 to TB9, SMP and NSP), which appear as scan points in words 11 and 12 of the marker scan unit as in FIG. 16. The leads TB0 to TB9 are trunk block leads and the leads TS0 to TS19 are trunk select leads, both sets of which identify in part the particular trunk used on the call connection. Leads SMP (traffic sampled) and NSP (not traffic sampled) indicate whether or not the call involves any traffic sampling activity. In FIG. 15, dotted lines have been used to signify any typical circuit for controlling each of the leads NSP and SMP as desired.

It is to be noted in FIG. 16 that words 13 to 15 of the marker scan unit are reserved for uses other than as mentioned herein.

MARKER BUFFER AREA

FIG. 17 is a representation of the MKR Buffer Core Area wherein words 2 to 14 correspond in bit content to the same items of information as in respective corresponding wores 0 to 12 of the MKR Scan Unit as in FIG. 16. The words 15 to 17 of the MRK Buffer Area (FIG. 17) are reserved to correspond to the reserved words 13 to 15 of the MKR Scan Unit (FIG. 16).

Word 0 of the MKR Buffer Area includes in bits 2 to 0 a Progress Mark (PM) which indicates the Control Status of the MKR resulting from the previous MKR Data Processing Subroutine, as will be explained hereinafter. Also, word 0 includes a test call flag TSTCLFLG (bit 14) and a recycle flag RCYFLG (bit 15). In addition, word 0 includes in bits 11 to 8 a premature release count PRC indicating the number of times the marker has been released without a READ operation having taken place, as will be discussed.

Word 1 of the MFK Buffer Area includes in bits 7 to 0 certain test call information and includes in bits 9 and 8 indications as to whether the marker is involved in a trunk test (TKT) or in a marker test (MKT).

TRUNK CORE REGISTER

Figure 19:
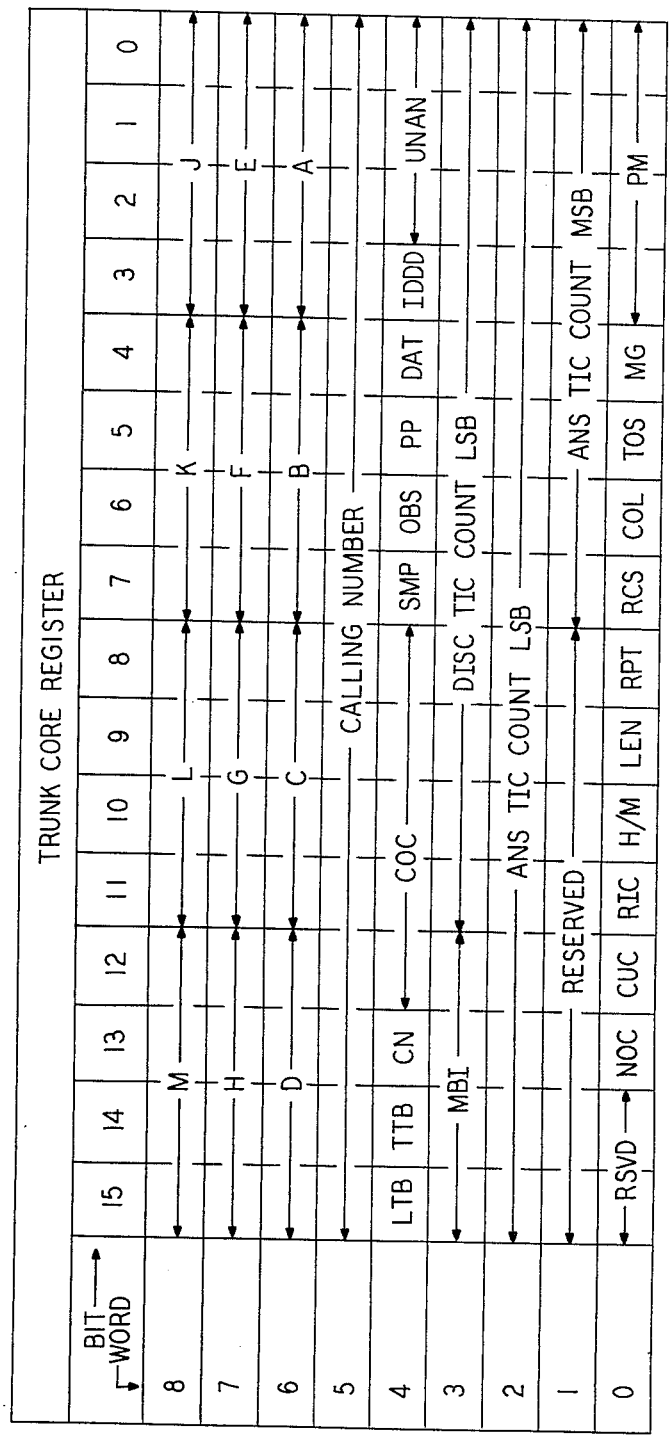
FIG. 19 is a diagram showing the bit content of a 9-word by 16-bit trunk core memory register.

As is referred to under the headings dealing with the programs for scanning and processing switching system data, the exemplary embodiment of the invention is not concerned with the details of what happens after the collection of Initial Entry data from the marker. However, it is mentioned that certain operations ensue with regard to the use of the trunk core register as a storage area for billing data until and during actual billing processing. In this regard, FIG. 19 shows the schematic layout of the data bits of a typical trunk core register within the processor area. Each trunk core register is associated with a particular actual physical trunk and includes nine, 16-bit words, the bit significances of which are as follows. Words 6 to 8 contain called number information. Word 5 contains data associated with calling circuit identity. In word 4, the LTB and TTB bits relate to possible line or trunk trap requirements, the CN bit specifies whether or not a coin call is involved, the COC bits are part of the calling circuit identity and include data as to the calling telephone office code, the SMP bit indicates whether or not the call was traffic-sampled, the OBS bit indicates whether or not the call was service-observed, the PP and DAT bits indicate respectively whether the call was PICTUREPHONE service and DATAPHONE service, the IDDD bit indicates whether the call was an automatically controlled international call, and the UNAN bits provide a count of the number of consecutive calls either unanswered or of less than 30 seconds duration. Word 3 includes bits indicating the proper message billing index (bits 15 to 12) and the call disconnect time (bits 11 to 0). Word 2 specifies part of the call answer time. That portion of word 1 which is not reserved includes part of the call answer time indication. Word 0 includes a number of bits having the following significances: the PM bits provide a trunk progress mark indicative of the status of the trunk; the MG bit is zero if the trunk is in marker group 0 and is one for marker group 1; the TOS bit indicates whether or not the trunk is out-of-service; the COL bit indicates whether or not the trunk core register is currently busy with a call-on-list to be output formatted; the RCS bit indicates whether or not the call should be recorded; the RPT bit indicates whether or not the call is a test call; the LEN bit indicates whether or not a line equipment number translation function has been performed; the H/M bit specifies whether or not the call involves a hotel-motel message register function; the RIC bit indicates whether or not the call data available should be recorded as an incomplete call; the CUC bit indicates whether or not the unanswered call count should be cancelled on this trunk (e.g., a Time, Weather, etc., trunk); and, the NDC bit indicates whether or not this trunk is checking for extended duration calls (e.g., a call lasting 9 days).

The trunk core register, as in FIG. 19, is the part of the processor unit memory into which all call data is stored (some from the Initial Entry data from the marker and some from other sources) and by means of which the processor unit can format output entries to a peripheral device, as desired, such as magnetic tape for further billing processing.

As has been pointed out, the exemplary embodiment of the present invention is not concerned with those billing functions which occur subsequent to the collection of marker data in the marker core buffer area.

CIRCUIT SYMBOLS

Figure 35:
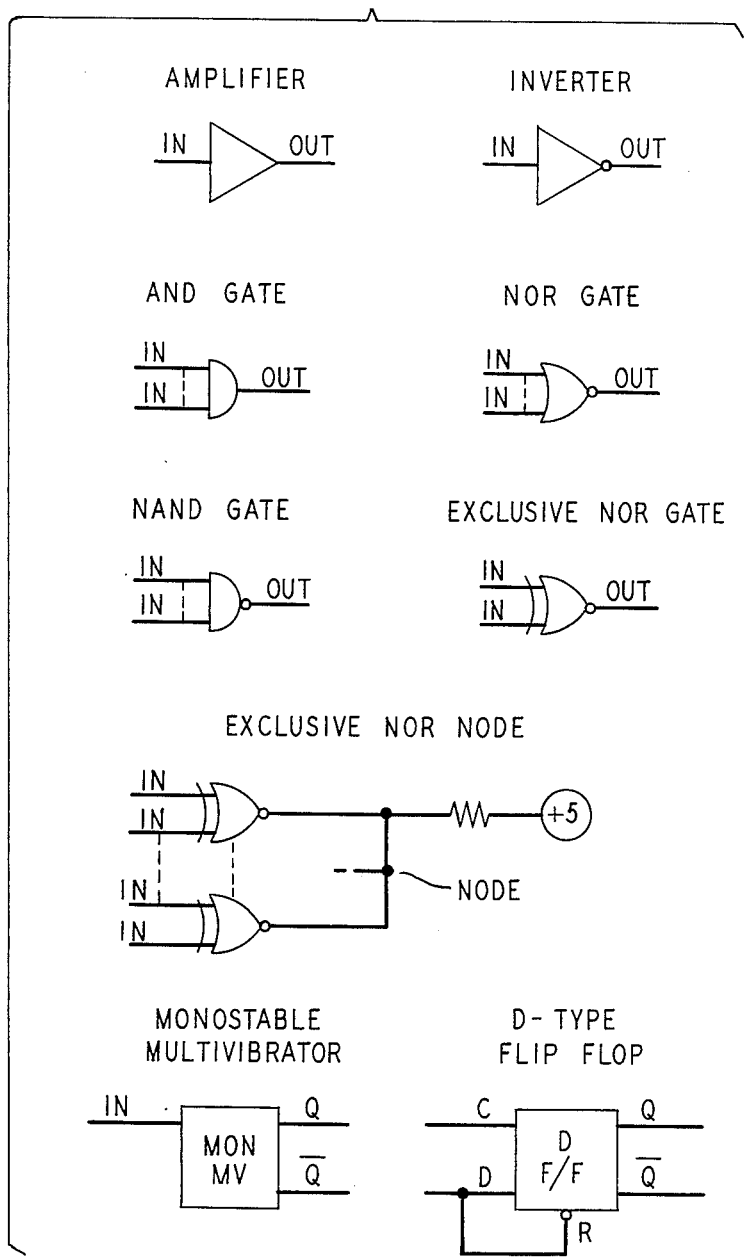
FIG. 35 shows some circuit symbols used in FIGS. 38, 39 and 42 through 44.

FIG. 35 shows circuit symbols used in FIGS. 38, 39, 42, 43 and 44, which in turn show details of a bus converter and of a scan unit as used in the block diagram of FIG. 1. The bus converter and scan unit are described in the following two sections.

Regarding the various gates, etc. in FIG. 35, the following descriptions concern the logic signal levels and not necessarily any discrete voltage levels. When the expression "high" is used, it means a high logic signal level somewhere in the area of plus 3.0 volts direct current. When the expression "low" is used, it means a low logic signal level somewhere near ground or zero (0.0) volts direct current. The designation "+5" inside of a circle signifies the positive terminal of a 5.0 volt direct current source whose negative terminal is assumed to be at ground potential, as in other places where the designation "−48" inside of a circle signifies the negative terminal of a 48 volt direct current source whose positive terminal is assumed to be grounded.

The amplifier repeats the input (IN) logic level at its output (OUT).

The inverter provides an output whose logic level is the opposite of the input.

The AND gate provides a low output if any input is low and provides a high output only if all inputs are high.

The NOR gate provides a low output if any input is high and provides a high output only if all inputs are low.

The NAND gate provides a high output if any input is low and provides a low output only if all inputs are high.

The exclusive NOR gate provides a low output when the two inputs are at different logic levels and provides a high output when the two inputs are at the same logic level.

Figure 39:
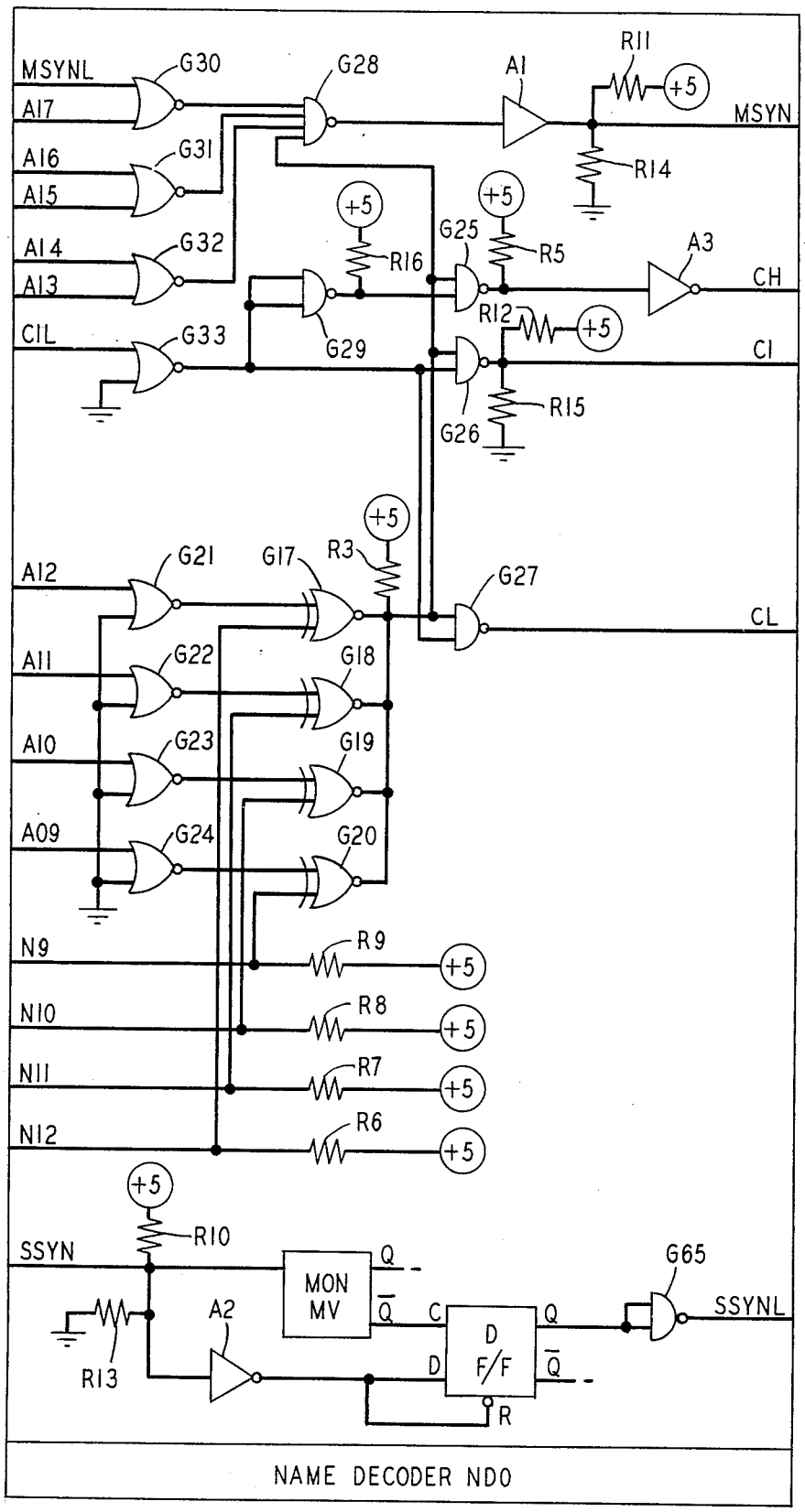
FIG. 39 shows the details of the Name Decoder (ND0) of FIG. 37.
Figure 44:
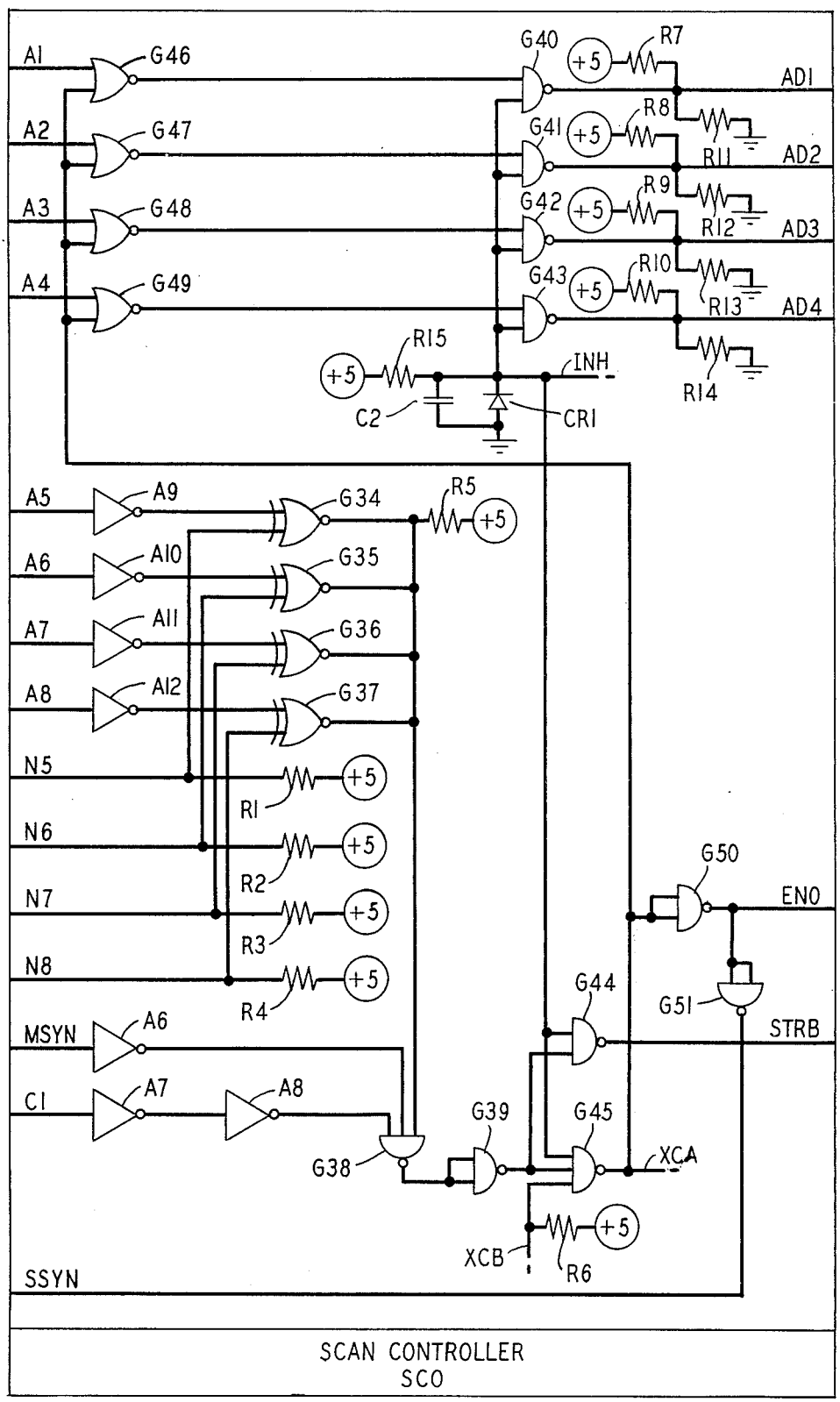
FIG. 44 shows the details of the Scan Controller SC0 of FIG. 41.

The exclusive NOR node, such as occurs in FIGS. 39 and 44, provides at the node a low if any of the exclusive NOR outputs is low and provides at the node a high only if all of the exclusive NOR outputs are high.

The monostable multivibrator normally (stable condition) provides a low Q output and a high Q-prime output and does not respond to any input condition except a change at the input from high to low. When the input changes from high to low, the multivibrator changes its Q output from low to high and its Q-prime output from high to low and maintains the latter output condition (unstable condition) for a prescribed time duration. At the end of the prescribed unstable time duration, the multivibrator reverts to its stable condition, returning its Q output from high to low and its Q-prime output from low to high.

The D-type flip-flop D F/F, with its D and R terminals connected together, maintains its Q output low and its Q-prime output high as long as the D and R inputs are low. When the D and R inputs are high, a low-to-high change at the C input causes the Q output to go from low to high and the Q-prime output to go from high to low. The F/F will be reset (Q output to low and Q-prime output to high) when the D and R inputs return to low.

BUS CONVERTER

Figure 36:
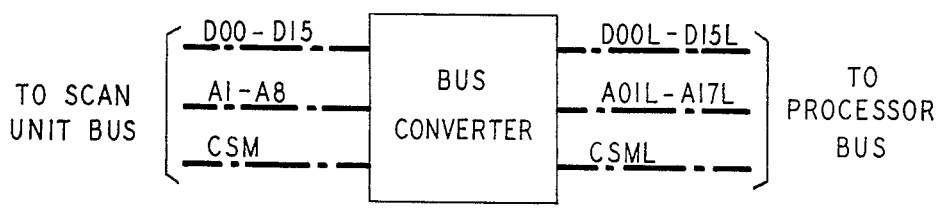
FIG. 36 shows a box illustrating a Bus Converter of FIG. 1 and indicating the nature of its connections to the scan unit bus and to the processor bus.
Figure 37:
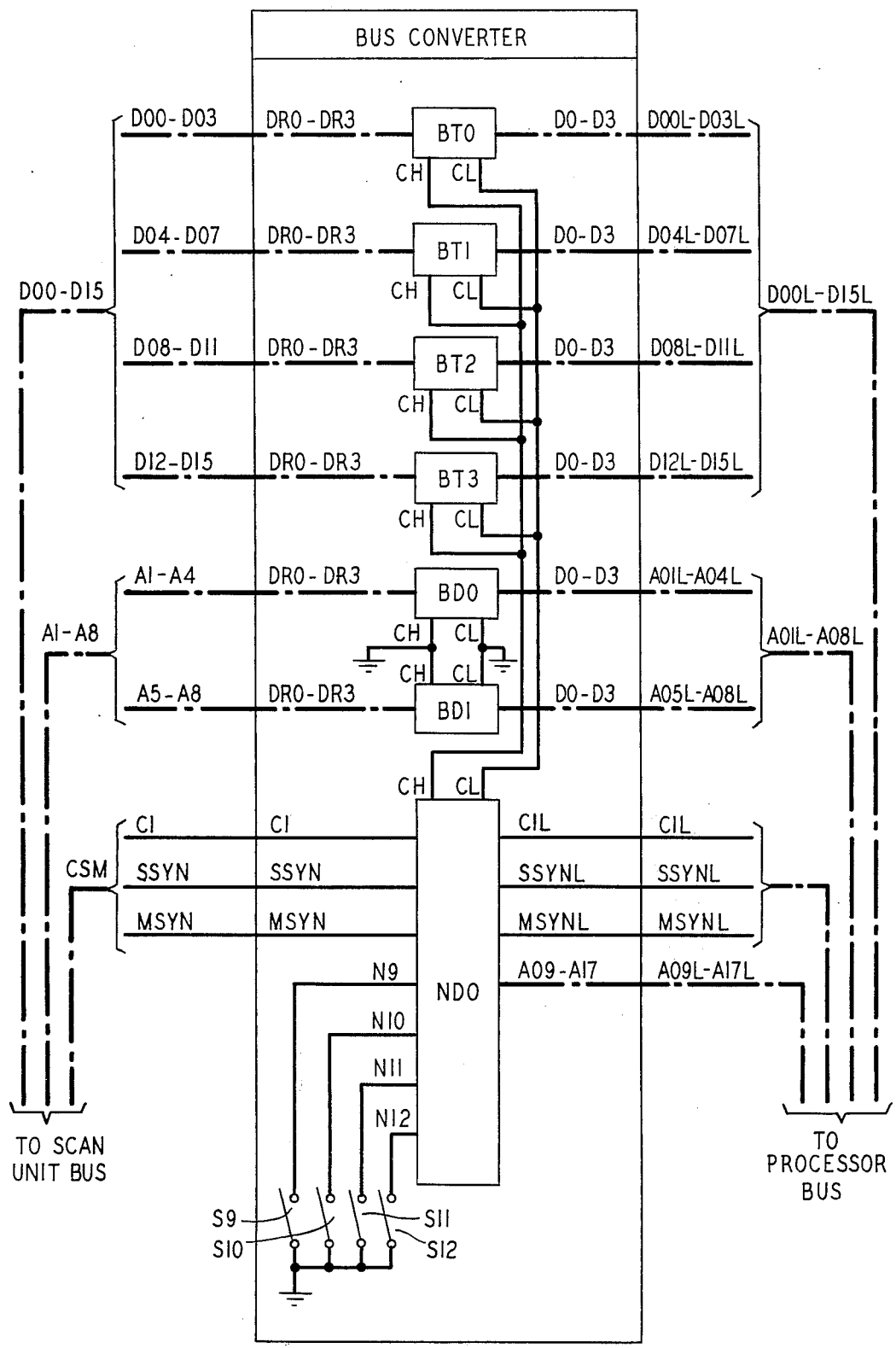
FIG. 37 shows the interconnection of the components of a Bus Converter of FIG. 36.
Figure 38:
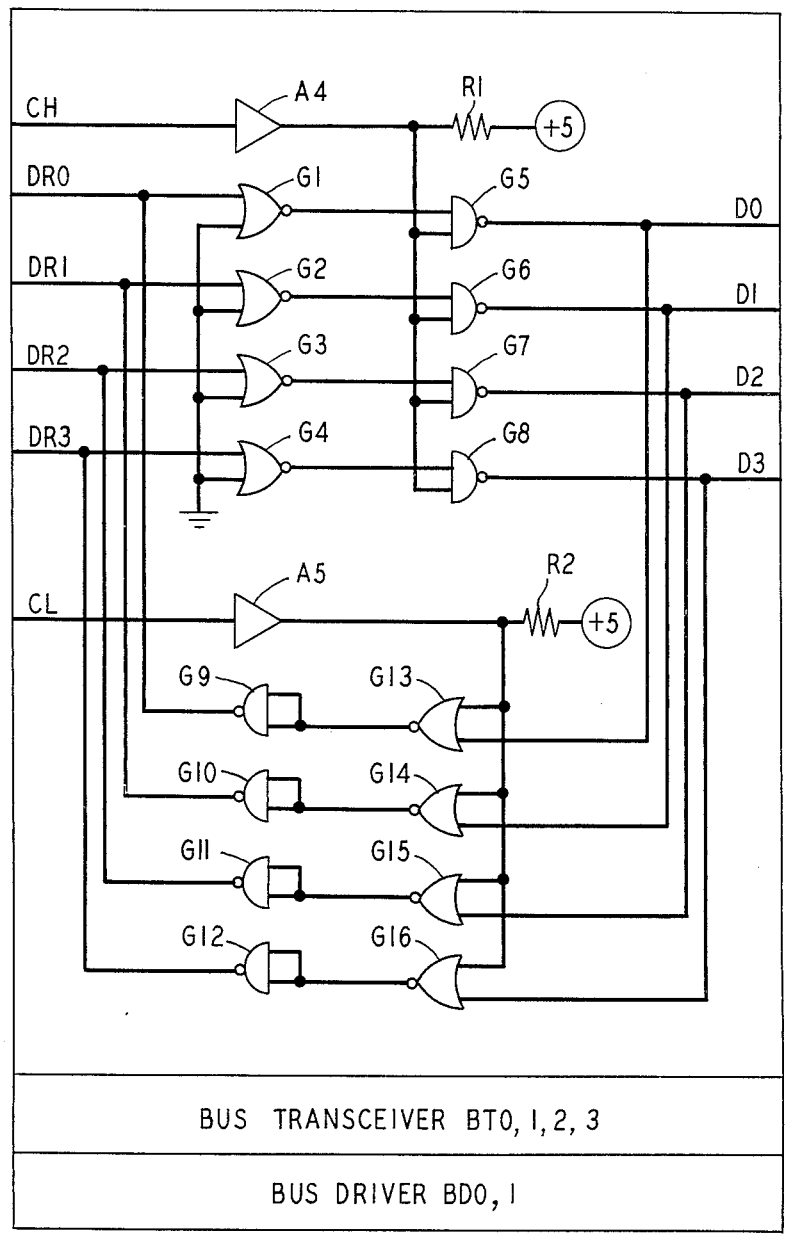
FIG. 38 shows the details of a Bus Transceiver (BT0 to BT3) and of a Bus Driver (BD0 and BD1) of FIG. 37.

Each bus converter of FIG. 1 is illustrated as a suitably marked box in FIG. 36. The bus converter of FIG. 36 is made up, as shown in FIG. 37, of four Bus Transceivers BT0 to BT3, two Bus Drivers BD0 and BD1, and a Name Decoder ND0. FIG. 38 shows the details of the bus transceivers and bus drivers. FIG. 39 shows the details of a name decoder.

As shown in FIG. 1 and in FIGS. 36 and 37, the bus converter is connected between the processor bus and the scan unit bus. The bus converter receives address, data, control, and sync information from the processor (via the processor bus) and, if properly addressed, transmits the necessary parts of such information to the scan unit bus. The bus converter operates in one of two modes, a read (scan) mode or a write (distribute) mode. Although not shown as such in FIG. 1, bus converters may be associated with distribute units as well as with the indicated scan units. Since the exemplary disclosure of the invention does not need distribute units, none have been shown. In the read mode of the bus converter, data is transmitted from the selected row (word) of scan points in a scan unit to the processor bus. In the write mode of the bus converter, data received from the processor bus is written into a selected row (word) of latches in a distributor unit. The two operating modes differ only in the direction of data transmission which is determined by the state (low or high level) of a control bit, as will be explained.

The processor bus (FIGS. 1, 36 and 37) includes 36 signal leads as follows: 17 address leads A01L to A17L, 16 data leads D00L to D15L, one control lead C1L, one master sync lead MSYNL, and one slave sync lead SSYNL.

Communication between two devices on the processor bus is a master-slave relationship. The bus master, the processor unit in this disclosure, controls the processor bus when communicating with a slave device, such as a bus converter in this disclosure. This communication is interlocked by virtue of the necessity for each master sync signal (lead MSYNL) from the master device to be acknowledged by a slave sync signal (lead SSYNL) from the slave device in order to complete a data transfer therebetween.

Generally, the name decoder (ND0 of FIGS. 37 and 39) uses the nine high order address bits (leads A09L to A17L, the "L" signifying that the lead goes from high to low when activated on the processor bus) to ascertain if it is the device addressed. If it is, it uses the master sync signal (lead MSYNL) to generate a local master sync signal (lead MSYN) on the scan unit bus. The bus converter also provides a delay between the local slave response (lead SSYN) on the scan unit bus and the slave sync signal (SSYNL) returned to the processor bus, thus to insure the validity of data before sending the slave sync onto the processor bus.

The control signal (lead C1L) determines the direction of data transfer. A high level lead C1L means a read (scan) operation, which is of interest here, and a low level lead C1L means a write (distribute) operation, which is not of interest here. This signal (lead C1L) is passed to the scan unit bus on lead C1 and controls the direction of data flow through the bus transceivers, as will be described.

The eight low order address bits (leads A01L to A08L) from the processor bus are passed through the two bus drivers (BD0 and BD1) of FIG. 37 directly to the scan unit bus on leads A1 to A8. The bus drivers BD0 and BD1 are the same as bus transceivers except (see FIG. 37) that their control leads CH and CL are grounded so as to be permanently low to allow data to pass only from the processor bus to the scan unit bus, as will be described below.

The 16 data leads D00L to D15L of the processor bus, are interfaced with the 16 data leads D00 to D15 of the scan unit bus through the four bus transceivers BT0 to BT3. The direction of data flow through the transceivers is controlled by the signals on their leads CH and CL from the name decoder, as will be explained.

The name decoder ND0 of FIG. 39 provides four "name" leads N9 to N12 which are selectively grounded or ungrounded, as shown by switches S9 to S12 of FIG. 37, to specify on a 4-bit basis the address of this bus converter (i.e., up to 16 such converters may be addressed by the four address leads A09 to A12 from the processor bus). As previously mentioned, all of the processor bus address leads A01L to A17L are normally high, the active state of such a lead being represented by the lead going from high to low. In FIG. 39, the four leads A09 to A12 are normally high and will carry a 4-bit binary code according to which of the four leads is made low. In order for a particular name decoder to be addressed, the switches S9 to S12 of FIG. 37 must be set in the proper positions. For instance, if the address of the name decoder of FIG. 39 is represented by high leads A09 and A11 and low leads A10 and A12, switches S9 and S11 of FIG. 37 must be closed to ground (leads N9 and N11 low into FIG. 39) and switches S10 and S12 of FIG. 37 must be left open (leads N10 and N12 high in FIG. 39 from plus 5.0 volts through resistors R8 and R6). In FIG. 39, the exclusive NOR node at the bottom end of resistor R3 will be high only if the name decoder ND0 recognizes its address on leads A09 to A12 from the processor bus. This node can be high only if all of the outputs of the exclusive NOR gates G17 to G20 are high. If leads A10 and A12 into FIG. 39 are low, then the outputs of NOR gates G21 and G23 in FIG. 39 will be high since both inputs are low. If leads N10 and N12 into FIG. 39 are high (open switches S10 and S12 in FIG. 37), then both inputs to each of gates G17 and G19 will be high so that their outputs are high. If leads A09 and A11 into FIG. 39 are high, the outputs from gates G24 and G22 are low. If the leads N9 and N11 are low (closed switches S9 and S11 in FIG. 37), then both inputs to each of gates G18 and G20 in FIG. 39 are low, thus to provide high outputs. With all outputs of gates G17 to G20 high in FIG. 39, the node at the bottom of resistor R3 will be high, thus to indicate that the 4-bit address on leads A09 to A12 into FIG. 39 belongs to the name decoder whose switches S9 and S11 in FIG. 37 are closed to ground and whose switches S10 and S12 in FIG. 37 are open.

The normal (unaddressed) state of the name decoder ND0 of FIG. 39 finds its output leads MSYN, C1, CL and SSYNL high and its output lead CH low for all name decoders except that one whose switches in FIG. 37 are all closed to ground. The inactive highs on leads A13 to A17 into FIG. 39 cause the outputs of gates G30 to G32 to be low, thus to produce a high at the output of gate G28 and at the output of amplifier A1 onto lead MSYN. The inactive highs on leads A09 to A12 into FIG. 39 cause the outputs of gates G21 to G24 to be low; and, unless the name leads N9 to N12 into FIG. 39 are all closed to ground (only one of the 16 possible name decoders), the node at the bottom side of resistor R3 will be low. In the one case where a name decoder has all of its switches S9 to S12 of FIG. 37 closed to ground, the inactive state of the node at the bottom side of resistor R3 in FIG. 39 will be high. The normal high on input lead C1L in FIG. 39 causes the output of gate G33 to be low which causes the lower inputs to gates G26 and G27 to be low, thus to cause the C1 and CL leads at the outputs of gates G26 and G27 to be high. The high output of gate G29 is applied to the lower input to gate G25 so that the output lead CH through inverter A3 will be low for all name decoders except one. The inactive high on input lead SSYN in FIG. 39 produces a low through inverter A2 to cause the Q output of the D F/F to be low so as to maintain high the output lead SSYNL.

Under the inactive state of the name decoder, all of its output leads MSYN, C1, CL and SSYNL will be high and the output lead CH will be low for 15 name decoders and high for one name decoder.

In FIG. 38, each bus transceiver BT0 to BT3 is controlled by its input leads CH and CL from the name decoder of FIG. 39. For those transceivers controlled by the above 15 name decoders, the CH lead is low and the CL lead is high during the inactive state. Thus, the low via amplifier A4 to the lower inputs to gates G5 to G8 prevents any signals on the scan unit bus on leads DR0 to DR3 from being transmitted to the processor bus on leads D0 to D3. Also, the high on lead CL via amplifier A5 to the upper inputs to gates G13 to G16 prevents any signals on the processor bus on leads D0 to D3 from being transmitted to the scan unit bus on leads DR0 to DR3.

In the one situation where the 16th name decoder is involved, the CH lead from FIG. 39 into FIG. 38 will be high instead of low, thus to enable the gates G5 to G8 of FIG. 38. This seemingly allows signals on leads DR0 to DR3 from the scan unit bus to be transmitted over leads D0 to D3 of the processor bus. However, as will be seen later, these signals cannot be so transmitted unless and until a scan unit is properly addressed via the name decoder of the controlling bus converter.

When the processor unit is to address a bus converter over the processor bus, all of the address leads A13 to A17 into FIG. 39 will be made low and the other four address leads A09 to A12 into FIG. 39 will be made selectively low or high depending upon which of the 16 name decoders is being addressed. Whichever name decoder is being addressed, according to the correspondence between the signals on the leads A09 to A12 and the setting of switches S9 to S12 in FIG. 37, will provide a high to the upper inputs to gates G25, G26 and G27 in FIG. 39 and to the lower input to gate G28 in FIG. 39. The middle two inputs in FIG. 39 to gate G28 are also made high due to the low inputs at gates G31 and G32. Under these circumstances, all 15 other bus converter name decoders will produce a low at the upper inputs of gate G25, G26 and G27 and at the lower input of gate G28. The latter condition, as above discussed, causes the respective CH and CL leads from FIG. 39 into FIG. 38 to be respectively low and high, thus to completely block all bus transceivers of those other 15 bus converters.

Returning to the one bus converter of interest, when the master sync signal (low on lead MSYNL in FIG. 39) is received from the processor bus, gate G28 provides a low output through amplifier A1 onto lead MSYN to the scan unit bus. Also, the high control signal on lead C1L (lead C1L in FIG. 39 is high for reading from a scan unit and low for writing into a distribute unit) maintains a low output from gate G33 and a high output from gate G29. Since both inputs to gate G25 are high, the lead CH into FIG. 38 will be high. The low at the lower input to gate G26 maintains lead C1 high onto the scan unit bus in FIG. 37. Also, the low at the lower input to gate G27 maintains a high on lead CL into FIG. 38. Thus, in FIG. 38, with leads CH and CL both high from the properly addressed name decoder of FIG. 39, transmission is enabled from leads DR0 to DR3 of the scan unit bus to leads D0 to D3 of the processor bus. The four bus transceivers BT0 to BT3 of FIG. 37 are thus enabled to transmit data over leads D00 to D15 from the scan unit bus to leads D00L to D15L of the processor bus; and, all other bus converters have blocked their bus transceivers by maintaining their CH leads low and their CL leads high in FIG. 37.

Thus, as described above, when the name decoder of a bus converter is properly addressed in FIG. 37 over leads A09L to A17L from the processor bus, along with a high control signal on lead C1L and a low master sync signal on lead MSYNL, the following situations prevail:

1. The name decoder ND0 adjusts its control over its bus transceivers BT0 to BT3 so that data transmission can take place from the scan unit bus leads D00 to D15 to the processor bus leads D00L to D15L.
2. The bus drivers BD0 and BD1 are permanently adjusted to transmit address data from the processor bus leads A01L to A08L to the scan unit bus leads A1 to A8.
3. The name decoder ND0 applies a high over its control lead C1 of the scan unit bus to specify a read (scan) operation.
4. A low master sync signal is applied by the name decoder to the scan unit bus over lead MSYN.

With the above situation, the properly addressed scan unit on the scan unit bus will perform as described in the next section.

SCAN UNIT

Figure 40:
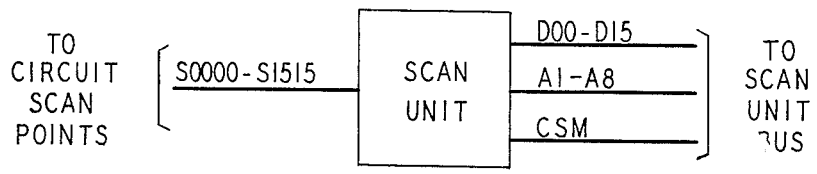
FIG. 40 shows a box illustrating a scan unit of FIG. 1 and indicating the nature of its connections to the circuit (marker and trunks) scan points and to the Scan Unit bus.

Each scan unit of FIG. 1 is associated with and controlled by a particular bus converter. FIG. 40 shows a scan unit box symbol connected to the scan unit bus by leads (see FIG. 41) D00 to D15, A1 to A8, C1, MSYN and SSYN, and connected to 256 circuit scan points over leads S0000 to S1515.

Figure 41:
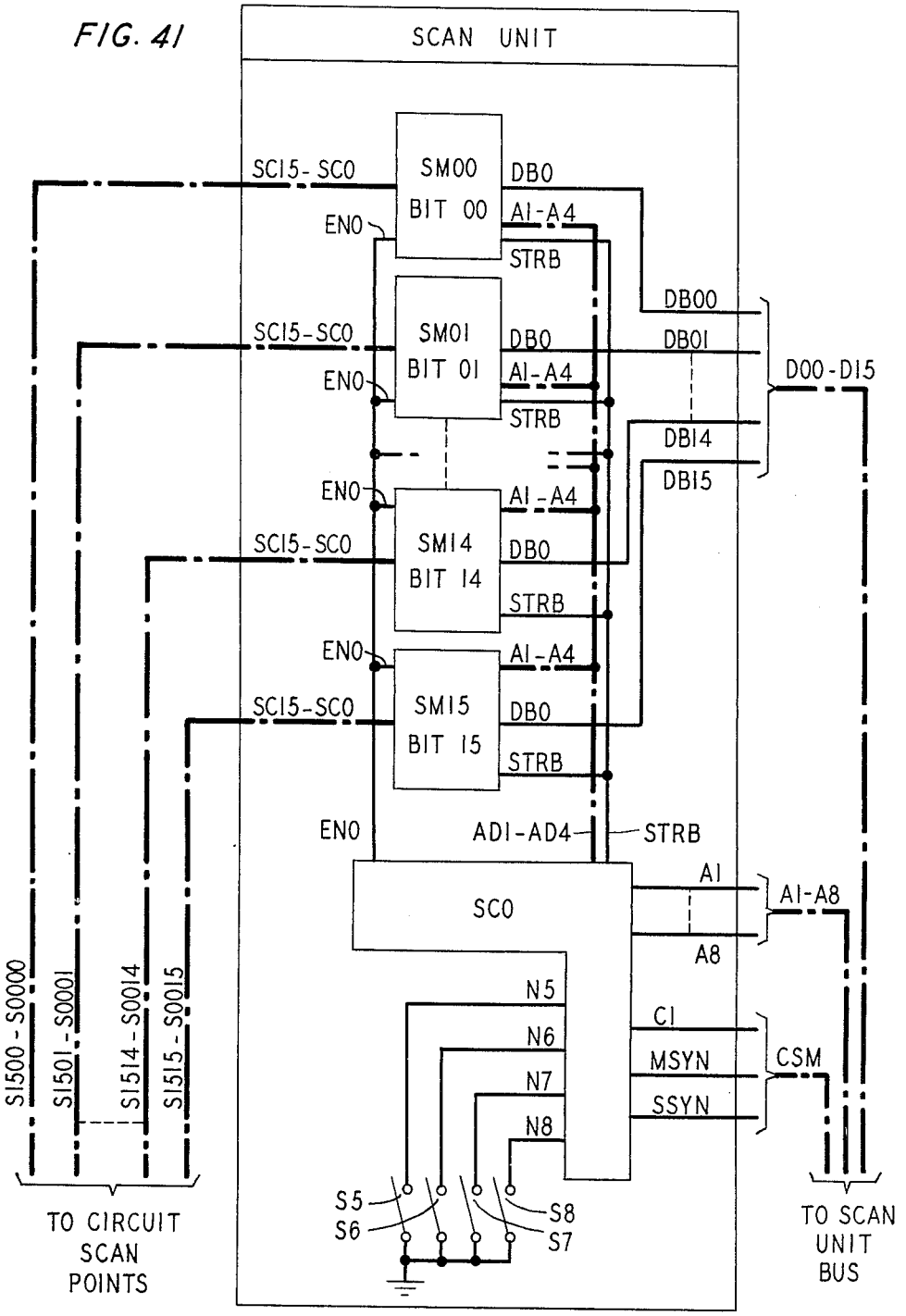
FIG. 41 shows the interconnection of the components of a Scan Unit of FIG. 40.
Figure 42:
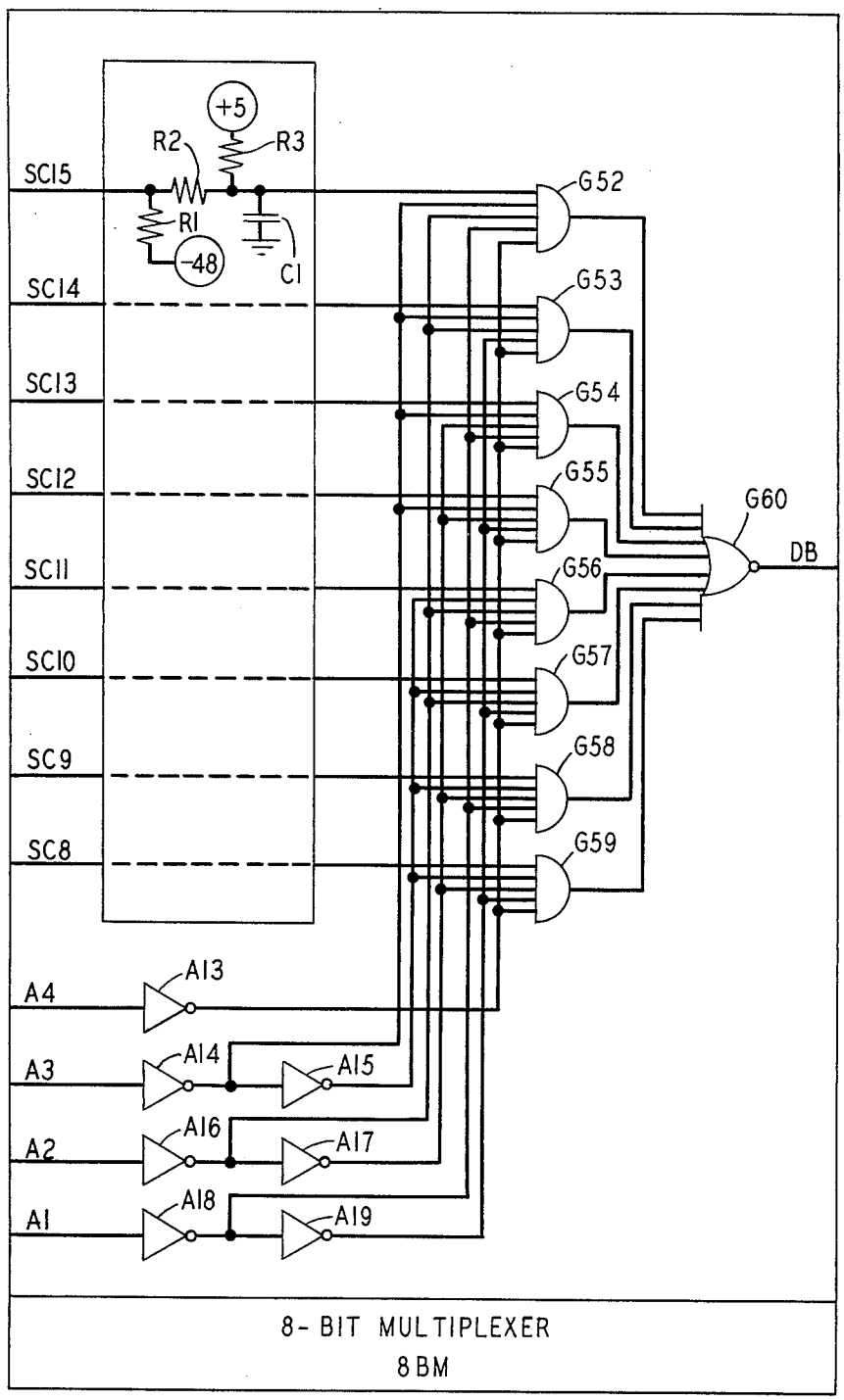
FIG. 42 shows the details of an 8-bit multiplexer.
Figure 43:
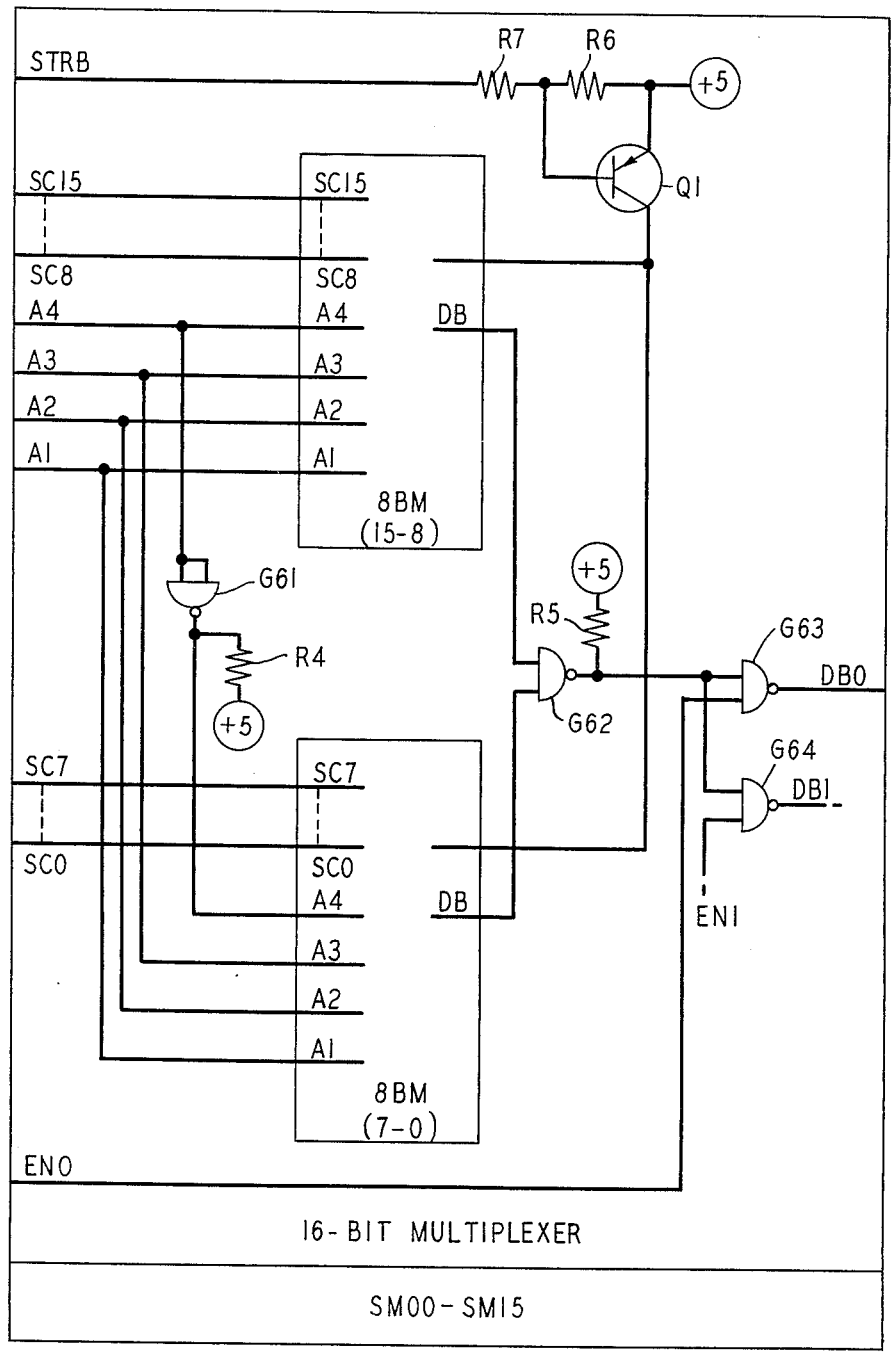
FIG. 43 shows the details of how two 8-bit multiplexers of FIG. 42 are arranged as a 16-bit multiplexer, such as SM00 to SM15 of FIG. 41.

FIG. 41 shows a functional breakdown of a scan unit into 16, 16-bit multiplexers SM00 to SM15 and a scan controller SC0. FIGS. 42 and 43 show how each 16-bit multiplexer SM00 to SM15 of FIG. 41 is made up of two 8-bit multiplexers; and, FIG. 44 shows the necessary details of the scan controller SC0 of FIG. 41.

Briefly, the operation of a scan unit of FIG. 41 requires the scan controller SC0 to receive the proper address on leads A5 to A8 from the scan unit bus, along with a master sync signal on lead MSYN and a proper read (scan) signal on the control lead C1, and to selectively enable the 16 multiplexers SM00 to SM15, according to the address on leads AD1 to AD4, for reading a particular selected set of scan points.

In FIG. 44, the address leads A1 to A8 from the scan unit bus are normally high and are made low in their active states. As in the case of the bus converter, above described, the scan controller SC0 has four name leads N5 to N8 which, as shown in FIG. 41, are capable of being made low (closed switches S5 to S8) or high (open switches S5 to S8). Also, as in the case of the bus converter, the address on leads A5 to A8 from the scan unit bus must correspond to the "name" of the scan controller in order for the outputs in FIG. 44 of all of the gates G34 to G37 to be high at the right hand input to gate G38. Any address on leads A5 to A8 other than the one for a particular scan controller will hold the right input of gate G38 low since at least one of gates G34 to G37 will have a low output. The normal highs on leads A5 to A8 will produce normal lows via inverters A9 to A12 at the upper inputs to gates G34 to G37. If any lead A5 to A8 is made low with the other or others high, the low will be reflected as a high at the upper input of the corresponding gates G34 to G37. The selective closing or opening of a switch S5 to S8 in FIG. 41 will render the corresponding name lead N5 to N8 low (closed switch) or high (open switch), thus to encode the lower inputs to gates G34 to G37. Each pair of inputs to each such gate must be the same (both high or both low) in order for the right input to gate G38 to be made high in response of the scan controller SC0 to its proper address on leads A5 to A8.

The normal condition of the scan controller SC0 of FIG. 44 (highs on leads A1 to A8, MSYN, and C1) provides highs on address leads AD1 to AD4 and on the enable lead EN0 and a low on the strobe lead STRB to the scan multiplexers. The lower inputs to gates G40 and G43 and the upper inputs to gates G44 and G45 are maintained high through resistor R15. Since the input leads A1 to A4 are normally high, the outputs of gates G46 and G49 will be low (the bottom inputs will be normally high, see below) and the outputs of gates G40 to G43 will be high on leads AD1 to AD4. The normally high lead MSYN is effective as a low at the middle input to gate G38, where high output is effective as a low output from gate G39 to the lower input to gate G44 and to the middle input to gate G45. Thus, the STRB lead is held high at the output of gate G44. Also, the high output from gate G45 is applied to both inputs of gate G50 and to the lower inputs to gates G46 and G49. The low output of gate G50 makes the enable lead EN0 low and through gate G51 makes the slave sync lead SSYN high toward the scan unit bus (see FIG. 41).

When the scan controller SC0 of FIG. 44 is properly addressed (leads A5 to A8), as above discussed, the right input lead to gate G38 will be rendered high. The high (read or scan mode) on the control lead C1 and the low master sync signal on lead MSYN are effective through inverters A6 to A8 as highs at the left two inputs to gate G38, thus to cause the output of gate G38 to go low. When the output of gate G38 goes low, the output of gate G39 goes high to produce a low strobe output on lead STRB, to produce a high enable output on lead EN0, and to render low the lower inputs to gates G46 to G49. With the lower inputs to gates G46 to G49 low, any low on any address lead A1 to A4 will be effective as a high output from the corresponding gate G46 to G49, which in turn will be effective through the corresponding gate G40 to G43 as a low on the corresponding lead AD1 to AD4 toward the scan multiplexers. Thus, the address code on input lead A1 to A4 will be repeated on leads AD1 to AD4 toward the scan multiplexers of only the scan unit of that particular scan controller SC0.

As above, when the scan controller SC0 (FIGS. 44 and 41) is properly addressed, along with a low master sync signal on lead MSYN and a high control signal on lead C1, the address on leads AD1 to AD4 is applied to all 16 scan multiplexers SM00 to SM15 of FIG. 41 along with a high enable signal on lead EN0 and a low strobe signal on lead STRB. This will cause all 16 scan multiplexers SM00 to SM15 (according to the address on leads A1 to A4) to read a particular row of scan points and to pass that 16-bit word of scan point data over leads D00 to D15 toward the scan bus.

Each 16-bit multiplexer SM00 to SM15 of FIG. 41 is made up as in FIG. 43 of two 8-bit multiplexers as in FIG. 42 except that in FIG. 43 the eight data leads for the bottom multiplexer 8BM are designated SC0 to SC7 instead of SC8 to SC15 as in the upper multiplexer 8BM. These leads SC0 to SC7 are of course the same as the leads SC8 to SC15 in the details of FIG. 42. The data leads SC0 to SC15 in FIG. 43 are 16 data or control status leads from the markers or trunks of the switching system as previously explained. Each of these leads, as shown in FIG. 42, is terminated in an input filtering network made up of resistors R1, R2 and R3, capacitor C1, plus 5.0 volts direct current, and minus 48 volts direct current. The data signals from the switching equipment, as previously explained, are either ground, open circuit or minus 48 volts. Whenever a data lead SC- into FIG. 42 is grounded, the network output (junction of resistor R3 and capacitor C1) will be high (about plus 4.0 volts); and, whenever a data lead into FIG. 42 is either open circuited or at minus 48 volts, the network output will be low (about ground potential).

Regarding FIG. 42, as long as input A4 is high, the inverter A13 applies a low to the lower inputs to all of gates G52 to G59, thus causing the outputs of all of those gates to be low at all of the inputs to gate G60, whose output on lead DB is thus maintained high. In FIG. 43, it is seen that the two 8-bit multiplexers (like FIG. 42) are connected to the address leads A1 to A4 in the same manner except for lead A4, which is in effect inverted by gate G61 to the lower 8-bit multiplexer. Thus, while a high on lead A4 at the upper 8-bit multiplexer maintains a constant high at the upper input to gate G62, the lead A4 into the lower 8-bit multiplexer becomes a low via gate G61 so that the lower inputs to gates G52 to G59 (see FIG. 42) of the lower 8-bit multiplexer of FIG. 43 becomes high. Thus, the nature (high or low) of the address signal on lead A4 into the 16-bit multiplexer of FIG. 43 enables only one of the two 8-bit multiplexers. The other three address leads A1 to A3 into FIG. 43 are applied directly to both 8-bit multiplexers. These three leads are used on a straight binary basis to select one of the eight data leads in the enabled 8-bit multiplexer, thus selecting one of the 16 data leads in the 16-bit multiplexers of FIG. 43.

As will be apparent, the address code on leads AD1 to AD4 in FIG. 41 from the scan controller SC0 to all 16 scan multiplexers SM00 to SM15 will select for reading the same single data lead from each of the 16 scan multiplexers SM00 to SM15. The data leads into the scan unit from the switching system are assigned to certain scan points in the scan unit such that when the same single data lead of all 16 scan multiplexers is selected for reading, then one complete 16-bit data word is read (scanned) from the switching system. In FIG. 41, the leads S0000 to S1500 to scan multiplexer SM00 are the number 00 bits of data for all 16 (00 to 15) data words, the leads S0001 to S1501 are the number 01 bits of all 16 words, et cetera, and the leads S0015 to S1515 are the number 15 bits of all 16 words. The address on leads AD1 to AD4 from the scan controller specifies the reading (scanning) of all 16 bits of a specified one of 16 data words.

In FIG. 42, if all scan point inputs are low (no data), the upper inputs to gates G52 to G59 will be low, all of the outputs of those gates will be low, and the output of gate G60 on lead DB will be high. When data is available on a scan point input lead, such as lead SC15 going high, the top input of the corresponding gate G52 will be high. This data is read out of gate G60 as a low on lead DB only if all other inputs to gate G52 are then also high. The latter requires a low on all of leads A1 to A4, which become high through inverters A18, A16, A14 and A13 at the lower four inputs to gate G52. While the gate G52 is thus being enabled to allow the low data output on lead DB, all other gates G53 to G59 are disabled by at least one low on one of their inputs, as will be apparent in the arrangement of inverters A13 to A19 in the address leads A1 to A4. At the same time, as above mentioned, in FIG. 43 the lower 8-bit multiplexer is completely disabled by virtue of the low lead A4 becoming a high through gate R61 to disable the lower multiplexer. Thus, one at a time of the 16 data leads per 16-bit multiplexer SM00 to SM15 of FIG. 41 is selected for scanning.

In FIG. 43, normally the two outputs on leads DB from the upper and lower multiplexers are high, providing a low output from gate G62, which maintains high the main scan unit output on lead DB0 which (see FIG. 41) is one of the 16 (leads D00 to D15) data leads to the scan unit bus. When, in FIG. 43, the enable lead ENO goes high from the scan controller of FIG. 44 to the lower input to gate G63, then any high output from gate G62 will be effective as a low data signal on lead DB0 at the output of gate G63. In turn, the output of gate G62 will go high only if one of its inputs goes low to signify that the particular bit selected for scanning represents an active data bit.

The power transistor Q1 in FIG. 43 is normally off due to the normal high on the strobe lead STRB from FIG. 44. When the STRB lead goes low, transistor Q1 is turned on. The turning on of transistor Q1, as indicated by the collector lead going to the two 8-bit multiplexer, provides power (plus 5.0 volts) to the 16-bit multiplexer only when strobed.

In the meantime, in FIG. 44, when the enable lead ENO went high, the output of gate G51 went low on the slave sync lead SSYN to the scan unit bus (see FIG. 41). In FIG. 39, the low slave sync signal on lead SSYN into the name decoder of the bus converter causes the multivibrator to assume its unstable state (Q output high and Q-prime output low), the high output from inverter A2 becoming high at the D and R inputs to the D F/F but causing no change therein except to enable the D F/F to respond to a low-to-high transition at its C input (which is low from the Q-prime output of the multivibrator). After about 350 ns (nanoseconds) unstable time of the multivibrator, the latter reverts to its stable state (Q output low and Q-prime output high). The low-to-high transition at the C input of the D F/F causes it to switch its Q output from low to high to cause a low slave sync output signal from gate G65 on lead SSYNL toward the processor bus. The slave sync signal (low) on lead SSYNL is thus delayed to insure the stability and validity of the data signals.

As a result of the processor having properly addressed a bus converter in FIG. 1, a single 16-bit data word is scanned and read from a marker or from some trunks through the properly addressed scan unit, over the scan unit bus, through the bus converter, and onto the processor bus.

PROCESSOR AND MEMORY UNITS

Figure 30:
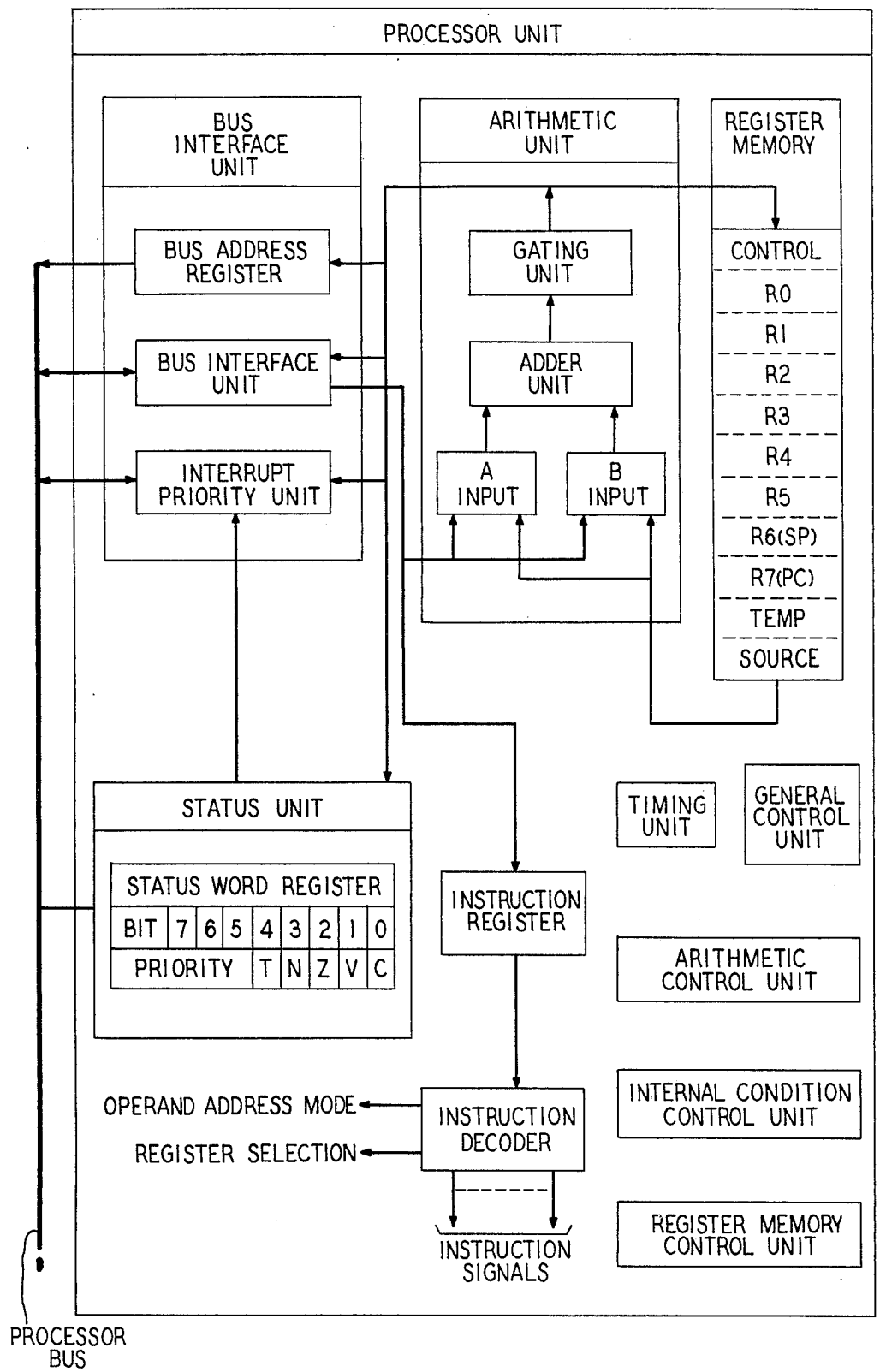
FIG. 30 is a block diagram of functional parts of the processor unit of FIG. 1.
Figure 31:
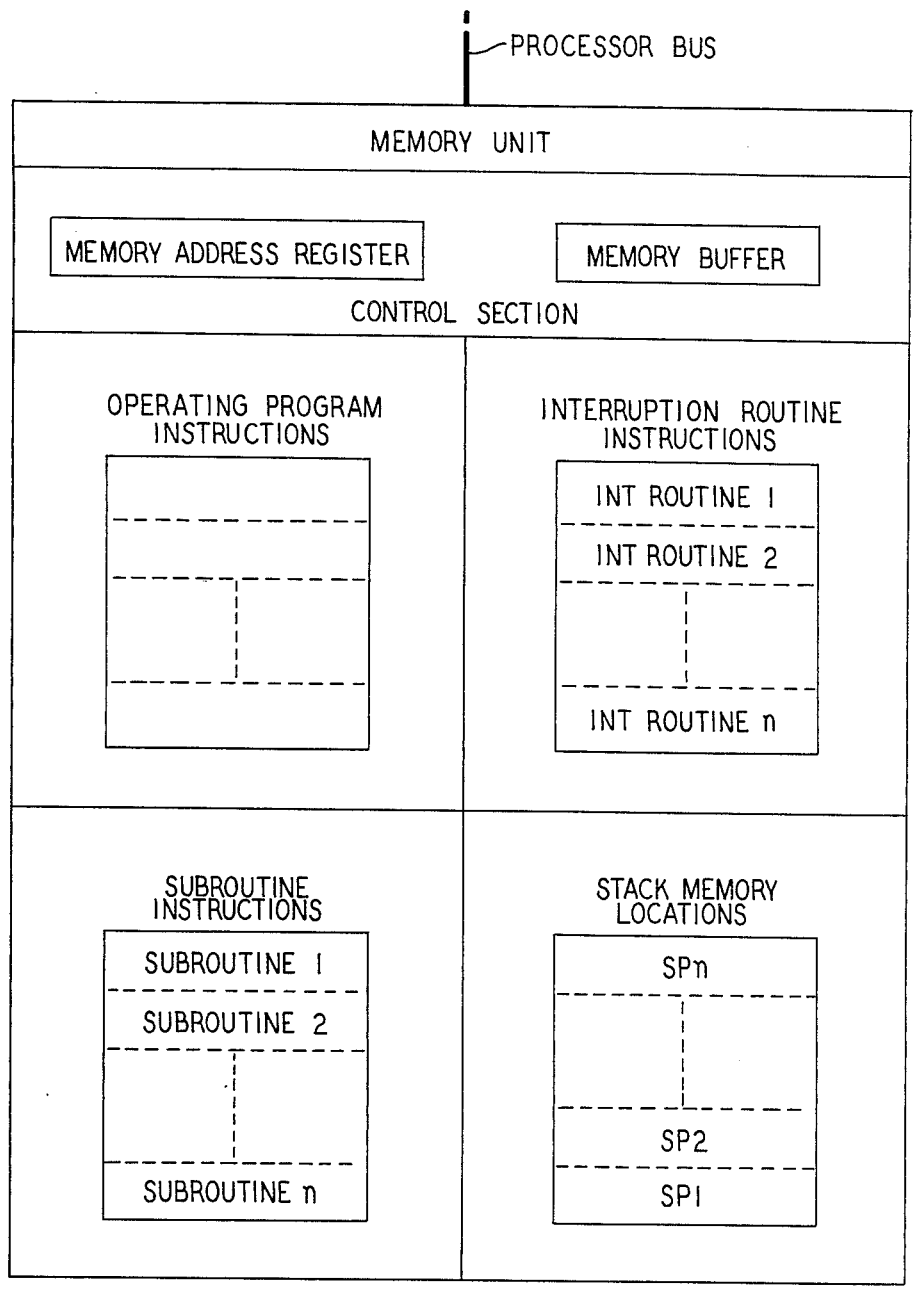
FIG. 31 diagrammatically illustrates the arrangement of the memory unit of FIG. 1.

FIG. 30 of the present disclosure (processor unit of FIG. 1) is the equivalent of FIGS. 2 of the referenced DEC patents; and, FIG. 31 of the present disclosure (memory unit of FIG. 1) is the equivalent in the referenced DEC patents of FIG. 5 of the Delagi et al. disclosure, of FIG. 10 of the McFarland, Jr. et al. disclosure, and of FIG. 3 of each of the two J. B. Cohen et al. disclosures.

The PDP processor (hereinafter referred to as the processor unit) is a 16-bit general-purpose, parallel logic, digital computer using two's complement arithmetic, and functioning under stored program (memory unit) control. All of the program instructions used in the present exemplary disclosure are fully defined in either the referenced DEC patents or handbooks or both. Each mnemonic is equated to its octal machine code and to a description of its functional effect regarding the functioning of the processor system.

The processor bus (see FIGS. 1, 30 and 31 for example) normally includes 56 leads; however, only 36 are used in the exemplary embodiment (see FIG. 37 for example). Communication on the processor bus is a master-slave relationship, such as in FIG. 1 where the processor unit (master) may fetch an instruction from the memory unit (slave) or where the processor unit (master) may read data from a scan unit of a particular bus converter (slave), et cetera. The interlocked master-slave relationship requires a master sync signal from the master unit and a slave sync signal from the slave unit in order to complete a transfer therebetween of data, et cetera.

As in FIG. 30, the processor unit contains eight general registers R0 to R7 which can be used for a variety of purposes, such as accumulators, index registers, autoincrement registers, autodecrement registers, stack pointers, address registers, et cetera. Register R7 is used as the program counter (PC) and at any particular time contains the address of the next instruction (see FIG. 31) to be executed. Register R6 is normally used as the stack pointer (SP) indicating the memory address in the stack memory (see FIG. 31) of the last entry in the appropriate stack, such entries being on a last-in ("pushed" onto the stack) and first-out ("popped" from the stack) basis.

The processor status word register (see FIG. 30) contains information on the current status of the processor unit. This information includes the current processor priority (bits 7 to 5), a debugging indicator (T bit 4), and a condition code (N, Z, V and C bits 3 to 0) which describes the results of the last used instruction. The priority may be any one of eight levels and the debugging indicator T may be set for trapping; and, in the condition code, the Z bit is one if the result was zero, the N bit is one if the result was negative, the C bit is one if the result included a carry, and the V bit is one if the result involved an arithmetic overflow.

The memory unit (see FIG. 31) may be viewed as a series of memory locations with an address (octal number, for instance) assigned to each location, and under the control of a control section including a memory address register and a memory buffer. Each 16-bit word is divided into a high byte (bits 15 to 8) and a low byte (bits 7 to 0) with the low bytes stored at even-numbered locations and the high bytes stored at odd-numbered locations. Successive word addresses are thus successive even-numbered addresses where, as is well known, the least significant octal digit (bits 2 to 0), as well as the other five such digits, will progress as 0, 2, 4, 6, 0, 2, 4, 6, et cetera.

The processor unit of FIG. 30 is coupled to the processor bus through a number of connections, the primary connection being via a bus address register, a bus interface unit, and an interrupt priority unit. Information in the form of data or instructions on the processor bus is transmitted to or received from locations (see FIG. 1) constituted by the peripheral units or the memory unit. Each location is defined by an address in the bus address register.

Information transfers within the processor unit are under the control of the various parts of the processor unit shown as boxes in the lower half of FIG. 30. Instructions are put into the instruction register for decoding in the instruction decoder under the control of the timing unit and of the general control unit. Timing signals and signals from the instruction decoder and from the general control unit are also used by the arithmetic control unit to in turn control the arithmetic unit in the upper part of FIG. 30.

Operations in the register memory (upper right part of FIG. 30) are controlled by the register memory control unit in the lower part of FIG. 30. Also, internal computer operating conditions are monitored by the internal condition control unit.

The processor unit of FIG. 30 uses three basic cycles: "fetch", "execute" and "term" cycles. During the fetch cycle, an instruction is obtained from the memory unit of FIG. 31 and is decoded. If the instruction contains one or two operand addresses, the data is obtained and stored in the processor unit. Then the processor unit is diverted to the term or execute cycle depending upon the instruction. During the execute cycle, the processor unit operates on data and transfers resulting data to final locations defined by the operand addresses. The processor unit examines the data processing system during a term cycle to respond to certain conditions. After the term cycle is completed, the processor unit produces another fetch cycle. In the above, the program count is transferred from the PC register (R7) through the B input circuit, the adder unit, and the gating unit to the bus address register. The program count is incremented and returned to the PC register (R7). Then, the instruction located in the location addressed by the bus address register is obtained and coupled through the bus interface unit to the instruction register for decoding by the instruction decoder. If the instruction contains an operand address, it is decoded and the operand (usually data) defined by the operand address is transferred from the memory unit (FIG. 31) to the processor unit where it is transferred to the output of the arithmetic unit. If the output of the arithmetic unit is data, the data is transferred to an address which is stored in the bus address register and which is defined by the instruction. If the output of the arithmetic unit is an address, it is transferred to the bus address register and the contents of the addressed location are returned to the A input or B input units as data or as another address.

The addresses sent out onto the processor bus to various peripheral units, such as the bus converters and memory unit, et cetera, are specified by the bus address register of FIG. 30. Those addresses which are of particular significance to the exemplary embodiment of the invention are defined in detail under the description sections above entitled "Bus Converter" and "Scan Unit" wherein is described the detailed functioning of those units (as shown in FIGS. 36 through 44), the Bus Converters (see FIG. 1) being among the peripheral units connected to the processor bus.

SCANLOOP PROGRAM — GENERALLY

As shown in FIG. 20, the scanloop program, insofar as markers and trunks are concerned, involves three routines. Initially, trunks are scanned (a first pass trunk scan) to ascertain the status of trunk S1 relays indicative of whether or not trunks have been seized by calling circuits. Then, markers (up to a maximum of 16) are scanned to ascertain if any change has occurred in the MKR control status. Lastly, trunks are again scanned (a second pass trunk scan) to ascertain the status of trunk CS relays indicative of whether or not trunks have been answered by called circuits.

The scanning of trunks and the processing of the results of such scanning do not form any part of the present invention and are not discussed here since such is not required to understand the exemplary embodiment of the present invention.

MARKER SCANLOOP PROGRAM

Figure 32:
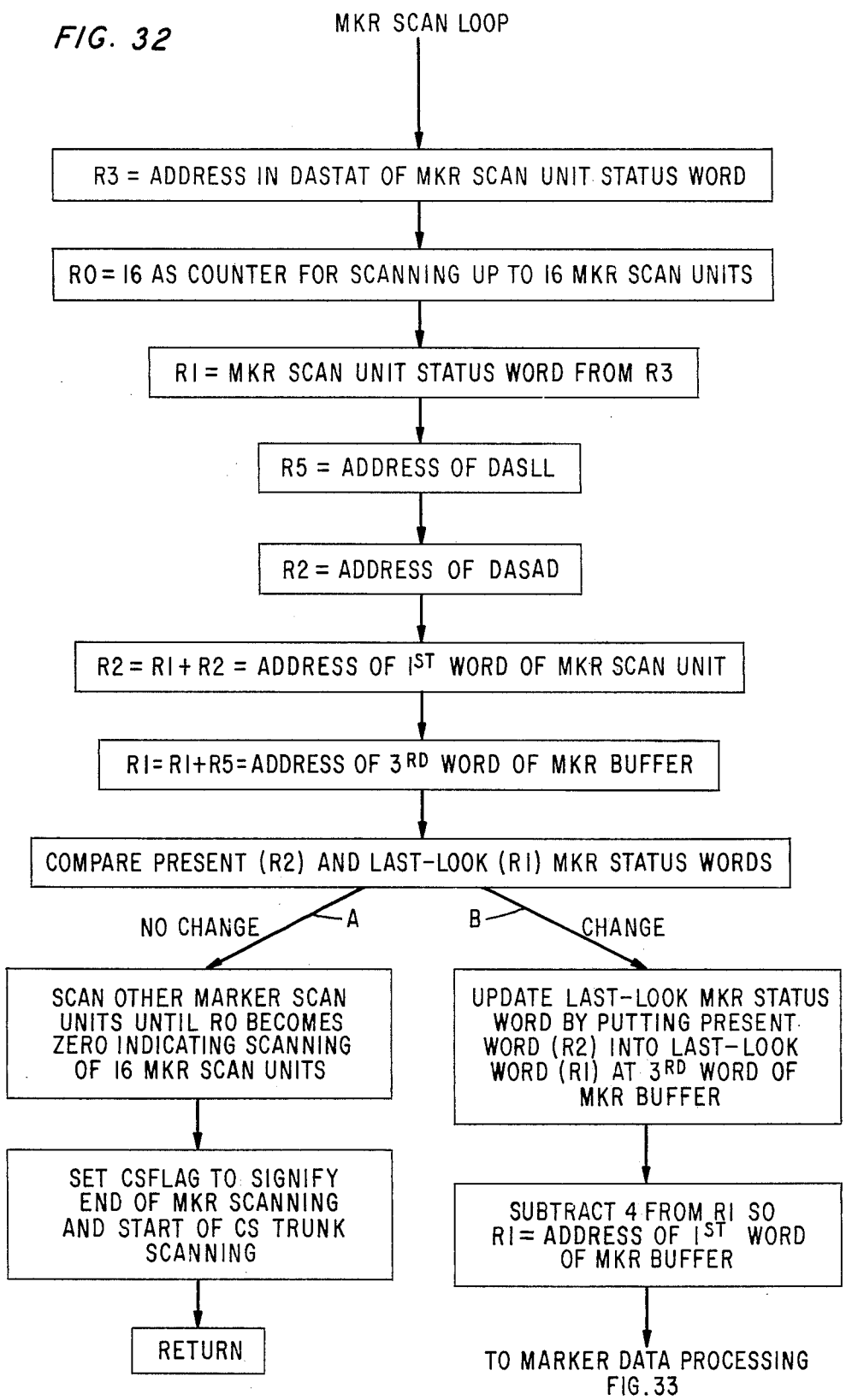
FIGS. 32 through 34 show in more detail the flow diagram for the marker scanloop program and for the marker data processing program leading up to (FIG. 34) the collection in the marker buffer area of marker billing data.

As shown in FIGS. 21 and 32, the MKR scanloop program causes the scanning of the MKR Status Word (First Word of the MKR Scan Unit) for each normal and equipped MKR Scan Unit in turn for a maximum of 16 markers (one scan unit per marker). As each MKR Status Word is scanned, the Present MKR Status Word (First Word of the MKR Scan Unit) is compared with the Previous (Last-Look) MKR Status Word (Third Word of the MKR Buffer Area). If there is no change, the scanning of MKR Status Words continues. When up to a maximum of 16 MKR Scan Units have been scanned, the scanloop program shifts to the second pass (CS relay) trunk scanning.

Figure 33:
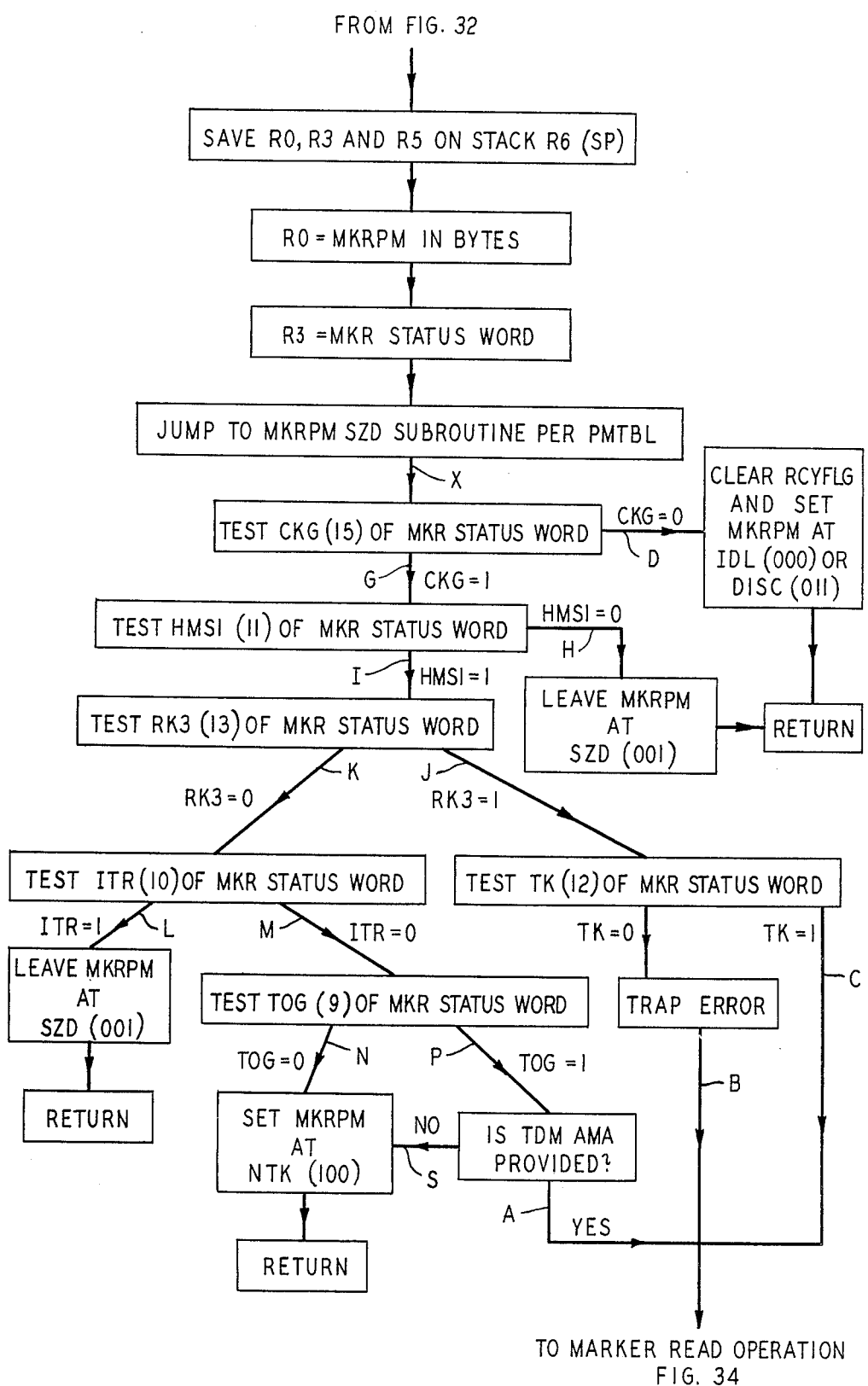

If a change occurs in a MKR Status Word, a program branch occurs to process that change. As shown in FIGS. 22 and 33, processing a MKR Status Word change amounts to updating the Last-Look MKR Status Word (Third Word of the MKR Buffer) and advancing to a subroutine according to the MKR Progress Mark MKRPM in bits 2 to 0 of the First Word of the MKR Buffer Area.

In the rest of this section is discussed in detail the instructions necessary to update the Last-Look MKR Status Word. The next section will discuss the processing of the change in the MKR Status Word.

Set forth below regarding FIGS. 21, 22, 32 and 33 are the necessary sequences of program instructions for scanning the Marker Status Word, comparing the Present-Scan and Last-Look Marker Status Words, updating the Last-Look Marker Status Word, and entering the Marker Data Processing Program.

| | | |
|---|---|---|
| MKSLP | | |
| MOV...DASTAT, R3... | | This instruction puts into R3 the address in memory of (the First Word of) the Distributor and Scanner Status Table DASTAT, which includes a 16-bit Status Word for each Distributor and for each Scanner Unit, each referred to as a DAS Unit. |
| ADD... #MKSDIR, R3... | | #MKSDIR is a number which if added to the address of the First Word of DASTAT will provide the address of the Marker (MKR) Scan Unit Status Word for the First MKR Scan Unit. This instruction results in R3 containing that address in DASTAT for the First MKR Scan Unit. |

The MKR Scan Unit Status Word includes (1) an offset in the high byte (bits 15 to 8) representing the address (frame and unit number) of the MKR Scan Unit, (2) a MKR group indication (bits 7 to 4), and (3) the state of the MKR Scan Unit (bits 2 to 0). The MKR Scan Unit may be in one of six states according to the following list as indicated by bits 2 to 0:

| | |
|---|---|
| 000... unassigned | 100... maintenance busy |
| 001... normal | 101... out of service |
| 010... spare | 111... power off. |
| 011... spare | |
| 110... spare | |

It will be assumed, as in FIG. 21, that the MKR Scan Unit is equipped and normal as represented by bits 2 to 0 being 001.

| | |
|---|---|
| MOV... #16, R0... | Set R0 to a count of sixteen so that R0 can act as a counter for counting through the scanning of up to a maximum of sixteen MKR Scan Units corresponding to a maximum of up to sixteen markers. |
| NXTMSU MOV... (R3), R1... | The First MKR Scan Unit Status Word (the information at the address in R3) is moved into R1. |
| CLR... R4... | R4 is cleared to all zeros. |
| BIC... #177770, R1... | 177770 is the octal designation of a 16-bit mask with ones in bits 15 to 3 and zeros in bits 2 to 0. All of R1 is cleared to zero except the MKR Scan Unit State (bits 2 to 0). Those bits will, as assumed above, be 001 to indicate that the MKR Scan Unit is equipped and normal. |
| ASL... R1... | Double the content of R1 so that R1 contains 010 (instead of 001), thus to define the MKR Scan Unit State as an offset in bytes. |
| ADD... R1, PC | Add R1 to the Program Counter PC (i.e., R7) to set the PC to branch to the next instruction according to the MKR Scan Unit State. |
| BR... NORM2... | Branch to NORM2 since the MKR Scan Unit State is assumed to be normal (001) as above. |
| NORM2 MOV... (R3), R1... | Put into R1 from the address in R3 the MKR Scan Unit Status Word, the high byte (bits 15 to 8) of which, as above, is an offset representing the address of the MKR Scan Unit in terms of a frame and a unit number. |
| CLRB... R1... | Clear to zero the low byte (bits 7 to 0) of R1. |
| SWAB... R1... | Swap the low and high bytes of R1 so the low byte (bits 7 to 0) contains the MKR Scan Unit address offset and so the high byte (bits 15 to 8) is zeroed. |
| MOV... DASLL, R5... | This instruction puts into R5 the address in memory of (the First Word of) the Distributor and Scanner Last-Look Directory DASLL, which includes a 16-bit Last-Look Address for each DAS Unit. |
| MOV... DASAD, R2... | This instruction puts into R2 the address in memory of (the First Word of) the Distributor and Scanner Unit Address Directory DASAD, which includes a 16-bit Address for each DAS Unit. |
| ADD... R1, R2... | With R1 added to the contents of R2, R2 now contains the address in DASAD of the MKR Scan Unit (i.e., the First Word of the MKR Scan Unit). |
| ADD... R5, R1... | With R5 added to the contents of R1, R1 now contains the address in DASLL of the MKR Scan Unit Last-Look (i.e, the Third Word of the MKR Buffer Area). |
| MOV... (R2), R2... | The content at the address in R2 (i.e., the address from DASAD of the First Word of the MKR Scan Unit) is put into R2. |
| MOV... (R1), R1... | The content at the address in R1 |

(i.e., the address from DASLL of the Third Word of the MKR Buffer Area) is put into R1.

With R2 and R1 containing the respective addresses of the First Word of the MKR Scan Unit and the Third Word of the MKR Buffer Area, it is now possible to make a comparison of the respective Present MKR Status Word and the Last-Look MKR Status Word as follows:

| | |
|---|---|
| DAS3 CMP... (R2), (R1)... | This instruction compares the contents of the addresses in R2 and R1 to see if any change has occurred in the MKR control status since the previous (Last-Look) scan of the MKR Status Word. |

If there has been no change in the MKR Status Word for the First MKR, the program branches (branch A on FIGS. 21 and 32) to repeat the above sequence of instructions for the second MKR Scan Unit as follows:

| | |
|---|---|
| TST... (R3) + ... | This instruction auto-increments the content of R3 by two so that R3 contains the address in DASTAT of the MKR Scan Unit Status Word for the Second MKR Scan Unit. |
| SOB... R0, NXTMSU... | Under the control of the auto-incremented content of R3 (address in DASTAT of the next MKR Scan Unit Status Word), the program branches to the prior NXTMSU operation to compare the Present MKR Status Word and the Last-Look MKR Status Word for the Second MKR Scan Unit. Incident to this operation, the content of R0 (initially set at sixteen) is decremented by one (to become fifteen) to indicate that one MKR Scan Unit has been served. |

The above SOB instruction causes the NXTMSU operation to be repeated through a maximum of 16 MKR Scan Units for 16 markers as indicated by the decremented count in R0 reaching zero, at which point the following instruction becomes effective:

| | |
|---|---|
| INC... CSFLAG... | A portion of memory identified as the CSFLAG is set to one to signify that the scanloop program has finished scanning MKR Scan Units and is advancing to the scanning of the CS scan points of Trunk Scan Units. |

If the previous DAS3 operation shows that a change has occurred in the MKR Status Word, as indicated by the comparison of the contents at the addresses in R2 and R1 (the addresses of the First Word of the MKR Scan Unit and of the Third Word of the MKR Buffer Area), the program branches (branch B on FIGS. 21 and 32) from that point to MKRCH to process the change as follows:

| | |
|---|---|
| BNE... MKRCH... | This instruction causes a branch for performing two "housekeeping" operations followed by continuation with DAS4 below. |

At this point, the following conditions prevail in the indicated registers:

R0 . . . contains the complement of the count of the number of MKR Scan Units scanned.

R1 . . . contains the address of the Last-Look Status Word (i.e., the Third Word of the MKR Buffer Area).

R2 . . . contains the address of the Present MKR Status Word (i.e., the First Word of the MKR Scan Unit).

R3 . . . contains the address in DASTAT of the MKR Scan Unit.

R4 . . . has been set at 0 since the MKR has been assumed to be normal.

The next step, as in FIGS. 22, 32 and 33 is to update the MKR Status Word Last-Look (Third Word of MKR Buffer Area) and then call in the Marker Data Processing Subroutine MKRDP to process the change in the MKR Status Word.

| | |
|---|---|
| DAS4 MOV... (R2), (R1)... | The content (First Word of MKR Scan Unit) at the address in R2 is put into the address (Third Word of MKR Buffer Area) in R1. The latest changed MKR Status Word thus becomes the new Last-Look MKR Status Word. |
| SUB... # 4, R1... | Four is now subtracted from the address in R1 so that R1 now contains the address of the First Word of the MKR Buffer Area (i.e., two MKR Buffer Area Words ahead of the Third Word). |
| JSR... PC, MKRDP... | This instruction calls in the MKR Data Processing Subroutine MKRDP by adjusting the Program Counter PC (R7) to MKRDP, which is described in the following sections. |

At this point, R1 contains the address of the First Word of the MKR Buffer Area, R2 contains the address of the First Word of the MKR Scan Unit, and R4 is set at zero indicating that the MKR is normal.

MARKER DATA PROCESSING
SUBROUTINE—GENERALLY

As shown in FIGS. 22 and 33, the MKR Data Processing Subroutine MKRDP starts with a branch to a subroutine according to the MKR Progress Mark MKRPM in bits 2 to 0 of the First Word of the MKR Buffer Area. The MKRPM will have resulted from the previous MKRDP operation and represents the previous changed control status of the MKR.

The present invention is concerned with the collection of MKR data into the MKR Buffer Area. This function, according to the particular embodiment shown, can occur only if the MKRPM is "SEIZED" and only if the present Last-Look MKR Status Word contains a prescribed signal content, as will be described below.

Also, as will be described below, and as shown in FIGS. 23 through 29, the MKRPM "SEIZED" can result from a previous MKRPM of only either "INITIALIZATION", "IDLE" "NOTRACK" or "SEIZED"; and, the only MKRPM which can result in a subsequent MKRPM of "READ" is "SEIZED". The exemplary embodiment of the present invention is not concerned with what happens with a MKRPM of "READ" since such can occur only after the collection of MKR data which is the subject matter of the present invention.

The First Word of the MKR buffer Area includes in bits 2 to 0 a Progress Mark MKRPM, as previously discussed in connection with FIG. 17, which indicates the control status of the marker as a result of the previous use, if any, of the Marker Data Processing Subroutine MKRDP to be described presently. The MKRPM can be any one of the following:

```
000... IDLE (IDL)           100... NOTRACK (NTK)
001... SEIZED (SZD)         101... INITIALIZATION (INL)
010... READ (RD)            110 or 111... VACANT (VCT).
011... DISCONNECT (DISC)
```

The collection of data from a marker can occur, as previously mentioned, only if the MKRPM is set at SZD(001) when the MKRDP subroutine is enterd due to a change in the MFR Status Word with the latter containing a prescribed signal content showing a prescribed marker control status. The MKRPM of SZD(001) can be present only if the previous use of the MKRDP subroutine recognized a prescribed marker control status at that time.

In discussing the following program sequences in connection with the MKRDP subroutine, it will be assumed that the call connection being handled by the marker is characterized in part as follows:

(1) The call is not a test call.
(2) The call is not a free call.
(3) The call is not a service-observed call.
(4) The call is not a traffic-sampled call.
(5) The call does not involve a partial dial condition.
(6) The call does not involve a permanent signal condition.

Also, the expression "followed by RETURN" or merely "RETURN" means that the program sequence causes a return to that part of the scanloop program where a branch was effected to the MKRDP subroutine.

| MKRDP | |
|---|---|
| MOV... R0, -(SP)... | The contents of registers |
| MOV... R3, -(SP)... | R0, R3 and R5 are |
| MOV... R5, -(SP)... | saved on the stack (R6 is stack pointer). |

Since R4 is zeroed (see above), indicating that the marker is normal, the sequence advances as follows:

| PMDEC | |
|---|---|
| MOV... (R1), R0... | From the address in R1, the First Word of the MKR Buffer Area is put into R0. |
| BIC... #177770, R0... | This instruction (as used previously) clears to zero all bits of R0 except the MKRPM in bits 2 to 0. |
| ASL... R0... | This instruction doubles the MKRPM (bits 2 to 0 of R0) to get the MKRPM in bytes. |
| MOV... 4(R1), R3... | From the address in R1 + 4 (i.e., the Third Word of the MKR Buffer Area), put the new Last-Look MKR Status Word into R3. |

At this point, a jump is made to one of seven MKRPM subroutines according to the MKRPM in R0. Of particular interest here is the subroutine corresponding to a MKRPM of SZD(001). However, regardless of what the MKRPM is, the next instruction is as follows:

| JMP... @ PMTBL (R0)... | According to the MKRPM in R0, a jump is made to the first instruction of the subroutine called for by the MKRPM. The jump is accomplished by entering the PMTBL table in memory under the control of the MKRPM in R0 to find the address of the proper subroutine and to set the program counter (R7) accordingly to start the respective continuing sequence described below. |
|---|---|

The sequence of operations regarding each MKRPM of VCT(110 or 111), INL(101), IDL(000), DISC(011), NTK(100) and SZD(001) is described in the following sections with regard to FIGS. 23 through 29 and 32 through 34. The sequence of operation regarding a MKRPM of RD(010) is not described since it is of no interest in understanding the exemplary embodiment of the invention.

MKRDP SUBROUTINE VCT(110 OR 111)

This subroutine should never be entered under normal conditions. Its purpose is to provide an ERROR message if the MKRPM happens to have been set to an unassigned MKRPM number (110 or 111) due to an error or a trouble. The net effect is to set the MKRPM to NTK(100), followed by a RETURN to the Scanloop Program, as described below regarding FIG. 23:

| VCT(110 or 111) | |
|---|---|
| BIC... # 7, (R1)... | 7 is the octal designation of 1's in bit positions 2 to 0. This instruction clears to zero the MKRPM in bits 2 to 0 of the First Word of the MKR Buffer Area at the address in R1. |
| INC... (R1)... | One is added to the First Word of the MKR Buffer Area at the address in R1, thus making the MKRPM SZD(001). |
| JMP...UPPM3... | This instruction causes a branch to UPPM3 as follows: |
| UPPM3 | |
| INC...(R1)... | Add one to the Frist Word of the MKR Buffer Area, and thus to the MKRPM in bits 2 to 0, at the address in R1. UPPM3 is always followed by UPPM2 as follows. |
| UPPM2 | |
| INC...(R1)... | This instruction also adds one to the MKRPM in bits 2 to 0 of the First Word of the MKR Buffer Area at the address in R1. UPPM2 is always followed by UPPM1 as follows: |
| UPPM1 | |
| INC...(R1)... | This instruction also adds one to The MKRPM in bits 2 to 0 of the First Word of the MKR Buffer Area at the address in R1. UPPM1 is always followed by RETURN. |
| RETURN | |
| MOV... (SP) +, R5... | The contents of R5, R3 and R0 |
| MOV... (SP) +, R3... | which were saved on the |
| MOV... (SP) +, R0... | stack (R6 is stack pointer) at the start of the MKR Data Processing Subroutine are returned to those registers. |
| RTS... PC... | A RETURN is effected to the Scanloop Program where that program left off due to a change in the MKR Status Word. |

Thus, the above sequence starting with UPPM3 adds three to the MKRPM to change it from SZD (001) to NTK(100) and ends up with a RETURN.

MKRDP SUBROUTINE INL(101)

This subroutine is entered when the MKRPM is INL(101) indicating that the MRK Scan Unit was previously returned to normal from an out-of-service condition. The net effect is to set the MKRPM according to the latest MKR Status Word. The new MKRPM may become any one of IDL(000), DISC(011), NTK(100) and SZD(001), followed by RETURN, as described below regarding FIG. 24.

| | |
|---|---|
| INL(101) | |
| CLR... (R1)... | This instruction clears to zero the entire First Word of the MKR Buffer Area at the address in R1, which includes setting the MKRPM in bits 2 to 0 to IDL(000). |
| TST... R3... | This instruction tests the CKG bit (15) of the MKR Status Word at the address (Third Word of MKR Buffer Area) in R3. |

Figure 24:
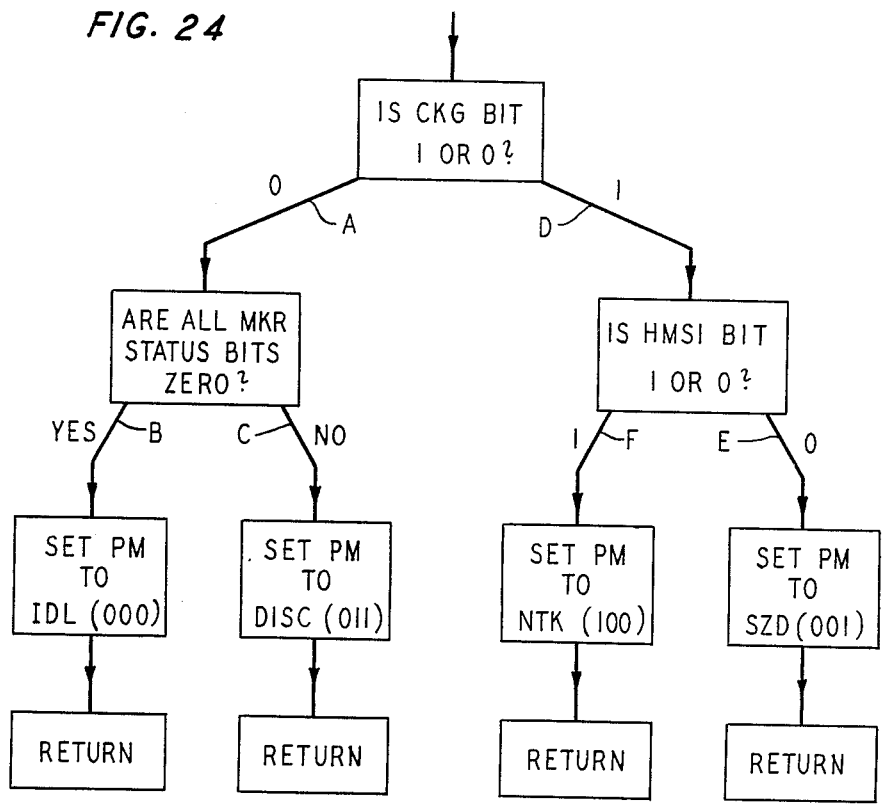

If the CKG bit is zero, the following sequence takes place (branch A of FIG. 24).

| | |
|---|---|
| BPL... JCGPM1... | A branch takes place to JCGPM1 where the sequence continues. |
| JCGPM1 | |
| JMP... CGPM1... | A branch takes place to CGPM1 where the sequence continues. |
| CGPM1 | |
| BIC... # 7,(R1)... | The octal designation 7 is used to clear to zero the MKRPM bits 2 to 0 in the First Word of the MKR Buffer Area at the address in R1, thus setting the MKRPM to IDL(000). |
| BIT... # IDLMSK, 4(R1)... | IDLMSK is a mask (zeros in bits 15-14 and 8 to 0 with ones in bits 13 to 9) for looking at bits 13 to 9. This instruction tests bits 13 to 9 of the MKR Status Word in the Third Word of the MKR Buffer Area at the address of R1 + 4 to see if these five bits are all zero. |

The five bits (13 to 9) of the MKR Status Word in the Third Word of the MKR Buffer Area are the following: RK3(bit TK(bit 12), HMS1(bit 11), ITR(bit 10) and TOG(bit 9), which may be referred to as a group as the MKR AMA Status Bits.

If all MKR AMA Status Bits are zero, the following instruction occurs (branch B on FIG. 24) to cause a RETURN, leaving the MKRPM set at IDL(000).

| | |
|---|---|
| BEQ... RETURN... | Return to Scanloop program. |

If all MKR AMA Status Bits are not zero, the program advances (branch C in FIG. 24) to UPPM3 which, as previously described, adds three to the MKRPM to change it from IDL(000) to DISC(011), followed by RETURN.

If earlier when the CKG bit (15) of the MKR Status Word was tested, it was found to be one, then the sequence would have continued at that point (branch D in FIG. 24) as follows:

| | |
|---|---|
| INC... (R1)... | One is added to the First Word of the MKR Buffer Area at the address in R1, thus changing the MKRPM from IDL(000) to SZD(001). |
| BIT... # 4000, R3... | The mask designated by the octal 4000 contains a one in bit 11 and zeros in bits 10 to 0. This instruction tests the HMS1 bit (11) of the MKR Status Word in R3. |

If the HMS1 bit is zero, the following instruction (branch E in FIG. 24) is effective.

| | |
|---|---|
| BEQ... JMPRET... | This causes a branch to JMPRET. |
| JMPRET | |
| JMP... RETURN... | This instruction causes a RETURN, leaving the MKRPM set at SZD(001). |

If the above HMS1 bit testing shows the HMS1 bit to be one, the following instruction (branch F in FIG. 24) is effective from that point.

| | |
|---|---|
| JMP... UPPM3... | This instruction, as previously described, adds three to the MKRPM to change it from SZD(001) to NTK(100), followed by RETURN. |

MKRDP SUBROUTINE IDL(000)

This subroutine is entered when the MKRPM is IDL(000) indicating that the previous state of the marker was an idle condition. The function of the subroutine is to detect a marker seizure (the CKG bit becoming one in the MKR Status Word) and to cause the MKRPM to reflect the MKR Control Status according to the latest MRK Status Word, followed by RETURN. The MKRPM may end up as SZD (001), IDL (000) or DISC (011) depending upon the MKR Status Word, as described below regarding FIG. 25.

| | |
|---|---|
| IDL(000) | |
| BPL... CKGAUD... | This instruction causes the CKG bit (15) of the MKR Status Word at the address in R3 to be tested for a zero or a one condition, to branch to CKGAUD (branch A in FIG. 25) if the CKG bit is zero, and to continue as follows (branch B in FIG. 25) if the CKG bit is one. |
| INC... MSZPEG... | If the CKG bit was found to be one, this instruction (branch B in FIG. 25) adds one to the MKR Seizure Peg Count Register in an assigned core area. |
| JMP... UPPM1... | Then, according to this instruction, a branch is made to UPPM1 which, as previously described, adds one to the MKRPM to change it from IDL(000) to SZD(001), followed by RETURN. |

Figure 25:
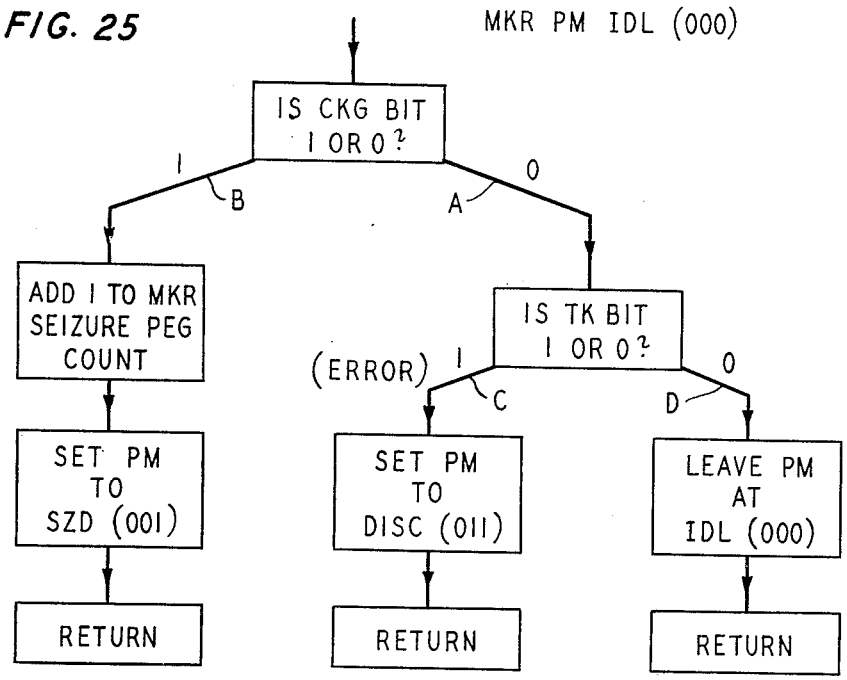

If the above CKG test shows the CKG bit to be zero, the branch to CKGAUD takes place from that point (branch A in FIG. 25).

| | |
|---|---|
| CKGAUD | |
| BIT... # 10000, R3... | This instruction tests the TK bit (12) of the MKR Status Word in R3. |

If the TK bit is found to be one, an ERROR has occurred, at which point the following instruction becomes effective after the ERROR is trapped (branch C in FIG. 25).

| | |
|---|---|
| JMP... UPPM3... | This causes a branch to UPPM3 which, as previously described, adds three to the MKRPM to change it from IDL(000) to DISC(011), followed by RETURN. |

If the TK bit is found to be a zero, the following alternate instruction occurs (branch D in FIG. 25).

| | |
|---|---|
| JMP... RETURN... | This causes a jump to RETURN as previously described, leaving the MKRPM set at IDL(000). |

MKRDP SUBROUTINE DISC(011)

This subroutine is entered when the MKRPM is DISC(011) indicating that the MKR had previously released (or started to release) from a call. The function of the subroutine is to make certain that all MKR Status Word bits return to zero between calls. The MKRPM is set to reflect the latest MKR Control Status. The MKRPM may become one of IDL(000), DISC(011) and NTK(100), followed by RETURN, as described below regarding FIG. 26.

| | |
|---|---|
| DISC(011) BIT... # IDLMSK, R3... | As previously described, this instruction tests the MKR AMA Status Bits (13 to 9) of the MKR Status Word in R3 to see if these bits are all zero. |

If all MKR AMA Status Bits are zero, the following sequence (branch A in FIG. 26) is effective.

| | |
|---|---|
| BIC... # 7, (R1)... | This instruction, as before, clears to zero bits 2 to 0 of the First Word of the MKR Buffer Area, thus to set the MKRPM at IDL(000). |
| JMP... RETURN... | This instruction causes a RETURN to the Scanloop program, leaving the MKRPM set at IDL(000). |

If the MKR AMA Status Bits are not all zero, as above tested, the following sequence (branch B in FIG. 26) occurs from that point.

| | |
|---|---|
| BNE... CKGTST... | This instruction causes a branch to CKGTST to continue as follows. |
| CKGTST TST... R3... | This instruction tests the CKG bit (15) of the MKR Status Word in R3. |

Figure 26:
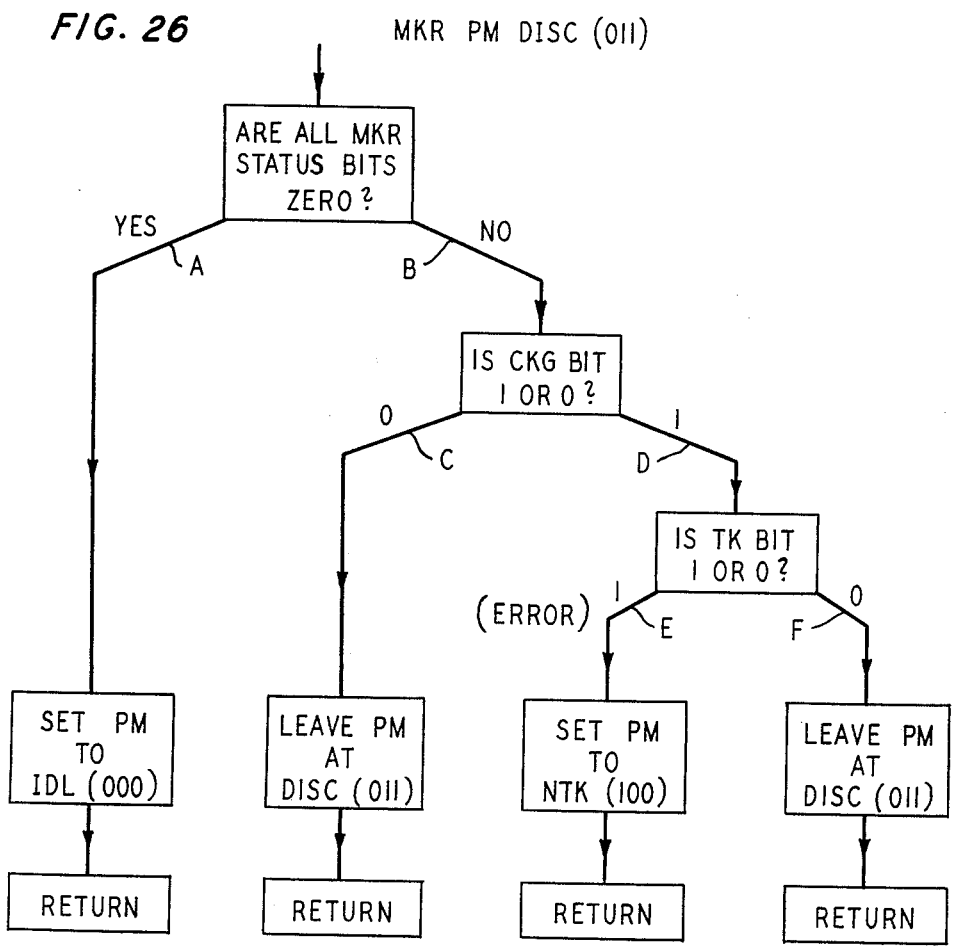

If the CKG bit, as above tested, is zero, the following instruction is effective (branch C in FIG. 26).

| | |
|---|---|
| JMP... RETURN... | This instruction causes a RETURN to the Scanloop program, leaving the MKRPM set at DISC(011). |

If the CKG bit, as above tested, is one, then from that point the following action (branch D in FIG. 26) takes place.

| | |
|---|---|
| BMI... TKCK... | This instruction causes a branch to TKCK to continue as follows. |
| TKCK BIT... # 10000, R3... | This instruction causes the testing of the TK bit (12) of the MKR Status Word in R3. |

If the TK bit, as above tested, is one, an ERROR has occurred; and, after trapping the ERROR, the following instruction occurs (branch E in FIG. 26).

| | |
|---|---|
| JMP... UPPM1... | This instruction, as previously described, causes one to be added to the MKRPM in bits 2 to 0 of the First Word of the MKR Buffer Area at the address in R1, thus to cause the MKRPM to be changed from DISC(011) to NTK(100), followed by RETURN, leaving the MKRPM set at NTK(100). |

If the TK bit, as above tested, is zero, then the following alternate instruction (branch F in FIG. 26) is effective.

| | |
|---|---|
| JMP... RETURN... | This instruction causes a RETURN leaving the MKRPM set a DISC(011). |

MKRDP SUBROUTINE NTK(100)

This subroutine is entered when the MKRPM is NTK(100) indicating that a call previously in progress in the MKR was not to be AMA processed. As described below regarding FIG. 27, depending upon the present MKR Control Status, and possibly the condition of the recycle flag RCYFLG (bit 15 of First Word of MKR Buffer Area), the MKRPM is suitably set followed by RETURN. The MKRPM may result as IDL(000) on DISC(011) regardless of the condition of the RCMFLG. If the RCYFLG is zero, the MKRPM can be left at NTK(100) and the RCYFLG may be set to one or left at zero. If the RCYFLG is one, the MKRPM may be left at NTK(100) with the RCYFLG cleared to zero. If the RECYFLG is one, the MKRPM may be left at NTK(100) or set to SZD(001) with the RCYFLG cleared to zero in either case.

| | |
|---|---|
| NTK (100) BPL... IDLCK... | This instruction causes a branch (branch A in FIG. 27) to IDLCK if the CKG bit (15) of the MKR Status Word is zero. |
| IDLCK BIC... # 100000, (R1)... | This instruction clears to zero the RCYFLG in bit 15 of the First Word of the MKR Buffer Area at the address in R1. |
| JMP... CGPM1... | This instruction causes a jump to CGPM1. |

As previously described, the jump to CGPM1 causes the following sequence of actions; the MRKPM is cleared zero to become IDL(000); the MKR AMA Status Bits (13 to 9) of the MKR Status Word in the Third Word of the MKR Buffer Area at the address of R1 + 4 are tested to see if they are all zero; if all of the MKR AMA Status Bits are zero (branch B in FIG. 27), the MKRPM is left at IDL(000), followed by RETURN; and, if all of the MKR AMA Status Bits are not zero (branch C in FIG. 27), three is added to the MKRPM to change it from IDL(000) to DISC(011), followed by RETURN.

If the above test of the CKG bit shows that it is one, the next instruction (branch D in FIG. 27) is as follows.

| | |
|---|---|
| TST... (R1)... | This instruction tests whether the RCYFLG is one or zero. |

Figure 27:
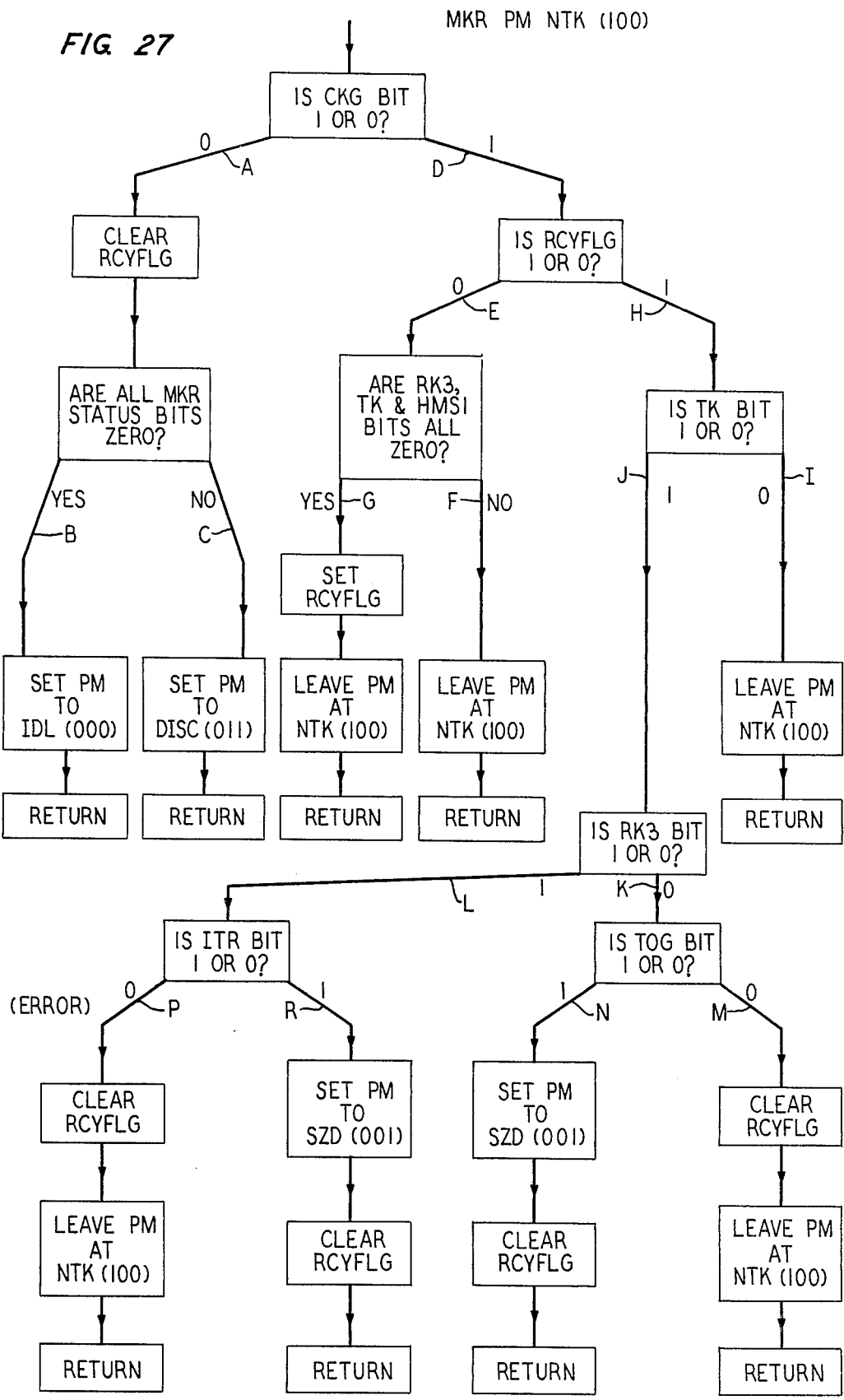

If the RCYFLG is zero, the following instruction is effective (branch E in FIG. 27).

| | |
|---|---|
| BPL... RCYCK... | This instruction causes a branch to RCYCK. |
| RCYCK BIT... #34000, R3... | This instruction tests the RK3, TK and HMS1 bits (13 to 11) of the MKR Status Word in R3. |

If the RK3, TK and HMS1 bits are not all zero, the following instruction is effective (branch F in FIG. 27).

| | |
|---|---|
| BNE... JPRTN... | This instruction causes a branch to JPRTN. |
| JPRTN JMP... RETURN... | This instruction causes a RETURN leaving the MKRPM at NTK(100). |

If the RK3, TK and HMS1 bits are all zero (see above), the following sequence of instructions occurs (branch G in FIG. 27).

| | |
|---|---|
| BIS... #100000, (R1)... | This instruction causes the setting to one of the RCYFLG (bit 15) of the First Word of the MKR Buffer Area at the address in R1. |
| BR... JPRTN... | This causes a RETURN, as above, leaving the MKRPM at NTK(100) and the RCYFLG set at one. |

When the RCYFLG was tested, as above, if the RCYFLG is found to be set at one, then the following instruction is effective (branch H in FIG. 27).

| | |
|---|---|
| BIT... #10000, R3... | This instruction tests the TK bit (12) of the MKR Status Word in R3. |

If the TK bit is found to be zero, the following instruction is effective (branch I in FIG. 27).

| | |
|---|---|
| BEQ... JPRTN... | This instruction, as previously, causes a RETURN, leaving the MKRPM set at NTK(100). |

If the TK bit is found to be a one (see above), the following instruction is effective (branch J in FIG. 27).

| | |
|---|---|
| BIT... #20000, R3... | This instruction tests the RK3 bit (13) of the MKR Status Word in R3. |

If the RK3 bit is zero, the following instruction is effective (branch K in FIG. 27).

| | |
|---|---|
| BIT... #1000, R3... | This instruction tests the TOG bit (9) of the MKR Status Word in R3. |

If the RK3 bit is one, the following instruction is effective (branch L in FIG. 27).

| | |
|---|---|
| BNE... IAOCK... | This instruction causes a branch to IAOCK. |
| IAOCK BIT... #2000, R3... | This instruction tests the ITR bit (10) of the MKR Status Word in R3. |

If the above tested TOG bit is found to be zero, the following sequence of instructions is effective (branch M in FIG. 27).

| | |
|---|---|
| CLRRCY BIC... #100000, (R1)... | This instruction clears to zero the RCYFLG (bit 15) of the First Word of the MKR Buffer Area at the address in R1. |
| JPRTN JMP... RETURN... | This instruction causes a RETURN, leaving the MKRPM at NTK(100). |

If the above tested TOG bit is found to be one, the following sequence of instructions is effective (branch N in FIG. 27).

| | |
|---|---|
| BNE... SETSEZ... | This instruction causes a branch to SETSEZ. |
| SETSEZ BIC... #7, (R1)... | This instruction clears to zero bits 2 to 0 of the First Word of the MKR Buffer Area at the address in R1, thus setting the MKRPM at IDL(000). |
| INC... (R1)... | This instruction adds one to the MKRPM to change it from IDL(000) to SZD(001). |
| BR... CLRRCY... | As above, this instruction clears to zero the RCYFLG and causes a RETURN, leaving the MKRPM set at SZD(001). |

If the above tested ITR bit is found to be zero, an ERROR has occurred and the following instruction is effective (branch P in FIG. 27) after causing the ERROR to be trapped.

| | |
|---|---|
| BR... CLRRCY... | As above, this instruction clears to zero the RCYFLG and causes a RETURN, leaving the MKRPM at NTK(100). |

If the above tested ITR bit is found to be one, the above SETSEZ sequence is effective (branch R in FIG. 27) to clear the RCYFLG and to cause a RETURN, leaving the MKRPM set at SZD(001).

MKRDP SUBROUTINE SZD(001)

This subroutine is the one of principal present interest since the collection of billing data from the marker can occur only when this subroutine is entered.

This subroutine is entered when the MKRPM is SZD (001) indicating that the marker previously had been seized on a call. The result of the subroutine is to read data from the marker or not to read data depending upon the signal content of the latest MKR status word. The MKRPM can become any of of IDL(000), DISC(011), SZD(001) and NTK(100) without the Initial Entry Data being collected from the marker if the MKR Status Word does not conform to a prescribed signal content. If the MKR Status Word does conform to a prescribed signal content, then the 15 words of MKR Data (Words 1 through 15 of the MKR Scan Unit in FIG. 16) will be read into the 15 data words of the MKR Buffer Area (Words 3 through 17 of the MKR Buffer Area in FIG. 17). As will be noted, no data corresponds to Words 13 to 15 of the MKR Scan Unit and to Words 15 to 17 of the MKR Buffer Area since these three word locations are reserved for uses not of importance to an understanding of the exemplary embodiment of the invention.

The MKRDP Subroutine SZD(001) is described in connection with FIGS. 28 and 29 and in connection with FIGS. 33 and 34. The subroutine starts at the top of FIG. 28 and at the point X on FIG. 33.

Figure 28:
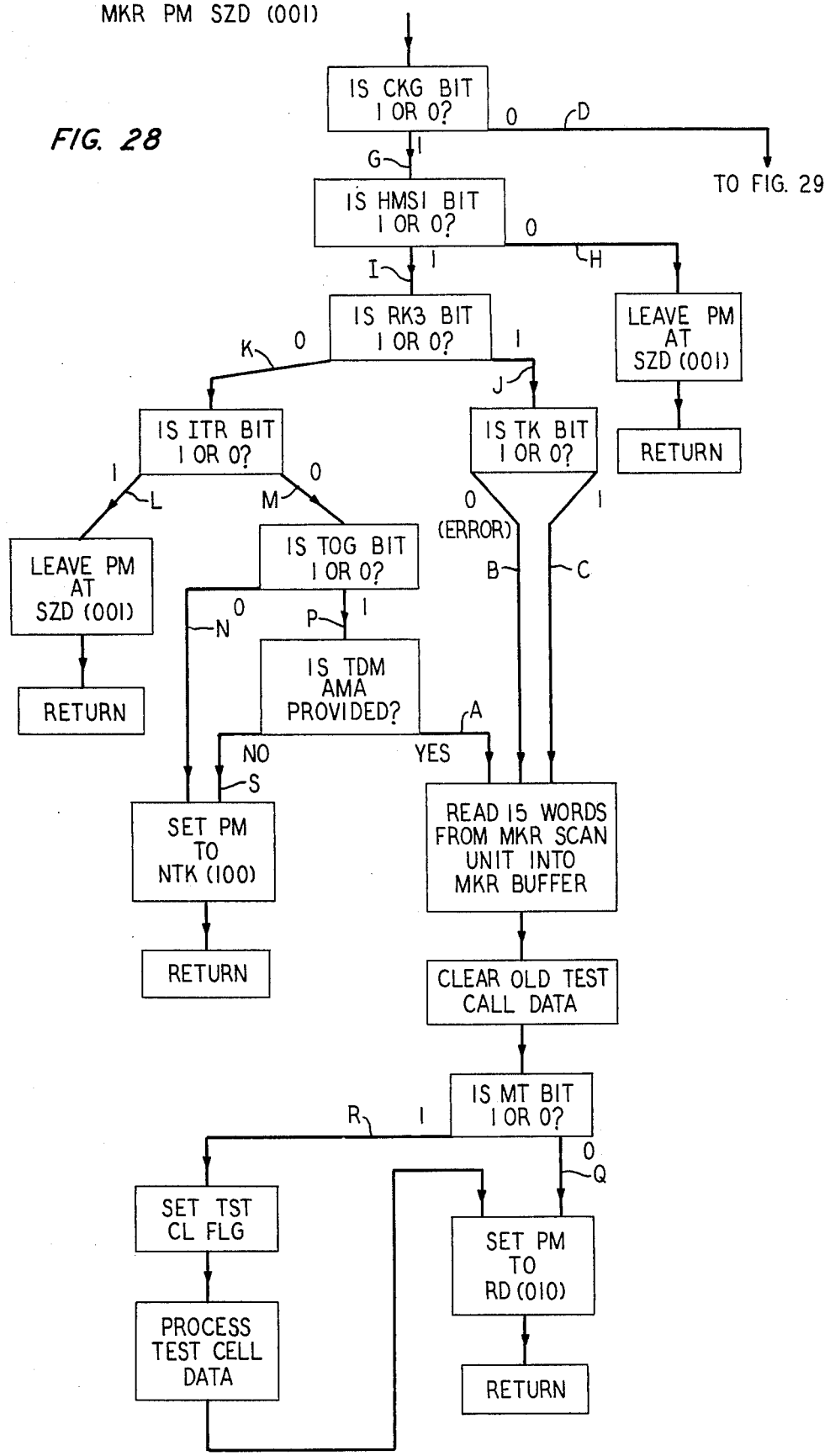

It will be noted in FIG. 28 that there are three entry points A, B and C to the box marked to signify the reading of the MKR data. These three points corresponds to the three points at the bottom right of FIG. 33 and which come together into FIG. 34 where the reading operation is set forth. All other options on FIGS. 28, 29 and 33 result, as will be described, in a RETURN without a read operation having taken place.

The MKRDP Subroutine SZD(001) is entered with the following instruction.

| | |
|---|---|
| SEIZED BPL... RELAUD... | This instruction causes a branch (branch D in FIGS. 28 29 and 33) to RELAUD if the CKG bit (15) of the MKR Status Word is zero. |
| RELAUD BIC... # 100000, (R1)... | This instruction clears to zero the RCYFLG (bit 15) in the First Word of the MKR Buffer Area at the address in R1. |
| INC... PRPEG... | The premature release peg count register (for the MKR) in memory is incremented by one. |
| CMPB... #15, I(R1)... | This instruction compares the number 15 (1111 in binary) with the high byte (bits 15 to 8) of the First Word of the MKR Buffer Area to see if the Premature Release Count PRC (bits 11 to 8) in the MKR Buffer Area has reached a count of 15 (to signify that the present premature release is the sixteenth) without a read operation having taken place. |

Figure 29:
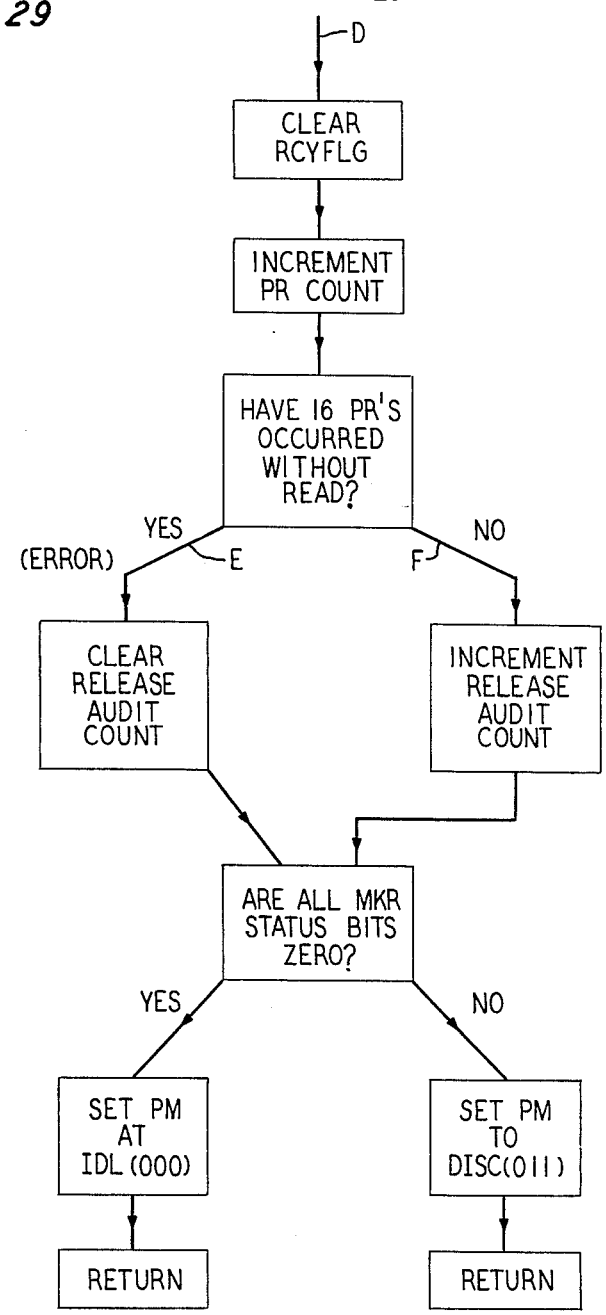

If 16 such releases have occurred, some ERROR has occurred such that after the ERROR is trapped the following sequence of instructions is effective (branch E in FIG. 29).

| | |
|---|---|
| CLRB... I(R1)... | This instruction clears to zero the high byte (bits 15 to 8) of the First Word of the MKR Buffer Area at the address in R1, thus resetting to zero (0000) the PRC bits 11 to 8. |
| BR... CGPM1... | As previously described, this instruction causes a branch to CGPM1 which results in a setting of the MRKPM either to IDL(000) or to DISC(011), depending upon whether or not all MRK AMA Status Bits are zeros, followed by RETURN. |

If, in the above, 16 premature marker releases have not occurred without a read operation, the following instructions are effective (branch F in FIG. 29).

| | |
|---|---|
| INCB... I(R1)... | Add 1 to the high byte (bits 15 to 8) of the First Word of the MKR Buffer Area at the address in R1, thus increasing by one the PRC count in bits 11 to 8. |
| BR... CGPM1... | This instruction, as above, causes the setting of the MKRPM either to IDL(000) or to DISC(011), followed by RETURN. |

If the above testing of the CKG bit shows it to be one, the following instruction is effective (branch G on FIGS. 28 and 33).

| | |
|---|---|
| BIT... # 4000, R3... | This instruction tests the HMS1 bit (11) of the MKR Status Word in R3. |

If the HMS1 bit is zero, the following instruction is effective (branch H in FIGS. 28 and 33).

| | |
|---|---|
| JMP... RETURN... | This instruction causes a RETURN to the Scanloop program, leaving the MKRPM at SZD(001). |

If the HMS1 bit is found to be one, the following instruction is effective (branch I in FIGS. 28 and 33).

| | |
|---|---|
| BNE... HMS1OP... | This instruction causes a branch to HMS1OP. |
| HMS1OP BIT... # 20000, R3... | This instruction tests the RK3 bit (13) in the MKR Status Word in R3. |

If the RK3 bit is one, the following instruction is effective (branch J in FIGS. 28 and 33).

| | |
|---|---|
| BIT... # 10000, R3... | This instruction tests the TK bit (12) of the MKR Status Word in R3. |

If the TK bit is one, the program advances to DATARD (branch C in FIGS. 28 and 33), to be described later, where the functions connected with reading MKR Data will be described.

If the TK bit is zero, an ERROR has occurred, resulting in trapping the ERROR an then continuing with the following instruction (branch B in FIGS. 28 and 33).

| | |
|---|---|
| BR... DATARD... | This instruction causes a branch |

-continued (branch B in FIGS. 28 and 33) to DATARD to be described later.

Returning to the earlier part of the subroutine where the RK3 bit was tested, if the RK3 bit is zero, the following instruction is effective (branch K in FIGS. 28 and 33).

| BEQ... ITRCK... | This instruction causes a branch to ITRCK. |
|---|---|
| ITRCK | |
| BIT... #2000, | This instruction tests the ITR bit |
| R3... | (10) of the MKR Status Word in R3. |

If the ITR bit is one, the following instruction is effective (branch L in FIGS. 28 and 33).

| BNE... RETURN... | This instruction causes a RETURN, leaving the MKRPM at SZD(001). |
|---|---|

If the ITR bit is zero, the following instruction is effective (branch M in FIGS. 28 and 33).

| BIT... #1000, | This instruction tests the TOG bit |
|---|---|
| R3... | (9) of the MKR Status Word in R3. |

If the TOG bit is zero, the following instruction is effective (branch N of FIGS. 28 and 33).

| BEQ... UPPM3... | As previously described, this instruction causes a branch to UPPM3 which results in adding three to the MKRPM to change it from SZD(001) to NTK(100), followed by a RETURN. |
|---|---|

If the above TOG bit testing shows it to be one, the following instruction is effective (branch P in FIGS. 28 and 33).

| TSTB... at DASID... | This instruction tests the marker group (0 or 1) assignment of the MKR Scan Unit by using the DASID address in DASTAT for the MKR and examining the MKR Scan Unit Status Word to see which marker group (0 or 1) is involved. |
|---|---|

If the MKR is in MKR group 1, the following instruction is effective.

| BMI... TANMG1... | This instruction causes a branch to TANMG1. |
|---|---|
| TANMG1 | |
| TSTB... TDMAM1... | TDMAM1 is a Feature Flag in memory indicating whether or not MKR group 1 is arranged for tandem AMA functions. The flag is zero for "no" and one for "yes". |

If the MKR is in MKR group 0, the following instruction is effective.

| TSTB... TDMAM0... | TDMAM0 is a Feature Flag in memory indicating whether (TDMAM0=1) or not (TDMAM0=0) MKR group 0 is arranged for tandem AMA functions. |
|---|---|

If neither MKR group 1 nor MKR group 0 is arranged for tandem AMA functions, one of the following instructions is effective (branch S in FIGS. 28 and 33).

| BR (for MKR group 0)... | Either of these instructions, |
|---|---|
| UPPM 3... | as previously described, |
| BEQ (for MKR group 1)... | causes a RETURN after |
| UPPM3... | having changed the MKRPM from SZD(001) to NTK(100). |

If the above MKR group testing function shows the pertinent MKR group to be arranged for tandem AMA functions, then one of the following instructions is effective (branch A in FIGS. 28 and 33).

| BNE(for MKR group 0)... | Either of these |
|---|---|
| DATARD... | instructions |
| BR(for MKR group 1)... | causes a branch (branch A |
| DATARD... | in FIGS. 28 and 33) to DATARD to be described below. |

In FIGS. 28 and 33, as described above, the functions associated with the reading of MKR data, beginning with DATARD, can become effective via any of the branches A, B, and C. In this regard, FIG. 33 continues at the top of FIG. 34. The DATARD functions are described below with regard to FIGS. 28 and 34. The MKR data reading operation involves scanning the Second (Word 1) through Sixteenth (Word 15) Words of the MKR Scan Unit (see FIG. 16) and storing the scanned data in the corresponding respective Fourth (Word 3) through Eighteenth (Word 17) Words of the MKR Buffer Area (see FIG. 17). The instructions which cause the reading of MKR data are as follows, starting with the DATARD instructions to which all of the above branches (A, B, and C of FIGS. 28 and 33) occurred for reading MKR data.

| DATARD | |
|---|---|
| MOV... #15,R4... | This instruction initializes (sets to number fifteen) R4 as a Read Loop Counter for counting fifteen Words of MKR data. |
| TST... (R2)+... | This instruction adds two to the content of R2 so that R2 contains the address of the Second Word of the MKR Scan Unit. |
| CLRB... 1(R1)... | This instruction clears to zero the high byte (bits 15 to 8) of the First Word of the MKR Buffer Area at the address in R1, thus to set to zero the PRC count (bits 11 to 8), the RCYFLG (bit 15) and the test call flag TSTCLFLG (bit 14). |
| MOV... R1,R5... | This instruction puts into R5 from R1 the address of the First Word of the MKR Buffer Area. |
| ADD... #6,R5... | This instruction adds number six to R5 so that R5 contains the address of the Fourth Word of the MKR Buffer Area. |
| SCNMKR | |
| MOV... (R2)+, (R5)+... | This instruction causes the Second Word (Word 1) of the MKR Scan Unit at the address in R2 to be read into the Fourth Word (Word 3) of the MKR Buffer Area at the address in R5. |

| | |
|---|---|
| | Also, R2 and R5 are incremented to contain the addresses of the next MKR Scan Unit and Buffer Area Data Words (i.e., the Third Word of the MKR Scan Unit and the Fifth Word of the MKR Buffer Area). |
| SOB... R4, SCNMKR... | Under the control of the Read Loop Counter R4, this instruction repeats the SCNMKR operation to cause R4 to be decremented by one for each MKR Data Word read into the MKR Buffer Area, and causes the reading, from successively incremented addresses in R2, the successive Third through Sixteenth Words from the MKR Scan Unit into the successive Fifth through Eighteenth Words of the MKR Buffer Area as addressed by the successively incremented addresses in R5. |

When all 15 MKR Data Words (Words 1 through 15 of MKR Scan Unit) have been read into the 15 MKR Buffer Data Words (Words 4 through 18 of the MKR Buffer Area), as indicated by the Read Loop Counter (R4) having decremented to zero, the following sequence of instructions is effective.

| | |
|---|---|
| CLR... 2(R1)... | This instruction causes the Second Word of the MKR Buffer Area (old test call data) at the address R1+2 to be cleared to zero. |
| BIT... #100, R3... | This instruction tests the MT bit (6) of the MKR Status Word in R3. |

Figure 34:
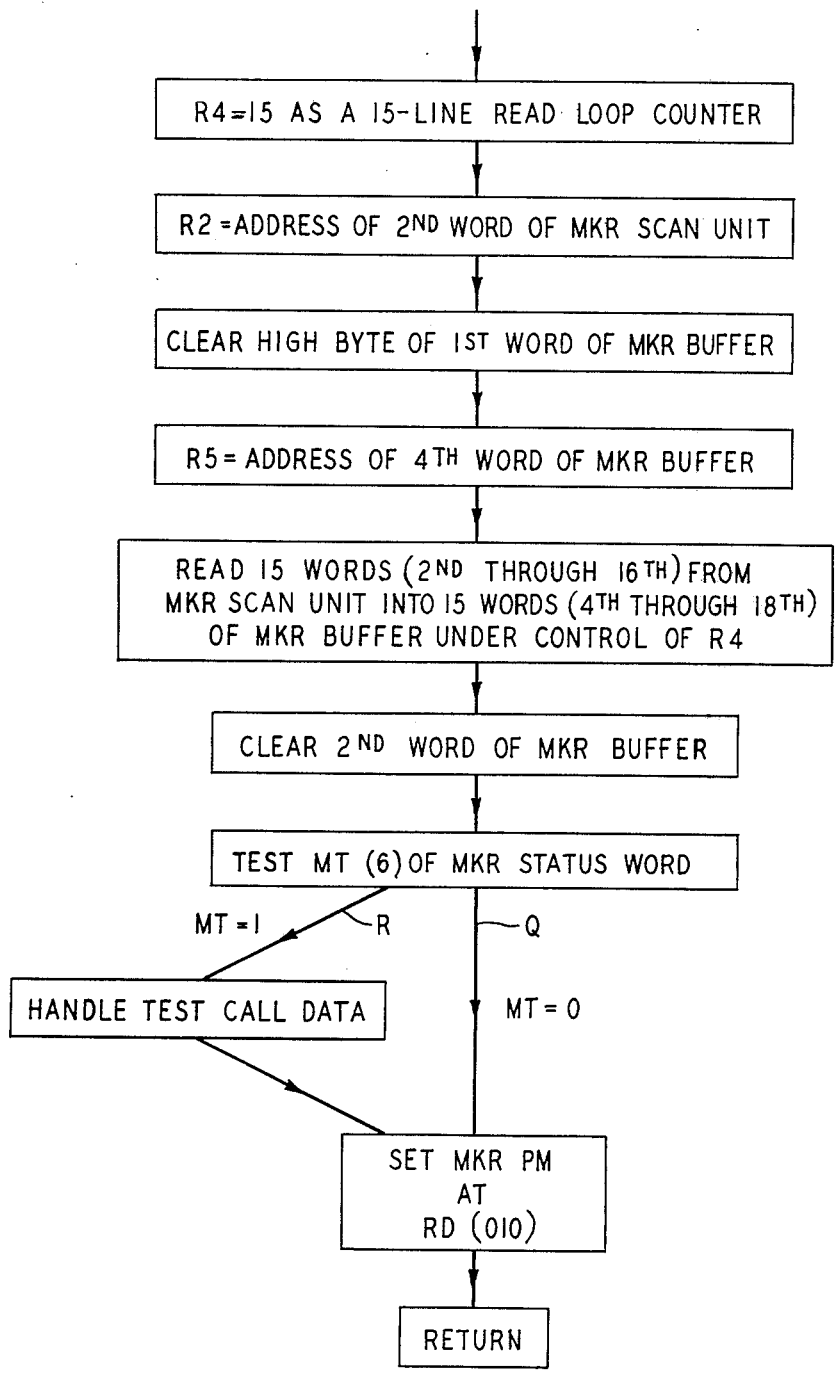

If the MT bit is zero (the MKR is not handling a test call), the following instruction is effective (branch Q in FIGS. 28 and 34).

| | |
|---|---|
| BEQ... UPPM1... | This instruction, as previously described, causes a branch (Q in FIGS. 28 and 34) to UPPM1 which adds one to the MKRPM to change it from SZD(001) to RD(010), followed by RETURN. |

If the above tested MT bit is one (the MKR is handling a test call-not as assumed), the following instruction is effective (branch R in FIGS. 28 and 34).

| | |
|---|---|
| BIS... #40000, (R1)... | The test call flag TSTCLFLG (bit 14) in the First Word of the MKR Buffer Area at the address in R1 is set to one to flag the test call. |

After the setting of the TSTCLFLG, certain operations, which are not of interest here, are performed to process or otherwise handle the test call data, followed by the following instruction.

| | |
|---|---|
| BR... UPPM1... | This instruction causes a transfer (see FIGS. 28 and 34) to UPPM1 which, as previously described, causes one to be added to the MKRPM to change it from SZD(001) to RD (010), followed by RETURN. |

MKRDP SUBROUTINE RD (010)

This subroutine is entered when the MKRPM RD(010) indicates that the MKR AMA Initial Entry Data has been read into the MKR Buffer Area. This subroutine is not described in detail since the functions occur only after and as a consequence of the collection of data into the MKR Buffer Area and since such functions are not necessary to the understanding of the exemplary embodiment of the present invention. However, a general description is given here of the basic functions performed by this subroutine.

When a marker releases (CKG MKR Status Bit becomes zero), this subroutine initiates the processing functions that are required to check, translate, and otherwise reconstruct the call data for use during billing processing functions. The reconstructed data is stored in a Trunk Core Register (see FIG. 19) associated with the actual physical trunk used on the call. The Trunk Core Register address is ascertained from the trunk location data in the MKR Buffer Area (Words 9 through 12).

After the functions of the subroutine are finished, the MKRPM is set either to DISC(011) or to IDL(000) depending upon the MKR Control Status as indicated by the signal content of the MKR Status Word. Thereafter, a RETURN to the Scanloop program is effected.

If no marker release is detected (CKG bit is at one in the MKR Status Word), the MKRPM is set either to NTK (100) or to RD(010), followed by a RETURN.

Some of the processing functions performed by this subroutine are as follows: takes into account whether or not the Trunk Core Register has a call-on list to be output formatted; performs an audit of the condition of the called answer relay CS of the trunk; derives and stores in the Trunk Core Register the pertinent calling number identity data; and, derives and stores in the Trunk Core Register the called number identity data (i.e., the called digits).

It is to be understood that the above-described exemplary embodiment is illustrative of the application of the principles of the invention. Other arrangements may be devised by those skilled in the art without departing from the spirit and scope of the invention. For instance, it is quite apparent that switching systems, processors, scanners, et cetera other than those of the exemplary embodiment may be used and that the specific nature of the common control statuses and data groups may vary widely according to specific design objectives. Also, the specific processor programming employed may vary considerably without departing from the teaching of the present invention. It will also be quite apparent to those skilled in the art that switching systems other than the exemplary telephone switching system may employ the arrangement and method of the present invention. Such other switching systems for handling call connections might relate to such areas as data, video, audio, telegraphy, and possibly to many other types of switching systems, and also to various uses of any particular switching system. Furthermore, even though the exemplary embodiment involves collection of billing data relating to billable telephone call connections, it will be apparent that the principles of the invention may be employed to collect call connection data in switching systems where such data is not necessarily characterized as billing data.

What is claimed is:

1. An arrangement for collecting call connection data from a common control circuit of a common control switching system wherein the common control circuit (1) assumes a busy control status when seized for the purpose of performing control functions associated with establishing a call connection between calling and called circuits, (2) assumes other control statuses while performing the control functions, (3) assumes an idle control status when released after performing the control functions, and (4) includes registration therein of certain call connection data incident to assumption of certain control statuses, the arrangement comprising
   A. a plurality of status word scan terminals for receiving from a plurality of circuit parts of the common control circuit a simultaneously existing plurality of binary status signals representing in signal content as a plural bit binary status word the control status of the common control circuit;
   B. data word scan terminals for receiving from corresponding circuit parts of the common control circuit corresponding binary data signals representing in signal content as plural bit binary data words corresponding call connection data registered in the common control circuit;
   C. and, signal processing means comprising
      1. means for repeatedly scanning the status word scan terminals at least as fast as any change can occur in the signal content of the status word,
      2. means controlled by the status word scanning means for detecting each change in the signal content of the status word,
      3. data control means effective when enabled for scanning data word scan terminals and for storing the signal content of scanned data words,
      4. and means controlled by the detecting means for enabling the data control means only if the signal contents of a succession of changed status words represent a prescribed succession of control statuses.

2. The invention defined in claim 1 wherein the succession of changed status words consists of two successively detected changed status words representing two prescribed control statuses.

3. The invention defined in claim 2 wherein the enabling means comprises
   A. means controlled by the detecting means for ascertaining the control status represented by the signal content of each changed status word
   B. and means controlled by the ascertaining means for causing the data control means to be enabled only if the two successive control statuses are as prescribed.

4. The invention defined in claim 3 wherein
   A. the ascertaining means comprises means for storing a previous status indicating signal indicative of the previous one of the two successive control statuses
   B. and the causing means is controlled in part by the stored previous status indicating signal.

5. The invention defined in claim 3 wherein
   A. the ascertaining means comprises means for storing a subsequent status indicating signal indicative of the subsequent one of the two successive control statuses
   B. and the causing means is controlled in part by the stored subsequent status indicating signal.

6. The invention defined in claim 3 wherein
   A. the ascertaining means comprises means for storing status indicating signals indicative of the two successive control statuses
   B. and the causing means is controlled by the stored status indicating signals.

7. The invention defined in claim 6 wherein
   A. one indicating signal is a status progress signal indicative of the previous one of the two successive control statuses,
   B. the other indicating signal is the signal content of the status word representing the subsequent one of the two successive control statuses,
   C. and the causing means is controlled by the stored status progress signal and by the stored status word signal content.

8. The invention defined in claim 7 wherein
   A. each of a plurality of different stored status progress signals is indicative of a corresponding different previous control status,
   B. each of a plurality of different stored status word signal contents represents a corresponding different subsequent control status,
   C. and the causing means is controlled by the ascertaining means for causing the data control means to be enabled only if the previous control status indicated by the stored status progress signal and the subsequent control status represented by the stored status word signal content are as prescribed with respect to one another.

9. The invention defined in claim 8 wherein
   A. the particular prescribed previous control status signifies that particular data is registered in the common control circuit and that said particular data may be scanned and stored
   B. and the particular prescribed subsequent control status signifies that the common control circuit is performing control functions with respect to a call connection of such type as to require the scanning and storing of said particular data.

10. The invention defined in claim 9 wherein
    A. the said particular data registered in the common control circuit includes all billing data necessary for call connection billing except call connection time duration
    B. and the particular prescribed subsequent control status signifies further that the common control circuit is performing the control function of completing the establishment of the said type of call connection.

11. A method of collecting call connection data from a common control circuit of a common control switching system wherein the common control circuit (1) assumes a busy control status when seized for the purpose of performing control functions associated with establishing a call connection between calling and called circuits, (2) assumes other control statuses while performing the control functions, (3) assumes an idle control status when released after performing the control functions, and (4) includes registration therein of certain call connection data incident to asumption of certain control statuses, the method comprising
    A. deriving from a plurality of circuit parts of the common control circuit a simultaneously existing plurality of binary status signals representing in signal content as a plural bit binary status word the control status of the common control circuit,
    B. deriving from corresponding circuit parts of the common control circuit corresponding binary data signals representing in signal content as plural bit binary data words corresponding call connection data registered in the common control circuit, C. repeatedly scanning the derived status word at least as fast as any change can occur in the signal content of the status word, D. detecting each change in the signal content of the scanned status word, E. and scanning and storing data words only if the signal contents of a succession of detected changed status words represent a prescribed succession of control statuses.

12. The invention defined in claim 11 wherein the succession of detected changed status words consists of two successively detected changed status words representing two prescribed control statuses.

13. The invention defined in claim 12 wherein the data word scanning and storing step comprises A. ascertaining the control status represented by the signal content of each detected changed status word B. and causing the scanning and storing of data words only if the two successively ascertained control statuses are as prescribed.

14. The invention defined in claim 13 wherein

A. the ascertaining step comprises storing a previous status indicating signal indicative of the previous one of the two successively detected control statuses B. and controlling the causing step in part by the stored previous status indicating signal.

15. The invention defined in claim 13 wherein

A. the ascertaining step comprises storing a subsequent status indicating signal indicative of the subsequent one of the two successively detected control statuses B. and controlling the causing step in part by the stored subsequent status indicating signal.

16. The invention defined in claim 13 wherein

A. the ascertaining step comprises storing status indicating signals indicative of the two successively detected control statuses B. and controlling the causing step by the stored status indicating signals.

17. The invention defined in claim 16 wherein

A. one indicating signal is a status progress signal indicative of the previous one of the two successively detected control statuses, B. the other indicating signal is the signal content of the status word representing the subsequent one of the two successively detected control statuses, C. and controlling the causing step by the stored status progress signal and by the stored status word signal content.

18. The invention defined in claim 17 wherein

A. each of plurality of different stored status progress signals is indicative of a corresponding different previous control status, B. each of a plurality of different stored status word signal contents represents a corresponding different subsequent control status, C. and controlling the causing step only if the previous control status indicated by the stored status progress signal and the subsequent control status represented by the stored status word signal content are as prescribed with respect to one another.

19. The invention defined in claim 18 wherein

A. the particular prescribed previous control status signifies that particular data is registered in the common control circuit and that said particular data may be scanned and stored B. and the particular prescribed subsequent control status signifies that the common control circuit is performing control functions with respect to a call connection of such type as to require the scanning and storing of said particular data.

20. The invention defined in claim 19 wherein

A. the said particular data registered in the common control circuit includes all billing data necessary for call connection billing except call connection time duration B. and the particular prescribed subsequent control status signifies further that the common control circuit is performing the control function of completing the establishment of the said type of call connection.

* * * * *